(12) United States Patent
Tazume

(10) Patent No.: US 11,689,699 B2
(45) Date of Patent: Jun. 27, 2023

(54) CONTROL DEVICE, SYSTEM, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 388 days.

(21) Appl. No.: 17/003,448

(22) Filed: Aug. 26, 2020

(65) Prior Publication Data

US 2021/0064066 A1   Mar. 4, 2021

(30) Foreign Application Priority Data

Aug. 30, 2019  (JP) .................................. 2019-158872
May 12, 2020  (JP) .................................. 2020-083946

(51) Int. Cl.

| H04N 7/18 | (2006.01) |
| G05D 1/10 | (2006.01) |
| G05D 1/00 | (2006.01) |
| B64C 39/02 | (2023.01) |
| G06V 20/13 | (2022.01) |
| G06V 20/17 | (2022.01) |

(52) U.S. Cl.
CPC ........... *H04N 7/185* (2013.01); *B64C 39/024* (2013.01); *G05D 1/0094* (2013.01); *G05D 1/1064* (2019.05); *G06V 20/13* (2022.01); *G06V 20/17* (2022.01); *B64U 2201/10* (2023.01)

(58) Field of Classification Search
CPC .. G05D 1/1064; G05D 1/0094; G05D 1/0676; B64C 39/024; B64C 2201/141; B64C 2201/027; B64C 2201/108; B64C 2201/127; G06V 20/00; G06V 2201/10; G06V 20/13; G06V 20/17; H04N 7/185; B64D 47/08
USPC .......................................................... 701/11
See application file for complete search history.

(56) References Cited

U.S. PATENT DOCUMENTS

| 2016/0376031 A1* | 12/2016 | Michalski ............ G05D 1/0676 701/15 |
| 2018/0239350 A1* | 8/2018 | Cantrell ................. B64D 45/04 |

FOREIGN PATENT DOCUMENTS

| AU | 2015201876 A1 * | 5/2015 | ............. B64C 11/00 |
| EP | 3251953 A1 * | 12/2017 | |
| EP | 3251953 A1 * | 12/2017 | ........... B64C 39/028 |
| EP | 3251953 A1 | 12/2017 | |

(Continued)

*Primary Examiner* — Muhammad Shafi
(74) *Attorney, Agent, or Firm* — Sughrue Mion, PLLC

(57) ABSTRACT

A control device 200 includes at least one memory configured to store a program code, and at least one processor configured to access the program code and operate as instructed by the program code. The program code includes an acquisition code configured to cause the at least one processor to acquire a request for requesting determination as to whether or not a target area is usable for a predetermined purpose, and a control code configured to cause the at least one processor to perform control to cause a first flying object to fly to the target area. The acquisition code is configured to cause the at least one processor to further acquire sensing data that is data obtained by optical sensing of the target area by the first flying object. The program code further comprises a determination code configured to cause the at least one processor to determine, based on the acquired sensing data, whether or not the target area is usable for the predetermined purpose.

20 Claims, 18 Drawing Sheets

(56) References Cited

FOREIGN PATENT DOCUMENTS

| | | | |
|---|---|---|---|
| JP | 2004-170429 A | | 6/2004 |
| JP | 2019-131332 | * | 8/2019 |
| WO | 2018/155700 A1 | | 8/2018 |

* cited by examiner

FIG. 6

PORT TABLE

| LATITUDE | LONGITUDE | USAGE FLAG | IMAGE FILE |
|---|---|---|---|
| E139° XX' | N35° XX' | FALSE | ./E139XX'N35XX'1.jpg |
| ... | ... | ... | ... |

FIG. 7

MATERIAL TABLE

| TYPE | FEATURE VALUE | HARDNESS |
|---|---|---|
| CONCRETE | ... | HARD |
| TILE | ... | HARD |
| SOIL | ... | HARD |
| SAND | ... | SOFT (NOT HARD) |
| ... | ... | ... |

CONTROL DEVICE, SYSTEM, AND METHOD

CROSS-REFERENCE TO RELATED APPLICATION

This application claims the benefit of Japanese Patent Application No. 2019-158872, filed on Aug. 30, 2019 and Japanese Patent Application No. 2020-83946, filed on May 12, 2020, the entire disclosures of which are incorporated by reference herein.

FIELD

The present disclosure relates to a control device, a system, and a method.

BACKGROUND

A system having one or more autonomous flying objects and one or more ports for takeoff and landing of the flying objects is known (see, for example, International Publication No. WO 2018/155700).

SUMMARY

The system described in International Publication No. WO 2018/155700, however, has been disadvantageous in that, for example, in a case where there is a predetermined purpose such as installation of a new port in a target area, a huge personnel cost would be required for determination as to whether or not the target area is usable for the predetermined purpose.

In view of the above circumstances, an objective of the present disclosure is to provide a control device, a system, and a method that can reduce a personnel cost for determination as to whether or not a target area is usable for a predetermined purpose.

To achieve the above objective, a control device according to an aspect of the present disclosure includes:
  at least one memory configured to store a program code; and
  at least one processor configured to access the program code and operate as instructed by the program code,
  the program code including:
  an acquisition code configured to cause the at least one processor to acquire a request for requesting determination as to whether or not a target area is usable for a predetermined purpose; and
  a control code configured to cause the at least one processor to perform control to cause a first flying object to fly to the target area,
  wherein the acquisition code is configured to cause the at least one processor to further acquire sensing data that is data obtained by optical sensing of the target area by the first flying object, and
  the program code further includes a determination code configured to cause the at least one processor to determine, based on the acquired sensing data, whether or not the target area is usable for the predetermined purpose.

The control device, the system, and the method according to the present disclosure enable reduction in a personnel cost for determination as to whether or not a target area is usable for a predetermined purpose.

BRIEF DESCRIPTION OF THE DRAWINGS

A more complete understanding of this application can be obtained when the following detailed description is considered in conjunction with the following drawings, in which:

FIG. 6 is a drawing illustrating an example of a port table stored in the control device included in the delivery system;

FIG. 7 is a drawing illustrating an example of a material table stored in the control device included in the delivery system;

DETAILED DESCRIPTION

Embodiment 1

Figure 1:
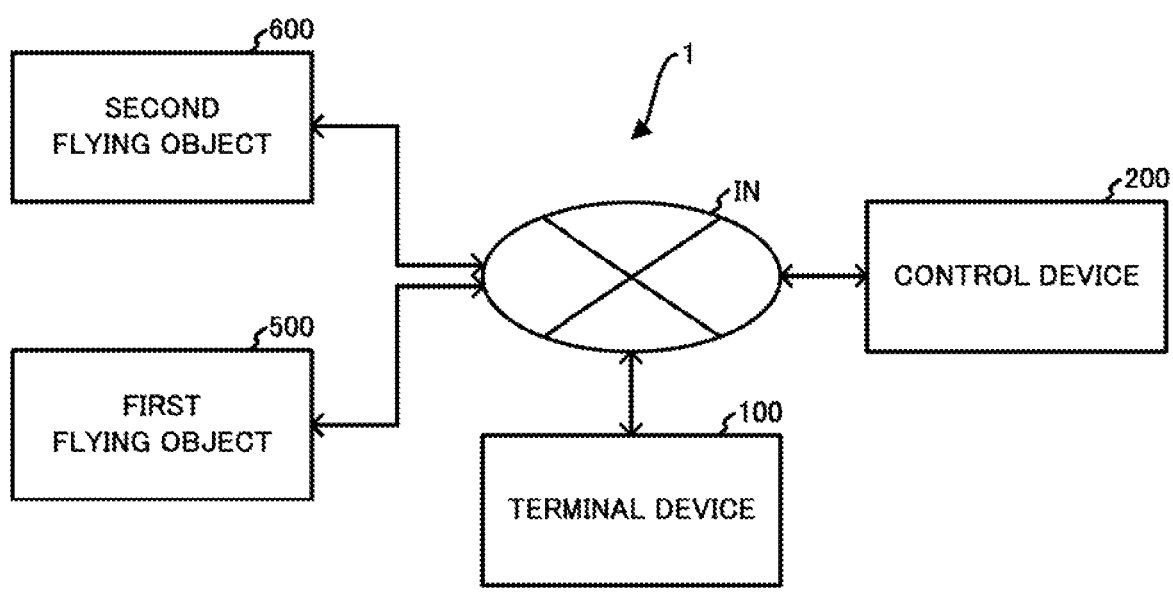
FIG. 1 is a system configuration drawing illustrating a configuration example of a delivery system according to Embodiment 1 of the present disclosure.

Embodiment 1 of the present disclosure is described below with reference to the attached drawings.

A delivery system 1 according to Embodiment 1 of the present disclosure includes a terminal device 100 operated by an administrator in charge of administration of a target area for use as a place for takeoff and landing of flying objects, which place is hereinafter referred to as a port.

The administrator desires to use the target area as a port for receiving articles at the target area. Thus the administrator operates the terminal device 100 to let a delivery service provider determine whether or not the target area is usable for a predetermined purpose of using the target area as a port. The terminal device 100 transmits, based on the operation of the administrator, via the Internet IN a determination request that requests determination as to whether or not the target area is usable for the predetermined purpose.

The delivery system 1 also includes a control device 200 and a first flying object 500. The control device 200 is installed at an office of a delivery service provider who delivers articles in a predetermined area. The control device 200 receives the determination request. The first flying object 500 flies to the target area in accordance with control of the control device 200 in order to capture an image of the target area. The delivery system 1 also includes a second flying object 600 that delivers an article to the target area when the control device 200 determines, based on the image of the target area, that the target area is used as a port.

Figure 2:
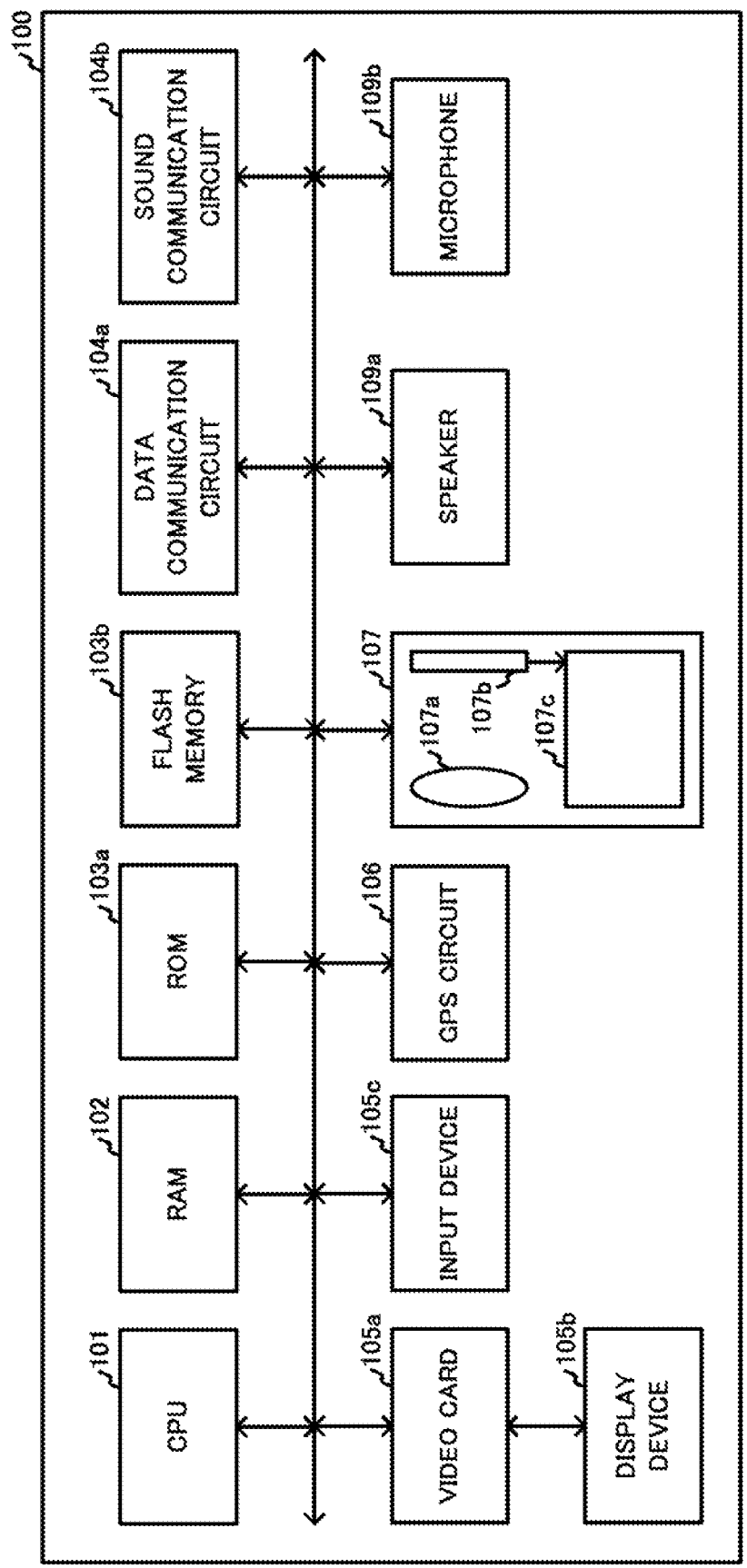
FIG. 2 is a hardware configuration drawing illustrating a configuration example of a terminal device.

The terminal device 100 is a smartphone, and as illustrated in FIG. 2, includes a central processing unit (CPU) 101, a random access memory (RAM) 102, a read only memory (ROM) 103a, a flash memory 103b, a data communication circuit 104a, a sound communication circuit 104b, a video card 105a, a display device 105b, an input device 105c, a global positioning system (GPS) circuit 106, a digital camera 107, a speaker 109a, and a microphone 109b.

The CPU 101 performs overall control of the terminal device 100 by executing a program stored in the ROM 103a or the flash memory 103b. The RAM 102 temporarily stores data to be processed, at the execution of the program by the CPU 101.

The ROM 103a and the flash memory 103b store various kinds of programs. The flash memory 103b further stores various kinds of data for use in execution of programs and a table in which data is stored. The terminal device 100 may include a hard disk instead of the flash memory 103b.

The data communication circuit 104a is a network interface card (NIC), and performs radio-based data communication with a non-illustrated base station connected to the Internet IN, in accordance with communication standards, such as long term evolution (LET) and 5th generation (5G). In this way, the data communication circuit 104a of the terminal device 100 performs data communication with the control device 200 connected to the Internet IN. The sound communication circuit 104b performs radio-based sound communication with a non-illustrated base station.

The video card 105a renders an image based on a digital signal output by the CPU 101 and outputs an image signal that represents the rendered image. The display device 105b is an electroluminescence (EL) display, and displays an image in accordance with an image signal output by the video card 105a. The terminal device 100 may include a plasma display panel (PDP) or a liquid crystal display (LCD), instead of the EL display. The input device 105c is a button, a touch panel, or both, and inputs a signal corresponding to an operation of the administrator.

The GPS circuit 106 receives a GPS signal originated from a GPS satellite, measures, based on the received GPS signal, latitude and longitude indicating a location of the terminal device 100, and outputs a signal that represents the determined latitude and longitude.

The digital camera 107 includes a lens 107a, a group of image capturing elements 107b, and an image generation circuit 107c. The lens 107a refracts light to converge the light. The group of image capturing elements 107b receives the light having passed through the lens 107a and generates an electrical signal. The image generation circuit 107c generates an image based on the electrical signal output by the group of image capturing elements 107b.

The speaker 109a outputs sound in accordance with a signal output by the CPU 101. The microphone 109b inputs a signal that represents ambient sound.

The administrator who intends to receive an article in the target area performs, to the input device 105c of the terminal device 100, a request operation for causing the terminal device 100 to send the determination request. Upon input of the signal corresponding to the request operation by the input device 105c, the CPU 101 causes the display device 105b to display a message to prompt image capturing of the target area.

The administrator having visually confirmed the message performs, to the input device 105c, an image capturing operation for causing the terminal device 100 to capture an image after an optical axis of the lens 107a of the digital camera 107 is directed to the target area. As used herein, it is described that directing the optical axis of the image capturing device, for example, the digital camera 107 or the like, to a subject, for example, the target area or the like, may include changing the optical axis such that at least a portion of the subject is included in a coverage of the image capturing device.

Upon input of the signal corresponding to the image capturing operation by the input device 105c of the terminal device 100, the CPU 101 acquires, from the image generation circuit 107c of the digital camera 107, a signal that represents a first image obtained by capturing of an image of a surface of the target area, and generates a first image file based on the acquired signal. Then the CPU 101 acquires the signal output by the GPS circuit 106 and generates, as information that represents latitude and longitude of the target area, information that represents latitude and longitude of the terminal device 100 represented by the acquired signal. Then the CPU 101 stores information that represents the acquired latitude and longitude, for example, in an exchangeable image file format (Exif) tag of the first image file.

Then the CPU 101 of the terminal device 100 causes the display device 105b to display a message to prompt entry of destination of a cover that covers the target area for indicating that the target area is to be used as a port. The administrator having visually confirmed the message performs to the input device 105c an input operation to input the destination. Upon input of a signal corresponding to the input operation by the input device 105c, the CPU 101 generates, based on the input signal, destination information that represents a destination.

Then the CPU 101 generates a determination request, and outputs, specifying the control device 200 as a destination, the generated determination request to the data communication circuit 104a together with the first image file and the destination information. Then the data communication circuit 104a transmits to the control device 200 the determination request together with the first image file and the destination information.

Figure 3:
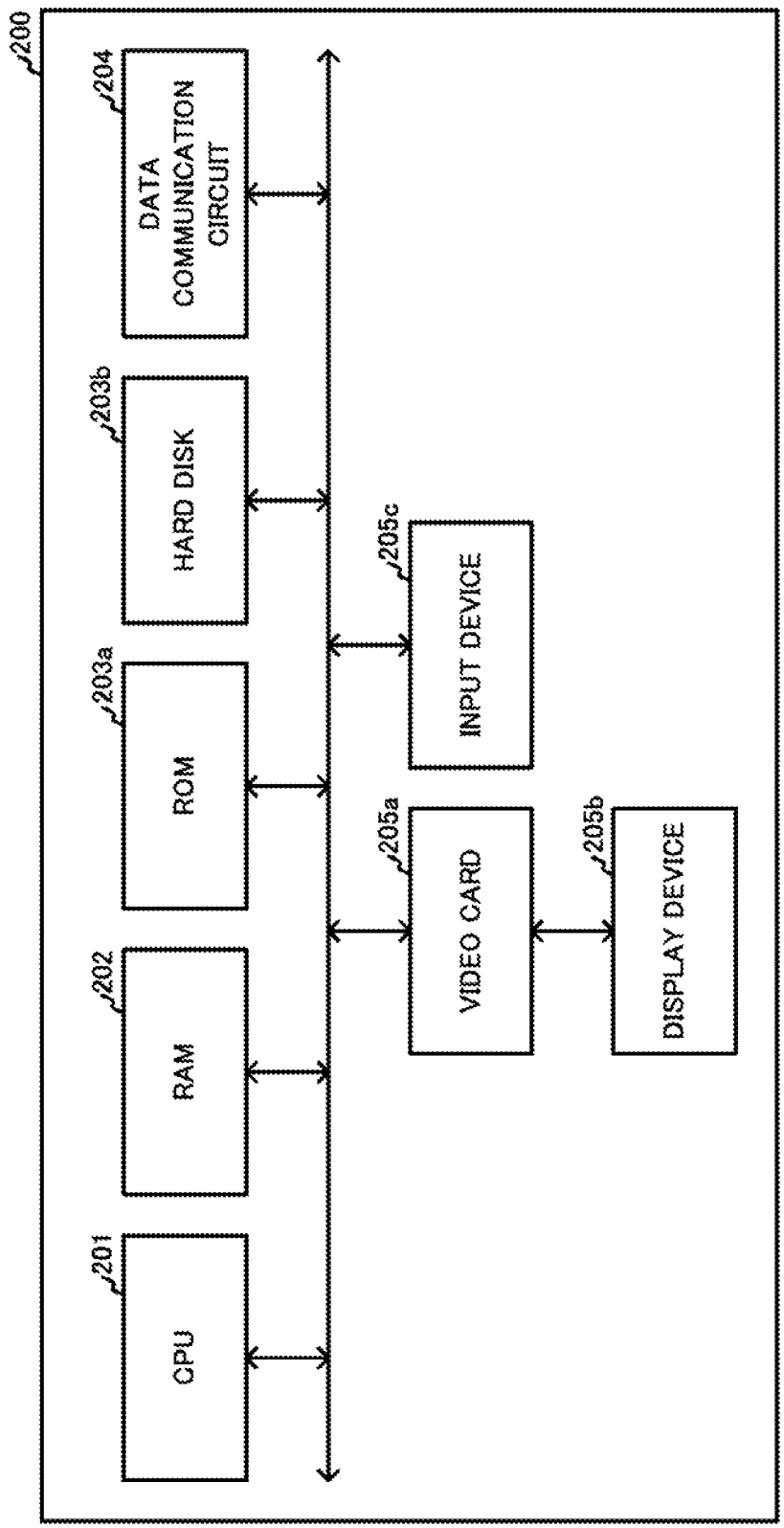
FIG. 3 is a hardware configuration drawing illustrating a configuration example of a control device included in the delivery system.

The control device 200 is a server machine, and as illustrated in FIG. 3, includes a CPU 201, a RAM 202, a ROM 203a, a hard disk 203b, a data communication circuit 204, a video card 205a, a display device 205b, and an input device 205c. The configurations and functions of the CPU 201, the RAM 202, the ROM 203a, the video card 205a, the display device 205b, and the input device 205c included in the control device 200 are similar to the configurations and structures of the CPU 101, the RAM 102, the ROM 103a, the video card 105a, the display device 105b, and the input device 105c included in the terminal device 100 illustrated in FIG. 2. The input device 205c may be one or more of a keyboard, a mouse, a touch pad, and a button.

The hard disk 203b included in the control device 200 stores various programs. The hard disk 203b further stores various kinds of data for use in execution of the programs and a table in which data is stored. The control device 200 may include a flash memory instead of the hard disk 203b.

The data communication circuit 204 included in the control device 200 is an NIC, and performs data communication wirelessly with the terminal device 100, the first flying object 500, and the second flying object 600 that are connected to the Internet IN, in accordance with communication standards, such as LTE and 5G.

Figure 4:
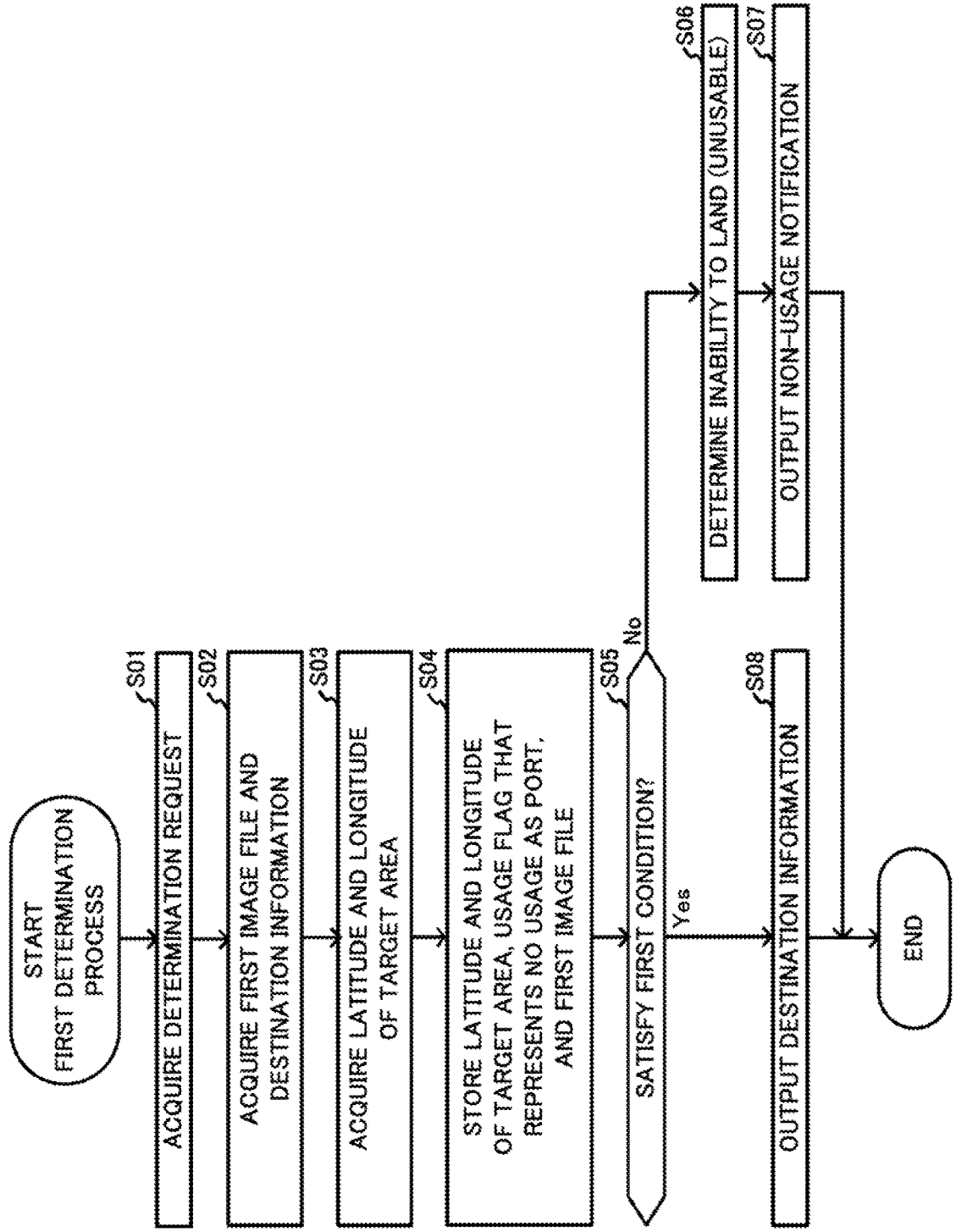
FIG. 4 is a flow chart illustrating an example of a first determination process executed by the control device included in the delivery system.

Upon reception of the determination request together with the first image file and the destination information by the data communication circuit 204 of the control device 200, the CPU 201 of the control device 200 executes a first determination process as illustrated in FIG. 4 for determining, based on the received first image file, whether or not the target area is suitable for landing of the second flying object 600.

Figure 5:
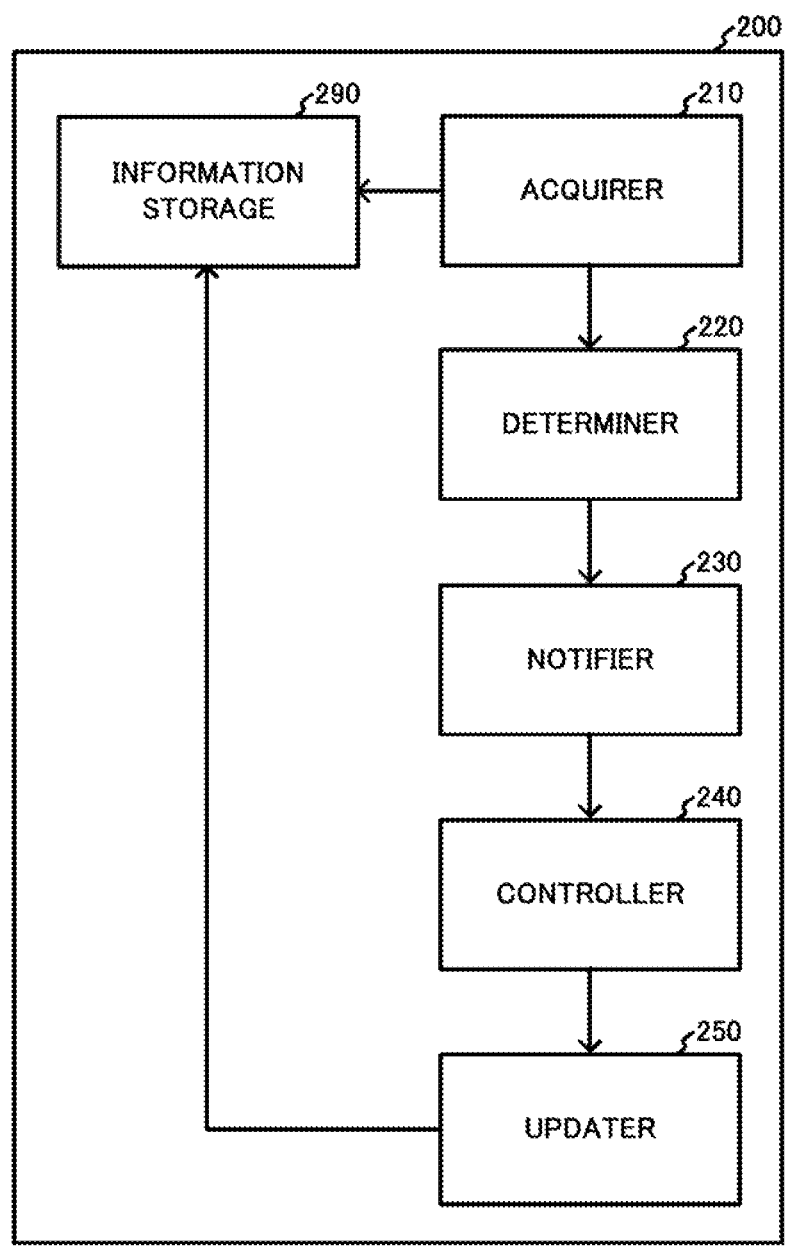
FIG. 5 is a functional block diagram illustrating an example of functions of the control device included in the delivery system.

Thus the CPU 201 functions as an acquirer 210 as illustrated in FIG. 5. The acquirer acquires, from the data communication circuit 204, the determination request as well as the first image file and the destination information together, all of which have been received together. The CPU 201 also functions as a determiner 220 that determines based on the acquired first image file whether or not the target area is suitable for landing of the second flying object 600, and as a notifier 230 that gives notification of a result of the determination by the determiner 220. Upon determination that the target area is suitable for landing of the second flying object 600, the CPU 201 also functions as a controller 240 that performs control to cause a non-illustrated sending system to send to the destination a cover that covers the target area, by outputting the acquired destination information to the sending system.

The hard disk 203b functions as an information storage 290 that stores a port table as illustrated in FIG. 6. The port table stores data relating to the target area. The port table of FIG. 6 stores records. In each record, information that represents latitude and longitude of the target area, a usage flag that indicates whether or not the target area is used as a port, and a file path of a file that represents an image obtained by capturing of an image of the target area are associated with one another and stored in the port table. The file path stored in the port table includes a file path of the first image file.

The information storage 290 further prestores a material table as illustrated in FIG. 7 that prestores data relating to materials that make up a surface of the target area. The material table prestores records. In each record, information that represents types of materials, feature values that characterize texture of the materials of the types, and hardness information that indicates whether or not the materials are sufficiently hard are associated and prestored. In the present embodiment, the texture of materials is described as including homogeneity of visual color or brightness of the surface of materials.

As used in the present embodiment, materials being sufficiently hard means that the materials are hard enough to be suitable for landing of the second flying object 600. Materials being hard enough to be suitable for landing of the second flying object 600 includes the meaning that the materials are hard enough for the second flying body 600 to be able to land on the surface of the target area made up of the materials. The second flying object 600 being able to land in the target area does not simply mean that the second flying object 600 can land in the target area but mean that the second flying object 600 can safely land in the target area. Safe landing of the second flying object 600 in the target area includes the meaning that a probability of tipping over of the second flying object 600 at the time of landing is zero or lower than a predetermined probability.

Thus the materials being sufficiently hard includes the meaning that the materials are hard enough not to cause deformation of the geometry of the surface due to a weight of the second flying object 600 at the time of landing or after landing of the second flying object 600 on a surface of the target area made up of the materials; or even if the deformation occurs, the materials are hard enough to keep a probability of tipping over of the second flying object 600 lower than a predetermined probability; or even if the geometry of the surface changes, the materials are so hard that there is no probability of tipping over of the second flying object 600.

Upon start of execution of the first determination process illustrated in FIG. 4, the acquirer 210 acquires the received determination request and the first image file and the destination information together from the data communication circuit 204 (step S01 and step S02). Then the acquirer 210 acquires, from the tag of the acquired first image file, information that represents latitude and longitude of the target area (step S03).

Then the acquirer 210 stores the first image file in the information storage 290 and acquires a file path of the stored first image file. Then the acquirer 210 associates and stores, in a port table of FIG. 6, information that represents latitude and longitude of the target area, the usage flag that represents that the target area is not used as a port, and a file path of the first image file (step S04). One of the reasons that the acquirer 210 stores the usage flag representing that the target area is not used as a port is because a determination as to whether or not the target area is used has not been made.

Next, the determiner 220 detects, from the first image represented by the first image file, one or more groups of pixels that have a smaller difference between pixel values than a predetermined difference and adjoin one another, and specifies, as an image area corresponding the surface of the target area, a group of pixels that has the largest area among the detected one or more groups of pixels. Then the determiner 220 calculates, based on a pixel value included in the specified image area, a feature value that characterizes texture of the surface of the target area corresponding to the image area. The feature value may be, for example, an average value or a variance value of the pixel values included in the image area.

Then the determiner 220 acquires, from the material table illustrated in FIG. 7, hardness information associated with the feature value that is the same or the closest to the calculated feature value, and determines, based on the acquired hardness information, whether or not a first condition that the surface is suitable for landing of the second flying object 600 is satisfied (step S05).

When the acquired hardness information indicates that the materials are not sufficiently hard, the determiner 220 determines that the hardness of the surface of the target area made up of the materials is not suitable for landing of the second flying object 600 and the surface does not satisfy the first condition (No in step S05). Then the determiner 220 determines that the second flying object 600 cannot land in the target area and the target area is unusable for a predetermined purpose of using it as a port (step S06). Thus the determiner 220 determines the target area not to be used as a port.

Then the notifier 230 generates non-usage notification for notifying that the target area is not used as a port and the surface of the target area is too soft to be suitable for landing of the second flying object 600. Then the notifier 230 outputs, specifying the terminal device 100 as a destination, the generated non-usage notification to the data communication circuit 204 of FIG. 3 (step S07), and ends execution of the first determination process.

Upon reception of the non-usage notification by the data communication circuit 104a of the terminal device 100, the CPU 101 of the terminal device 100 causes the display device 105b to display the non-usage notification. The administrator having visually confirmed the non-usage notification retries to determine, as a target area, an area whose materials are harder, and then performs a request operation to the terminal device 100 again.

In step S05, when the acquired hardness information represents that the materials are sufficiently hard, the determiner 220 determines that the hardness of the surface of the target area made up of the materials are suitable for landing of the second flying object 600 and thus the surface satisfies the first condition (Yes in step S05).

Next, the controller 240 outputs, specifying the non-illustrated sending system as a destination, the destination information acquired in step S02 to the data communication circuit 204 illustrated in FIG. 3 (step S08). Then the controller 240 control the non-illustrated sending system to send a cover to the destination, and then ends execution of the first determination process.

The non-illustrated sending system is installed in a warehouse storing covers that are vinyl sheets, and includes a non-illustrated server and a non-illustrated printer connected to the server. Upon reception of the destination information, the non-illustrated server outputs the destination information to a printer. The non-illustrated printer prints the destination on a slip based on the input destination information.

The non-illustrated server outputs to the printer a message to prompt installation of the delivered cover in the target area with the cover fully spread out there and sending of the image obtained by capturing of an image of the installed cover. The non-illustrated printer prints the input message on the slip with the destination printed thereon.

Then an employee working at the warehouse attaches the slip to the cover and gives the cover with the slip attached thereto over a delivery service provider. Then the delivery service provider delivers the cover to a destination printed on the slip, for example, by truck, motorcycle, bike, or walk.

The administrator having received the cover from the delivery service provider and visually confirmed the message printed on the slip installs a square-shaped cover over the surface of the target area, with a face of the cover having a design thereon facing up. Then the administrator fixes the cover to the target area by piercing the cover with anchor pins at four corners of the cover. Then the administrator performs an image capturing operation to the input device 105c after directing an optical axis of the digital camera 107 included in the terminal device 100 to the cover.

Upon input of the signal corresponding to the image capturing operation by the input device 105c of the terminal device 100, the CPU 101 acquires from the digital camera 107 a signal that represents a second image that is an image obtained by capturing of an image of the cover, and generates a second image file based on the acquired signal. Then the CPU 101 acquires the signal output by the GPS circuit 106, and stores, in a tag of the second image file as information that represents latitude and longitude of the target area, information that represents latitude and longitude indicated by the acquired signal. Then the CPU 101 generates an installation report that reports completion of covering the target area with the cover, and outputs, specifying the control device 200 as a destination, the generated installation report together with the second image file to the data communication circuit 104a.

Figure 8:
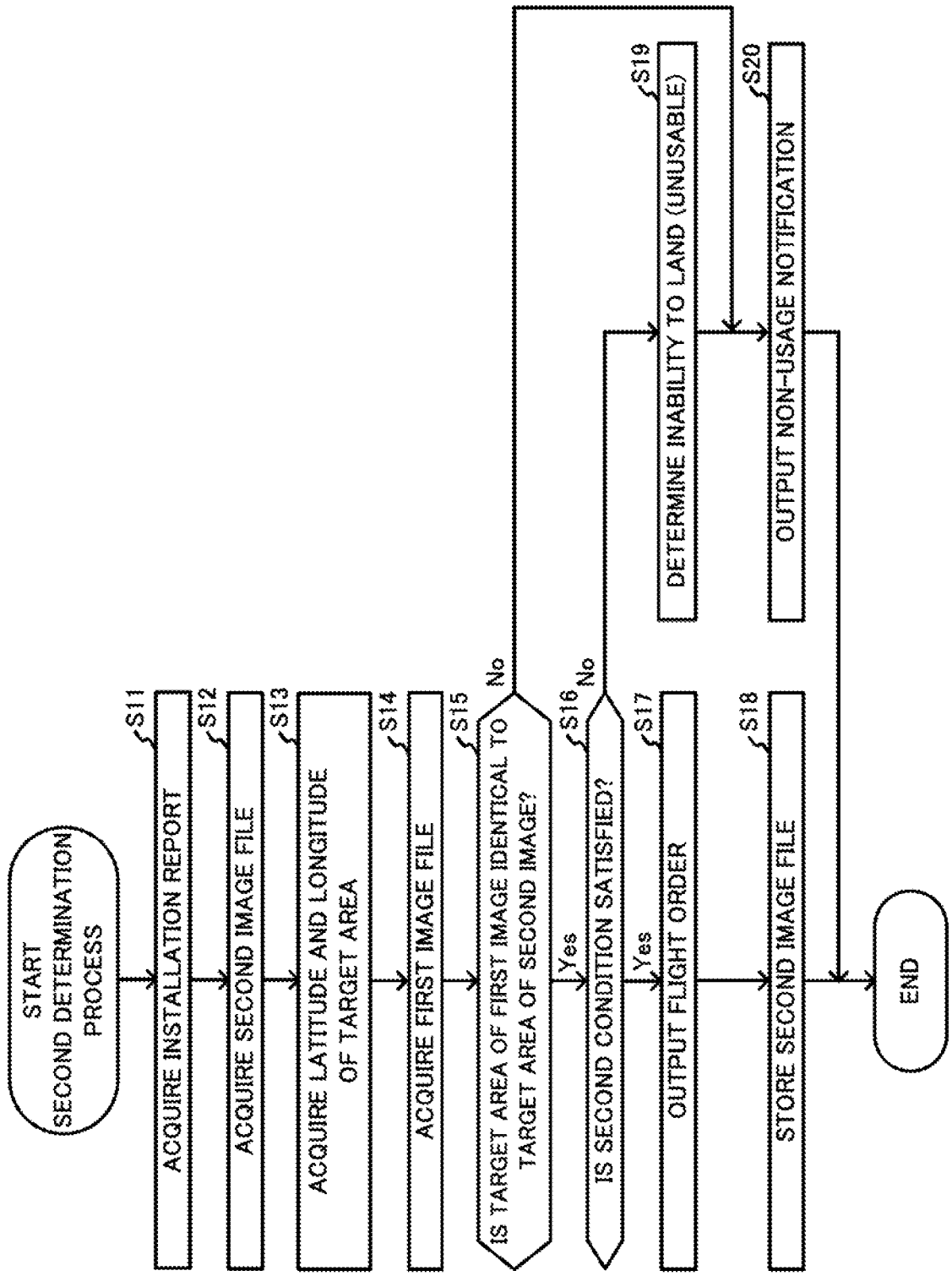
FIG. 8 is a flow chart illustrating an example of a second determination process executable by the control device included in the delivery system.

Upon reception of the installation report together with the second image file by the data communication circuit 204 of the control device 200, the CPU 201 of the control device 200 executes a second determination process as illustrated in FIG. 8 for determining based on the received second image file whether or not the target area is suitable for landing of the second flying object 600. Thus the CPU 201 of the control device 200 illustrated in FIG. 3 further functions as an updater 250 that updates a port table illustrated in FIG. 6 in accordance with the determination.

Upon start of execution of the second determination process illustrated in FIG. 8, processing similar to steps S01 to S03 of FIG. 4 is executed (steps S11 to S13). Thus the acquirer 210 acquires the installation report and the second image file together, and acquires information that represents latitude and longitude of the target area stored in the acquired second image file.

Next, the acquirer 210 acquires, from the port table of FIG. 6, the file path of the first image file associated with information that represents the acquired latitude and longitude of the target area, and acquires the first image file based on the acquired file path (step S14).

Then the determiner 220 calculates, for example, using the Harris corner detection method, a first corner feature amount and a second corner feature amount. Here, the first corner feature amount is a corner feature amount that characterizes the first image represented by the first file, and the second corner feature amount is a corner feature amount of the second image represented by the second image file.

Then the determiner 220 determines an image coordinate system defined by an X axis and a Y axis, taking one of apexes included in the first image as the origin. The X axis takes a main scan direction as a positive direction and the Y axis takes a sub-scan direction as a positive direction. Then the determiner 220 divides the first image into m image areas having the same shapes with one another, where m is an integer equal to or greater than 1, and extracts as a first feature point a point having a largest first corner feature amount at each of the m image areas. Then the determiner 220 specifies a coordinate value in the image coordinate system for the extracted m first feature points.

Similarly, the determiner 220 determines an image coordinate system of the second image, and divides the second image into m image areas and extracts, as a second feature point, a point having a largest second corner feature amount at each of the m image areas. Then the determiner 220 specifies a coordinate value in the image coordinate system for the extracted m second feature points.

Next, the determiner 220 generates N transform matrixes that are combinations of a rotation matrix, a translation matrix, and a scaling matrix, where N is an integer equal to or greater than 1, and transforms coordinate values of the m second feature points by the first transform matrix.

The rotation matrix used by the determiner 220 is a matrix by which the m second feature points are rotated by a predetermined angle around the origin. The translation matrix is a matrix that translates the m second feature points by addition or subtraction of a predetermined value to or from each of an X-coordinate value and a Y-coordinate value of the m second feature points. The scaling matrix is a matrix that makes a distance between the m second feature points longer or shorter in the X-axis direction or the Y-axis direction by multiplying each of the X-coordinate values or the Y-coordinate values of the m second feature points by a predetermined scaling factor.

Then, for each of the m first feature points, the determiner 220 detects, as a corresponding point, the transformed second feature point having the transformed coordinate value that is the same as that of the corresponding first feature point or the transformed second feature point which is distanced from the corresponding first feature point by a distance that is shorter than a predetermined distance. The determiner 220 then counts a total number of the detected corresponding points.

The determiner 220 transforms the pre-transformed coordinate values of the m second feature points using the second to the Nth transform matrix and counts a total number of corresponding points based on the transformed coordinate values. Then the determiner 220 divides by the total number of the image areas the maximum value of the corresponding points counted N times, and takes the calculated value as a correspondence ratio of the m first feature points to the m second feature points.

Then, upon determination that the calculated correspondence ratio is greater than a predetermined ratio, the determiner 220 determines that the target area whose surface is imaged to obtain the first image is identical to the target area whose surface is covered with the cover imaged to obtain the second image (Yes in step S15).

One of the reasons that such determination is made by the determiner 220 is because the surface of the cover in intimate contact with the surface of the target area often has an appearance with characteristics corresponding to those of the surface of the target area. For example, in a case in which small stones or dropped tree branches on the surface of the target area are features that characterizes the surface of the target area, the surface of the cover has unevenness caused due to the small stones or the tree branches, and thus the unevenness are features that characterizes the surface of the target area.

Another reason that such determination is made by the determiner 220 is because there are often cases in which not only the cover but also a portion of the surface not covered therewith are imaged to obtain the second image and a portion of the target area corresponding to the not-covered portion is imaged to obtain the first image. In other words, such determination can be made that when the first image and the second image have corresponding feature points of the not-covered portion of the surface, the target area of the first image that is an image before the surface is covered with the cover is the same as the target area of the second image that is an image after the surface is covered with the cover.

Next, the determiner 220 acquires, from the information storage 290, information that represents a predetermined range as a range of the pixel values that represent the cover. Then the determiner 220 detects from the second image a group of pixels that have pixel values included in the range represented by the acquired information and adjoin one another, and specifies the detected group of pixels as an image area corresponding to the cover.

Then the determiner 220 specifies the shape of the image area corresponding to the cover, and determines based on the specified shape whether or not a second condition that the cover is fully spread out is satisfied (step S16). At this time, upon determination that the cover satisfies the second condition because the image area corresponding to the cover has a square shape (Yes in step S16), the determiner 220 determines that the target area has a sufficiently large area.

One of the reasons that such determination on the second condition is made by the determiner 220 is because since the cover has a square shape, the shape of the image area corresponding to the cover also has a square shape when the cover is in a fully spread-out state. One of the reasons that such determination on the area of the target area is made by the determiner 220 is because since the cover is designed to have a sufficiently large area, the area of the target area in which the cover is installed fully stretched out can be determined to be sufficiently large.

As used in the present embodiment, the target area having a sufficiently large area means that the target area has an area large enough to be suitable to landing of the second flying object 600. The target area having an area large enough to be suitable for landing of the second flying object 600 means that the target area is large enough for the second flying object 600 to land safely in the target area. The target area being large enough for the second flying object 600 to land safely in the target area means that, for example, a contact probability and an out-of-range probability are lower than predetermined probabilities. Here, the contact probability is a probability that the second flying object 600 makes contact with an enclosure or a wall that surrounds the target area. The out-of-range probability is a probability that the second flying object 600 exists partially or wholly in an area adjoining the target area.

Thus the phrase "the target area has a sufficiently large area" means that the area is large enough for the contact probability and the out-of-range probability when the second flying object 600 lands in the target area or after the landing to be zero or lower than the predetermined probabilities.

In step S16, upon determination that the target area is sufficiently large since the cover satisfies the second condition (Yes in step S16), the controller 240 generates a flight order. The flight order includes information that represents latitude and longitude of the target area and is an order for ordering a flight to the target area. Then the controller 240 outputs, specifying the first flying object 500 as a destination, the generated flight order to the data communication circuit 204 (step S17).

Next, the updater 250 stores the second image file in the information storage 290 (step S18) and acquires a file path of the stored second image file. Then the updater 250 updates, with the acquired file path of the second image file, a file path stored in the port table of FIG. 6, associated with the information that represents the latitude and longitude of the target area, and then ends execution of the second determination process. One of the reasons that the updater 250 updates the port table with the file path of the second image file is for preparation of determination as to whether or not the arrival area of the first flying object 500 is the same as the target area represented by the second image file.

In step S16, upon determination that the cover does not satisfy the second condition (No in step S16), the determiner 220 determines that the target area is not large enough for a cover to be fully spread out. Thus the determiner 220 determines that the second flying object 600 cannot land in the target area and the target area is unusable for a predetermined purpose that the target area is used as a port (step S19). Then the determiner 220 determines that the target area is not used as a port.

Next, the notifier 230 generates non-usage notification for notifying that the target area is not used as a port and the area of the target area is too small to be suitable for landing of the second flying object 600. Then the notifier 230 outputs, specifying the terminal device 100 as a destination, the generated non-usage notification to the data communication circuit 204 of FIG. 3 (step S20), and then ends execution of the second determination process.

Upon reception of the non-usage notification by the data communication circuit 104*a* of the terminal device 100, the CPU 101 of the terminal device 100 causes the display device 105*b* to display the non-usage notification. The administrator having visually confirmed the non-usage notification retries to determine a larger area as the target area, and performs a request operation to the terminal device 100 again.

In step S15, upon determination that the calculated correspondence ratio is equal to or less than a predetermined ratio, the determiner 220 determines that the target area whose surface is imaged to obtain the first image differs from the target area whose surface is covered with the cover imaged to obtain the second image (No in step S15). Then the notifier 230 generates non-usage notification that includes the first image file and notifies that the target area of the first image differs from the target area of the second image and neither of the target areas is used as a port. Then the notifier 230 outputs, specifying the terminal device 100 as a destination, the generated non-usage notification to the data communication circuit 204 (step S20), and then ends execution of the second determination process.

Upon reception of the non-usage notification, the terminal device 100 displays on the display device 105*b* the non-usage notification and the first image represented by the first image file. The administrator having visually confirmed the display device 105*b* retries to install the cover in the target area whose surface is imaged to obtain the first image, and then performs an image capturing operation again by directing an optical axis of a lens 107*a* of the digital camera 107 to the cover.

Figure 9:
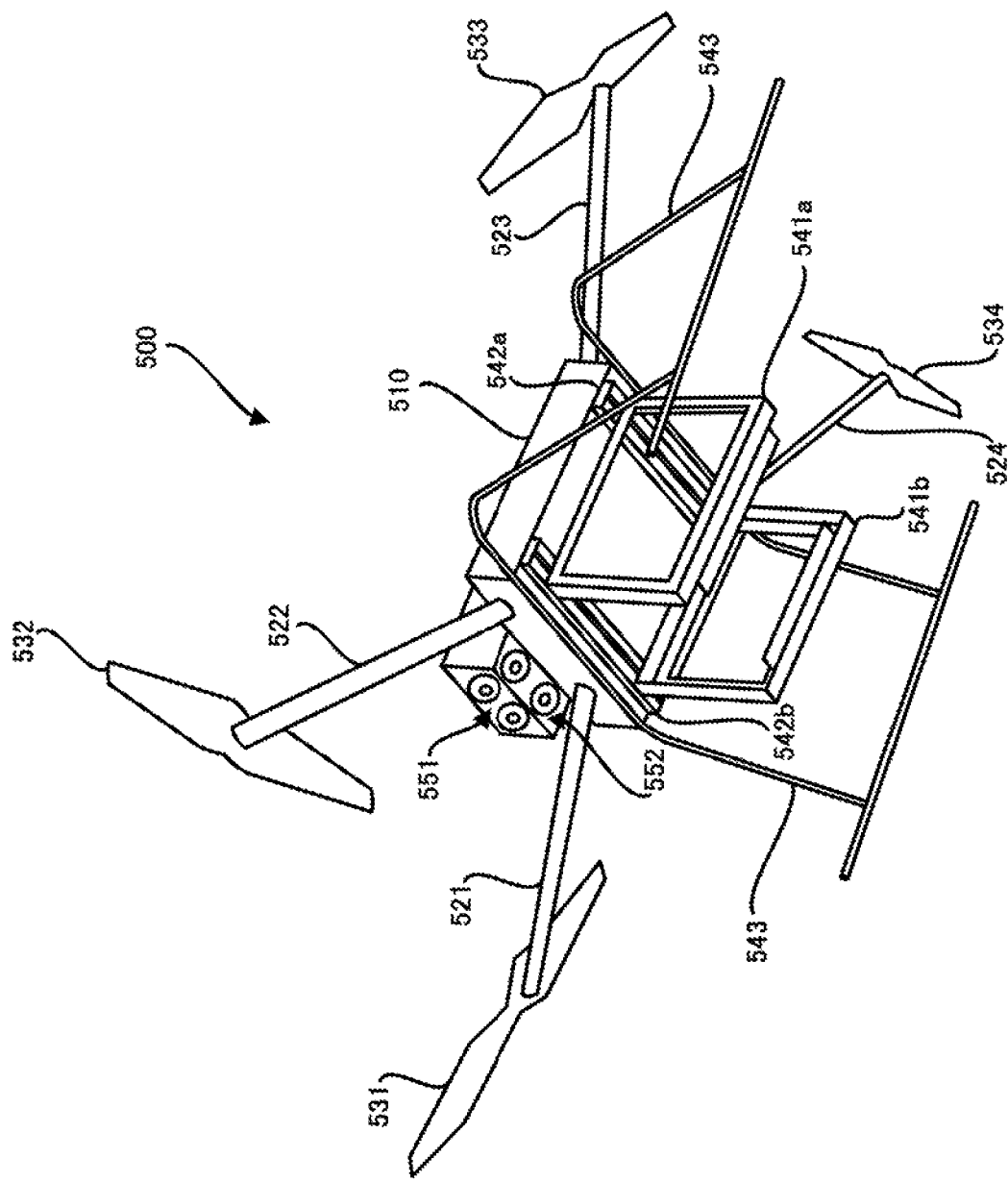
FIG. 9 is an appearance configuration drawing illustrating an appearance example of a first flying object.

The first flying object 500 is an unmanned aerial vehicle, and includes a control device 510. The control device 510 has a rectangular parallelepiped shape as illustrated in FIG. 9, and controls an attitude and flight of the first flying object 500. The first flying object 500 includes propeller arms 521 and 522 protruding from the front side of the control device 510 toward right and left in the front, respectively, and propeller arms 523 and 524 protruding from the rear side of the control device 510 toward left and right in the rear, respectively. The first flying object 500 further includes propellers 531 to 534 disposed at tips of their corresponding propeller arms 521 to 524, and a non-illustrated motor that rotates the propellers 531 to 534 in accordance with control of the control device 510.

The first flying object 500 includes a first holding frame 541*a* and a second holding frame 541 under the control device 510. The first holding frame 541*a* holds four edges of one side face of a rectangular parallelepiped shaped cardboard box that packs an article. The second holding frame 541*b* holds four edges of another side face of the cardboard box opposing to the side face held by the first holding frame 541*a*. The side face held by the first holding frame 541*a* is hereinafter referred to as a first held face and the side face held by the second holding frame 541*b* is hereinafter referred to as a second held face. The first flying object 500 further includes guide rails 542*a* and 542*b* on the underside of the control device 510. The guide rails 542*a* and 542*b* extend in a direction normal to the first held face and the second held face of the article, and hang the first holding frame 541*a* and the second holding frame 541*b* and have an extension direction that is a translation direction of the first holding frame 541*a* and the second holding frame 541*b*.

The first flying object 500 further includes a non-illustrated motor that drives, in accordance with control of the control device 510, the first holding frame 541*a* and the second holding frame 541*b* to translate in a direction approaching to each other such that the article is held by the first holding frame 541*a* and the second holding frame 541*b*. This non-illustrated motor drives, in accordance with control of the control device 510, the first holding frame 541*a* and the second holding frame 541*b* to translate in a direction away from each other such that the held article is released from the first holding frame 541*a* and the second holding frame 541*b*.

The first flying object 500 further includes support legs 543 that protrude from the underside of the control device 510 downwardly and support the control device 510. The support legs 543 are designed to have vertical lengths longer by a predetermined length than the vertical lengths of the first holding frame 541*a* and the second holding frame 541*b*. One of the reasons for such designing of the support legs 543 is for preventing the first holding frame 541*a* and the second holding frame 541*b* as well as the article held by the first holding frame 541*a* and the second holding frame 541*b* from crashing on the ground or a floor of the landing point at the time of landing of the first flying object 500.

The first flying object 500 further includes an image capturing device 551 disposed on the upside of the control device 510 and having an optical axis directed forward of the flying object 500. As used herein, it is described that directing the optical axis of the image capturing device, for example, the image capturing device 551 or the like, in a particular direction, for example, forward of the first flying object 500 or the like, may include changing the optical axis such that at least a portion of the subject in the particular direction is included in a coverage of the image capturing device.

The image capturing device 551 is a digital stereo camera, and captures an image in accordance with a signal output by the control device 510 and outputs to the control device 510 data that represents two images having parallax relative to each other and obtained by image capturing.

One of the reasons that the image capturing device 551 outputs, to the control device 510, the two images obtained by capturing an image forward of the first flying object 500 is because the control device 510 determines, based on the parallax, location coordinates, a size, and the like in the three dimensional space of an obstacle forward of the first flying object 500.

The first flying object 500 further includes a sensing device 552 that optically senses an object located below the first flying object 500 and outputs sensing data obtained by sensing. Optically sensing an object includes the meaning detecting light emitted from the object or reflected on the object.

In the present embodiment, the sensing device 552 is described as a device that is a digital stereo camera with an optical axis directed vertically downward of the first flying object 500 and optically senses the object by image capturing of the object and outputs data that represents an image of the object as sensing data. The sensing device 552 captures an image in accordance with a signal output by the control device 510 and outputs, to the control device 510, data that represents two images having parallax relative to each other and obtained by image capturing. One of the reasons that the sensing device 552 outputs, to the control device 510, the two images obtained by capturing a vertically downward image is because the control device 510 determines, based on the parallax, an altitude that is a distance from the first flying object 500 to the ground or the floor.

Figure 10:
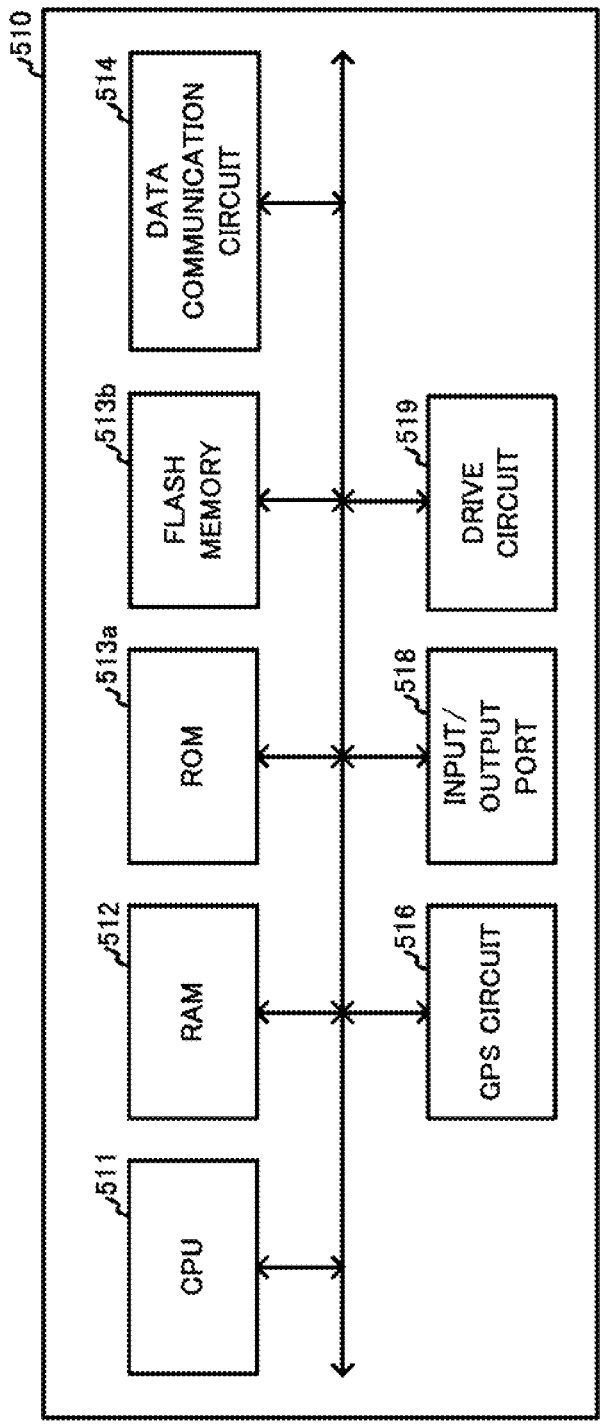
FIG. 10 is a hardware configuration drawing illustrating a configuration example of the control device included in the first flying object.

As illustrated in FIG. 10, the control device 510 includes a CPU 511, a RAM 512, a ROM 513a, a flash memory 513b, a data communication circuit 514, a GPS circuit 516, an input/output port 518, and a drive circuit 519.

The configurations and functions of the CPU 511, the RAM 512, the ROM 513a, the flash memory 513b, and the GPS circuit 516 of the control device 510 included in the first flying object 500 are similar to the configurations and structure of the CPU 101, the RAM 102, the ROM 103a, the flash memory 103b, and the GPS circuit 106 included in the terminal device 100 illustrated in FIG. 2.

The data communication circuit 514 is the NIC, and performs data communication wirelessly with the control device 200 connected via the Internet IN, in accordance with communication standards, such as LTE and 5G.

The input/output port 518 is connected to a non-illustrated cable that is connected to each of the image capturing device 551 and the sensing device 552 illustrated in FIG. 9. The input/output port 518 outputs a signal output by the CPU 511 to each of the image capturing device 551 and the sensing device 552, and inputs to the CPU 511 the image output by each of the image capturing device 551 and the sensing device 552.

The drive circuit 519 is connected to a non-illustrated cable that is connected to each of non-illustrated motors that rotate propellers 531 to 534 illustrated in FIG. 9 and a cable connected to a non-illustrated motor that translates the first holding frame 541a and the second holding frame 541b. The drive circuit 519 drives, in accordance with signals output by the CPU 511, the non-illustrated motors that rotate the propellers 531 to 534 and the non-illustrated motor that translates the first holding frame 541a and the second holding frame 541b.

Figure 11:
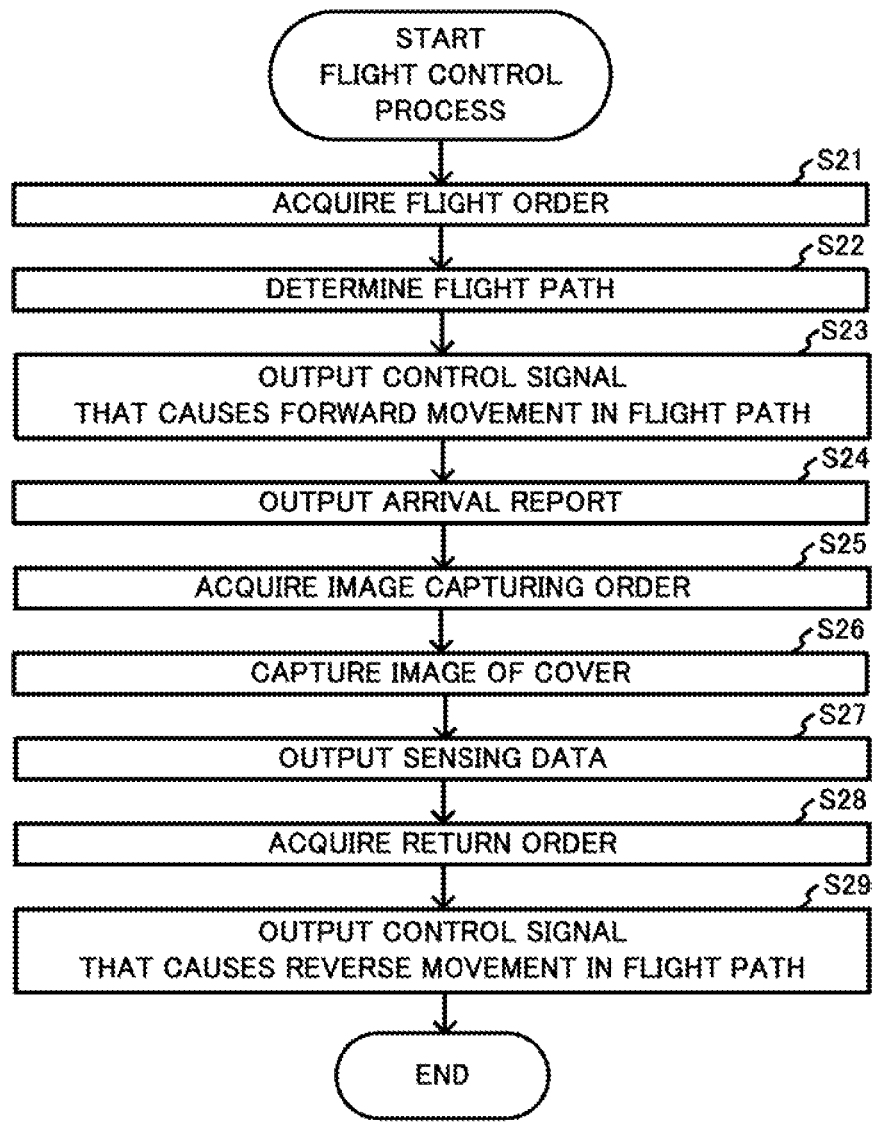
FIG. 11 is a flow chart illustrating an example of a flight control process executable by the first flying object.

Upon reception of a flight order that orders a flight to the target area by the data communication circuit 514 of the first flying object 500, the CPU 511 of the first flying object 500 executes a flight control process as illustrated in FIG. 11 for controlling, for flight in accordance with the flight order, the non-illustrated motors that rotate the propellers 531 to 534.

Upon start of execution of the flight control process, the CPU 511 of the first flying object 500 acquires the flight order from the data communication circuit 514 (step S21), and acquires information that represents latitude and longitude of the target area included in the acquired flight order. Then the CPU 511 of the first flying object 500 specifies latitude and longitude of the first flying object 500 based on the signal output by the GPS circuit 516.

Then the CPU 511 of the first flying object 500 reads records from a non-illustrated partial path table that prestores information relating to a partial path in which the first flying object 500 can move, for example, a road, a river, and the like. The partial path table is prestored in the flash memory 513b, and in each record of the partial path table, latitude and longitude of a start node of the partial path, latitude and longitude of an end node of the partial path, and a length of an edge of the partial path are associated and prestored.

The CPU 511 of the first flying object 500 executes a path search algorithm such as Dijkstra's algorithm, using the specified latitude and longitude of the first flying object 500, a length of the edge that is the partial path and the latitude and the longitude of the node stored in each of the read records, and latitude and longitude of the target area. The CPU 511 thereby calculates a whole shortest path from the office where the first flying object 500 is located to the target area for which use as a port is requested, and determines the calculated whole path as a flight path (step S22).

Next, for forward movement of the first flying object 500 in the flight path, the CPU 511 of the first flying object 500 acquires a signal from the GPS circuit 516, and generates a control signal for flight that achieves reduction in a difference between latitude and longitude of the first flying object 500 represented by the acquired signal and latitude and longitude of a node that is the nearest among one or more non-passed nodes included in the flight path. The CPU 511 outputs the generated control signal to the drive circuit 519 that drives the non-illustrated motors that rotate the propellers 531 to 534 (step S23). Then while a non-passed node exists, the CPU 511 of the first flying object 500 repeats the above process starting from acquisition of a signal from the GPS circuit 516.

Then the CPU 511 of the first flying object 500 determines that when the non-passed node doesn't exist, the first flying object 500 arrives the target area. Next the CPU 511 generates an arrival report that includes information representing latitude and longitude of the target area and reports that the first flying object 500 has arrived at the target area, and outputs, specifying the control device 200 as a destination, the generated arrival report to the data communication circuit 514 (step S24).

The data communication circuit 514 of the first flying object 500 transmits the output arrival report to the control device 200. Then the data communication circuit 514 of the first flying object 500 receives from the control device 200 an image capturing order that orders capturing of an image of the cover after wind is blowing down from the first flying object 500 to the cover. This wind is simulated one blown down from the second flying object 600 to the cover at the time of landing of the second flying object 600. One of the reasons that the control device 200 sends such an image capturing order to the first flying object 500 is because whether or not the cover is sufficiently fastened is determined based on the image obtained by image capturing by the first flying object 500. In the present embodiment, the cover being sufficiently fastened includes the meaning that the cover is fastened to the surface of the target area firmly enough not to curl up even if the cover undergoes wind occurring due to landing of the second flying object 600.

Upon reception of the image capturing order by the data communication circuit 514 of the first flying object 500, the CPU 511 of the first flying object 500 acquires the image capturing order from the data communication circuit 514 (step S25), and in accordance with the acquired image capturing order, reads from the flash memory 513b information that represents a predetermined minimum altitude L that is the lowest altitude at which the first flying object 500 can fly. Then the CPU 511 generates a control signal for hovering flight or circular flight at the minimum altitude L above the target area, and outputs the generated control signal to the drive circuit 519. One of the reasons that the CPU 511 outputs the control signal for flight at the minimum altitude L is for generating wind that simulates the wind to be blown down from the second flying object 600 to the cover at the time of landing of the second flying object 600 to the target area.

Then the CPU 511 of the first flying object 500 reads from the flash memory 513b information that represents a predetermined altitude H. The predetermined altitude H is a minimum value of an altitude at which the entire cover that covers the target area is included in an angle of view of the sensing device 552 of the first flying object 500 with the optical axis directed vertically downward of the first flying object 500. Then the CPU 511 generates a control signal for hovering flight or circular flight at the altitude H above the target area, and outputs the generated control signal to the drive circuit 519.

The CPU 511 of the first flying object 500 outputs a signal for ordering image capturing to the sensing device 552 with the optical axis directed vertically downward of the first flying object 500, thereby causing the sensing device 552 to capture an image of the cover that has undergone blowing down of wind simulating the wind that would occur at the time of landing of the second flying object 600 (step S26). Then the CPU 511 of the first flying object 500 acquires, from the sensing device 552, sensing data that represents a target area image (hereinafter referred to as a third image) that is an image obtained by capturing an image of the cover that covers the target area, and outputs, specifying the control device 200 as a destination, the acquired sensing data to the data communication circuit 514 (step S27).

Then, upon the data communication circuit 514 of the first flying object 500 receiving from the control device 200 the return order for ordering return to the office, the CPU 511 of the first flying object 500 acquires the return order from the data communication circuit 514 (step S28). Then the CPU 511 outputs to the drive circuit 519 a control signal for returning to the office by reverse movement in the flight path in accordance with the acquired return order (step S29), and then ends execution of the flight control process.

Figure 12:
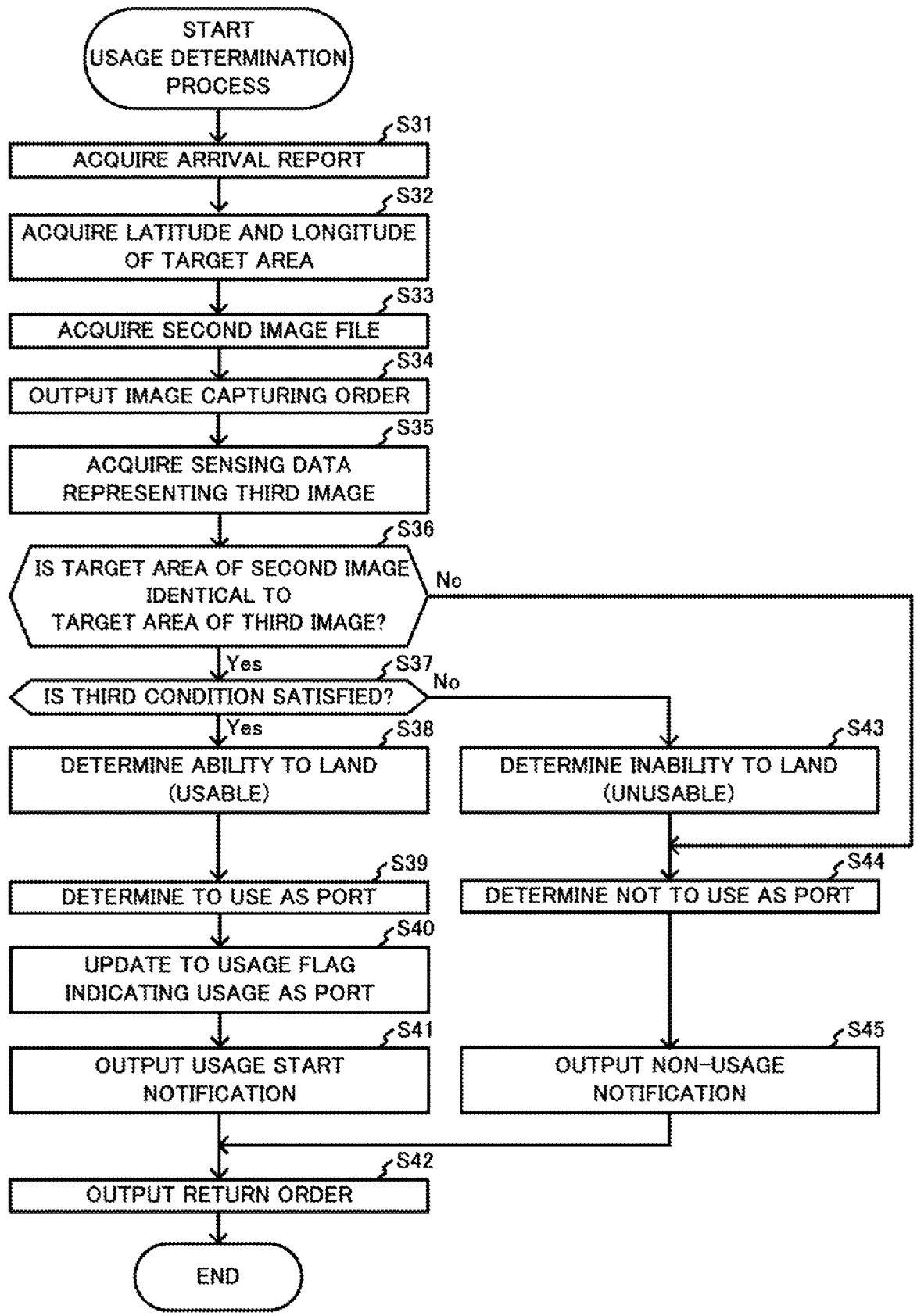
FIG. 12 is a flow chart illustrating an example of a usage determination process executable by the control device included in the delivery system according to Embodiment 1.

When the data communication circuit 204 of the control device 200 illustrated in FIG. 3 receives the arrival report output in step S24 of FIG. 11, the CPU 201 of the control device 200 performs a usage determination process as illustrated in FIG. 12 for determining whether or not the target area where the first flying object 500 has arrived is used as a port.

Upon start of execution of the usage determination process of FIG. 12, the acquirer 210 of the control device 200 acquires the arrival report from the data communication circuit 204 (step S31), and acquires, from the acquired arrival report, information that represents latitude and longitude of the target area where the first flying object 500 has arrived (step S32).

Then the acquirer 210 acquires, from the port table of FIG. 6, the file path of the second image file associated with the information representing latitude and longitude of the target area, and acquires the second image file based on the acquired file path (step S33).

Then the controller 240 of the control device 200 outputs, specifying the first flying object 500 as a destination, the image capturing order to the data communication circuit 204 (step S34). Upon reception of the sensing data representing the third image from the first flying object 500 by the data communication circuit 204 of the control device 200 after transmitting of the image capturing order to the first flying object 500, the acquirer 210 of the control device 200 acquires the sensing data from the data communication circuit 204 (step S35).

Then the determiner 220 executes processing similar to step S15 of FIG. 8, and thereby calculates the second corner feature amount that characterizes the second image represented by the second image file and the third corner feature amount that characterizes the third image represented by the sensing data. The determiner 220 extracts m second feature points from the second image based on the second corner feature amounts and extracts m third feature points from the third image based on the third corner feature amount, and calculates a correspondence ratio of the m second feature points to the m third feature points.

Next, upon determination that the calculated correspondence ratio is greater than a predetermined ratio, the determiner 220 determines that the target area whose surface is covered with the cover imaged to obtain the second image is identical to the target area whose surface is covered with the cover imaged to obtain the third image (Yes in step S36).

Then the determiner 220 extracts from the third image an image area corresponding to the cover by executing processing similar to step S16 of FIG. 8. Then the determiner 220 specifies the shape of the image area corresponding to the cover, and determines based on the specified shape whether or not a third condition that the cover is sufficiently fastened is satisfied (step S37).

In step S37, upon determination that the image area corresponding to the cover has a square shape, the determiner 220 determines that the third condition is satisfied (Yes in step S37). One of the reasons that such determination is made by the determiner 220 is because since the cover is fully spread out when the image area of the third image corresponding to the cover has a square shape, determination can be made that the cover is not curled even after having caught wind simulating wind that would occur at the time of landing of the second flying object 600.

Then the determiner 220 determines that the second flying object 600 can land in the target area and the target area can be used for a predetermined purpose that the target area is usable as a port (step S38). The determiner 220 also determines usage of the target area as a port (step S39).

Then the updater 250 updates the usage flag associated with the information representing latitude and longitude of the target area acquired in step S32 in the port table of FIG. 6 to the usage flag indicating that the target area is used as a port (step S40).

Then the notifier 230 generates start notification for notifying start to use the target area as a port, and outputs, specifying the terminal device 100 as a destination, the generated usage start notification to the data communication circuit 204 of FIG. 3 (step S41) Upon reception of the usage start notification by the data communication circuit 104a of the terminal device 100 illustrated in FIG. 2, the CPU 101 of the terminal device 100 controls the display device 105b to display the usage start notification.

Then the controller 240 outputs, specifying the first flying object 500 as a destination, a return order to order return to the office to the data communication circuit 204 (step S42), and then ends execution of the usage determination process.

Upon determination that the cover does not satisfy the third condition in step S37 (No in steps S37), the determiner 220 determines that the second flying object 600 cannot land in the target area and the target area is unusable for a predetermined purpose that the target area is used as a port (step S43). The determiner 220 also determines that the target area not to be used as a port (step S44).

Then the updater 250 does not update the port table of FIG. 6, and the notifier 230 generates non-usage notification for notifying that the target area is not used as a port and the cover is not sufficiently fastened. Then the notifier 230 outputs, specifying the terminal device 100 as a destination, the generated non-usage notification to the data communication circuit 204 of FIG. 3 (step S45). Upon reception of the non-usage notification, the terminal device 100 displays the non-usage notification on the display device 105b. The administrator having visually confirmed the non-usage notification retries to fasten the cover on the target area, and then performs an image capturing operation again, with an optical axis of the lens 107a of the digital camera 107 directed toward the cover.

Upon determination that the calculated correspondence ratio is equal to or less than the predetermined ratio in step S36, the determiner 220 determines that the target area covered with the cover imaged to obtain the second image differs from the target area covered with the cover imaged to obtain the third image (No in step S36). Then the determiner 220 determines the target area not to be used as a port (step S44).

Then the notifier 230 generates non-usage notification that includes the second image file and notifies that the target area imaged to obtain the second image is not used as a port and the target area does not exist at the latitude and longitude stored in the second image file. Then the notifier 230 outputs, specifying the terminal device 100 as a destination, the generated non-usage notification to the data communication circuit 204 (step S45). Upon reception of the non-usage notification, the terminal device 100 displays the non-usage notification on the display device 105b, and the administrator having visually confirmed the non-usage notification retries to determines another area as the target area, and then performs a request operation to the terminal device 100 again.

After execution of step S45, the controller 240 outputs, specifying the first flying object 500 as a destination, the return order to order return to the office to the data communication circuit 204 (step S42), and then ends execution of the usage determination process.

When an article is brought into an office of a delivery service provider, an employee working at the office reads a slip attached to a cardboard box in which the article is packaged to check a delivery destination for the article. Then the employee performs an operation to cause the input device 205c of the control device 200 illustrated in FIG. 3 to input the delivery destination.

Figure 13:
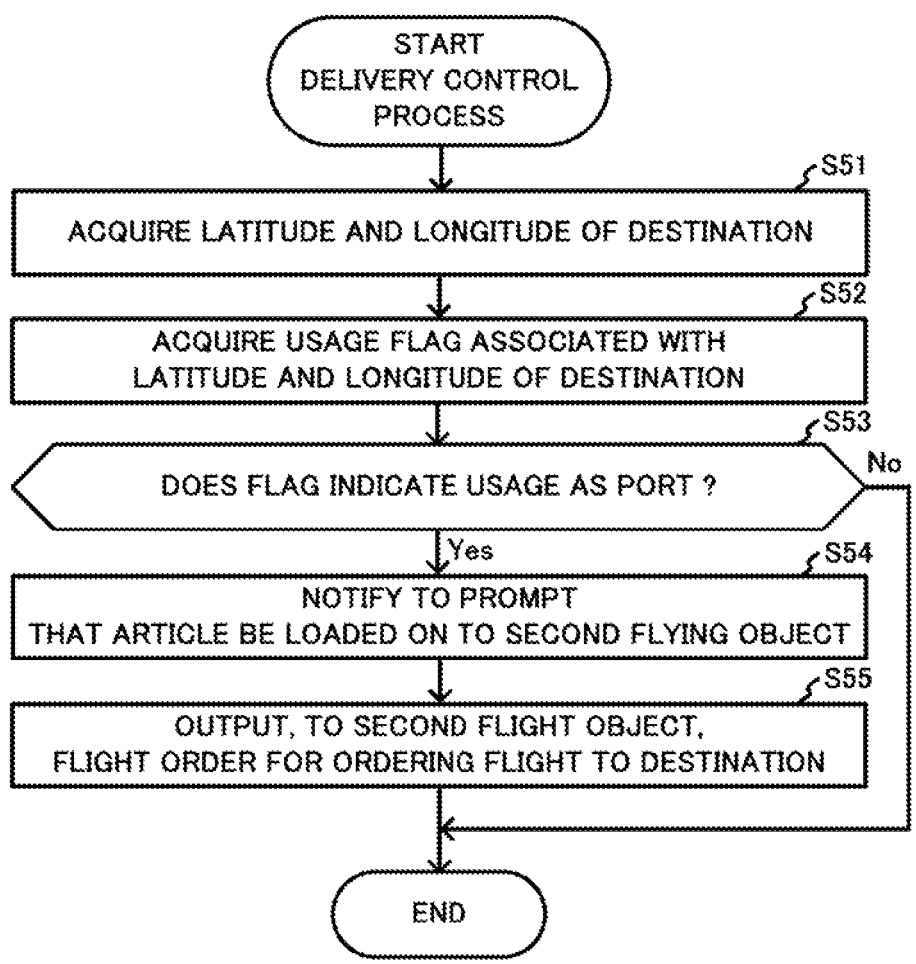
FIG. 13 is a flow chart illustrating an example of a delivery control process executable by the control device included in the delivery system.

When the input device 205c of the control device 200 inputs an signal corresponding to the operation by the employee, the CPU 201 of the control device 200 executes a delivery control process as illustrated in FIG. 13 for causing the second flying object 600 to deliver the article.

Upon start of execution of the delivery control process, the acquirer 210 of the control device 200 acquires information that represents an address of the delivery destination based on the input signal. Then the acquirer 210 acquires, from the information storage 290, information that represents latitude and longitude of the acquired address that are stored in advance in association with the address (step S51).

Then the determiner 220 of the control device 200 acquires from the port table of FIG. 6 a usage flag associated with the information that represents latitude and longitude of the delivery destination (step S52), and determines whether or not the acquired usage flag is a flag that represents that the target area is used as a port (step S53).

When the determiner 220 of the control device 200 determines that the acquired usage flag is a flag that represents that the target area is used as a port (Yes in step S53), the notifier 230 causes the display device 205b illustrated in FIG. 3 to give notification to prompt that the article be loaded on to the second flying object 600 (step S54).

Then when the input device 205c of the control device 200 operated by the employee inputs a signal that represents completion of loading of the article on to the second flying object 600, the controller 240 generates a flight order that includes information representing latitude and longitude of the delivery destination and orders flight to the delivery destination. Then the controller 240 outputs, specifying the second flying object 600 as a destination, the generated flight order to the data communication circuit 204 (step S55), and then ends execution of the delivery control process.

When the determiner 220 of the control device 200 determines in step S53 that a usage flag could not be acquired from the port table of FIG. 6 or the acquired usage flag is a flag representing that the target area is not used as a port (No in step S53), the determiner 220 determines that the article is not to be delivered by the second flying object 600. Then the notifier 230 causes the display device 205b to give notification, for example, to prompt an employee to deliver the article by automobile, motorcycle, bicycle, or walk, and then ends execution of the delivery control process.

The second flying object 600 is an unmanned aerial vehicle and has the same size, configuration, and function as the first flying object 500. Thus the second flying object 600 includes a control device, propeller arms, propellers, motors, a first holding frame and a second holding frame, guide rails, and an image capturing device and a sensing device, all of which are unillustrated and have the same sizes, configurations, and functions as those of the components included in the first flying object 500, that is, the control device 510, the propeller arms 521 to 524, the propellers 531 to 534, the non-illustrated motors, the first holding frame 541a and the second holding frame 541b, the guide rails 542a and 542b, and the image capturing device 551 and the sensing device 552.

The non-illustrated control device of the second flying object 600 includes a CPU, a RAM, a ROM, a flash memory, a data communication circuit, a GPS circuit, an input/output port, and a drive circuit, all of which are unillustrated and have the same configuration and functions as those of the components included in the first flying object 500 illustrated in FIG. 10, that is, the CPU 511, the RAM 512, the ROM 513a, the flash memory 513b, the data communication circuit 514, the GPS circuit 516, the input/output port 518, and the drive circuit 519.

Figure 14:
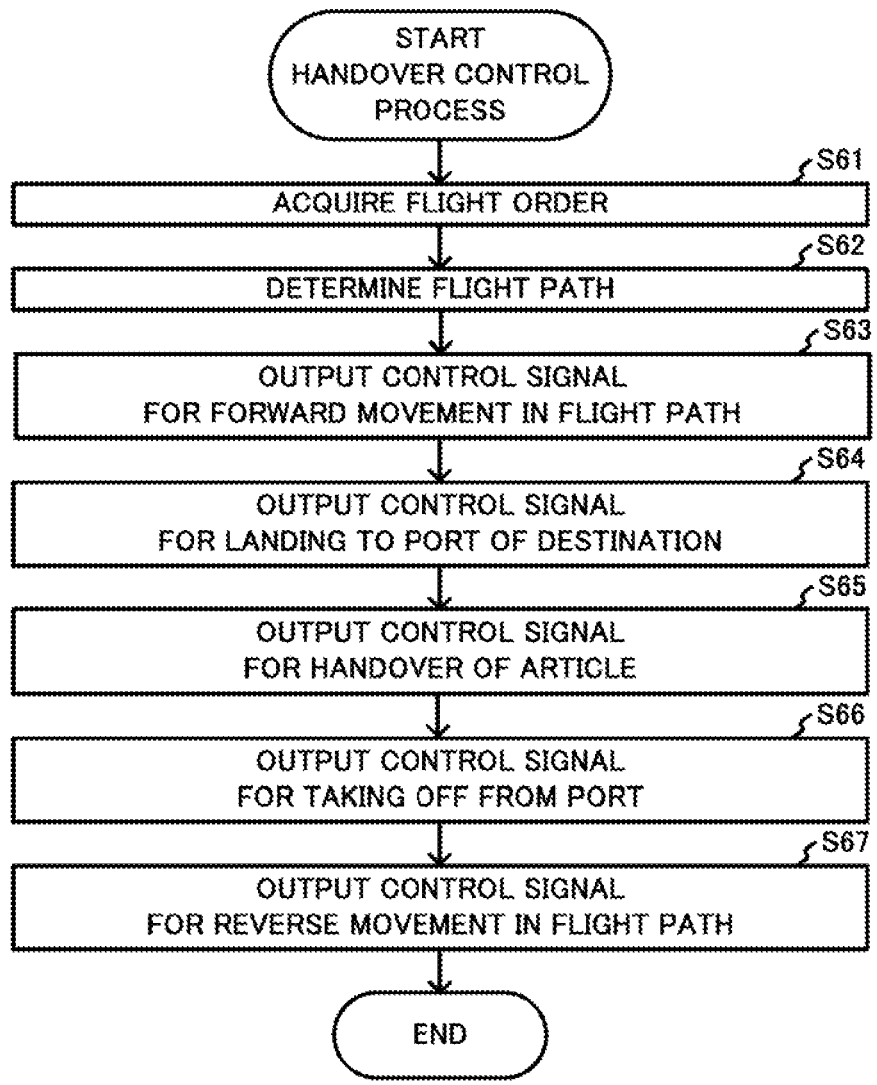
FIG. 14 is a flow chart illustrating an example of a handover control process executable by a second flying object.

When the non-illustrated data communication circuit included in the second flying object 600 receives an flight order transmitted by the control device 200, the non-illustrated CPU included in the second flying object 600 executes a handover control process as illustrated in FIG. 14 for controlling the non-illustrated motors or the like to achieve flying to a delivery destination in accordance with the flight order and handover of the article at the delivery destination.

Upon start of execution of the handover control process, the CPU of the second flying object 600 executes steps similar to steps S21 to S23 of FIG. 11, thereby achieving flight to the delivery destination in accordance with the flight order (steps S61 to S63).

Then the CPU of the second flying object 600 detects, from the image represented by data output by the sensing device 552, an image area corresponding to a mark that indicates that the target area is used as a port. Then the CPU generates, based on a position on the image with the image area detected, a control signal to control propellers so as to cause the second flying object 600 to land in the target area covered with the cover after moving over the cover having the mark, and outputs the generated control signal to the non-illustrated drive circuit (step S64). The CPU generates a control signal for moving the first holding frame and the second holding frame in a direction apart from one another and outputs the generated control signal to the drive circuit, thereby releasing the article from the first holding frame and the second holding frame. The second flying object 600 thereby hands over the article to a person who is at the delivery destination (step S65).

Then the CPU of the second flying object 600 generates a control signal for controlling propellers to cause the second flying object 600 to take off from the target area, and outputs the generated control signal to the drive circuit (step S66). Then the CPU executes a step similar to step S29 of FIG. 11, thereby achieving flight to the office by reverse movement in the flight path (step S67), and then ends execution of the handover control process.

Acceding to these configurations, the control device 200 includes the acquirer 210 that acquires a determination request for requesting determination as to whether or not the target area is usable for a predetermined purpose, and a controller 240 that performs control to cause the first flying object 500 to flight to the target area. The acquirer 210 of the control device 200 further acquires sensing data that is data obtained by optical sensing of the target area by the first flying object 500. The control device 200 further includes a determiner 220 that determines, based on the acquired sensing data, whether or not the target area is usable for a predetermined purpose. Thus, for example, since there is no need for personnel to visit the target area to determine whether or not the target area is usable as a predetermined purpose, the control device 200 can reduce personnel costs for the determination. In addition, even if the number of target areas for which use for a predetermined purpose is requested increases, for example, there is no need for personnel to visit each of the target areas to determine whether or not the target areas are usable as a predetermined purpose, increase in a total cost for the determination can be suppressed. The control device 200 also determines, based on the sensing data obtained by optical sensing of the target area, whether or not the target area is usable as a predetermined purpose. Thus, for example, the control device 200 can improve determination accuracy because the determination is made based on new and detailed data, for example, compared with a case of the determination based on a map on which the target area is depicted, even without personnel visiting the target area.

According to these configuration, the acquirer 210 of the control device 200 further acquires, together with the determination request, the first image obtained by capturing of an image of the surface of the target area. The determiner 220 of the control device 200 determines, based on the acquired first image, whether or not the surface satisfies the predetermined first condition, and upon determination that the surface does not satisfy the first condition, the controller 220 determines that the target area is unusable for the predetermined purpose. By contrast, upon determination that the surface of the target area satisfies the first condition, the controller 240 of the control device 200 causes the first flying object 500 to fly to the target area to cause the first flying object 500 to optically sense the target area. Thus, in a case in which determination is made that the surface of the target area does not satisfy the first condition, the control device 200 determines that the target area is unusable for the predetermined purpose without causing the first flying object 500 to fly to the target area. Thus, compared with the case in which the first flying object 500 is caused to fly to all the target areas for which determination is requested, costs for the determination can be reduced.

According to these configurations, the acquirer 210 of the control device 200 further acquires the second image obtained by image capturing of the cover over the target area. The determiner 220 of the control device 200 determines, based on the acquired second image, whether or not the cover satisfies a predetermined second condition, and upon determination that the cover does not satisfy the second condition, the determiner 220 determines that the target area is unusable for the predetermined purpose. By contrast, upon determination that the surface of the target area satisfies the first condition and the cover satisfies the second condition, the controller 240 of the control device 200 causes the first flying object 500 to fly to the target area. Thus, in a case in which determination is made that the cover does not satisfy the second condition, the control device 200 determines that the target area is unusable for the predetermined purpose without causing the first flying object 500 to fly to the target area. Thus, compared with the case in which the first flying object 500 is caused to fly to all the target areas for which the first condition is satisfied, costs for the determination can be reduced.

According to the configuration, the predetermined purpose is to use the target area as a port, and the sensing data represents a target area image, which is referred to as a third image, obtained by capturing an image of the target area by the first flying object 500. The determiner 220 of the control device 200 determines, based on the acquired target area image, whether or not the second flying object 600 that is different from the first flying object 500 can land in the target area. This eliminates, for example, necessity for personnel to visit the target area to be used as a port to determine whether or not the second flying object 600 can land in the target area, and the control device 200 can thereby reduce personnel costs for determination. In addition, even if the number of the target areas for which use as a port is requested, for example, there is no need for personnel to visit each of the target areas to determine whether or not the second flying object 600 can land in the target area, increase in a total cost for the determination can be suppressed.

According to these configurations, the determiner 220 of the control device 200 determines, based on the acquired first image, whether or not the surface satisfies the predetermined first condition, and upon determination that the surface does not satisfy the first condition, the determiner 220 determines that the second flying object 600 cannot land in the target area. By contrast, upon determination that the surface of the target area satisfies the first condition, the controller 240 of the control device 200 causes the first flying object 500 to fly to the target area. Thus, in a case in which determination is made that the surface of the target area does not satisfy the first condition, the control device 200 determines that the second flying object 600 cannot land in the target area without causing the first flying object 500 to fly to the target area. Thus, compared with the case in which the first flying object 500 is caused to fly to all the target areas for which use as a port is requested, costs for the determination can be reduced.

According to these configurations, the first condition is a condition in which the surface is suitable for landing of the second flying object 600. Thus, for example, before covering the target area with the cover having a mark indicating that the target area is used as a port prevents the second flying object 600 from capturing an image of the surface, the control device 200 can determine, based on the first image obtained by capturing of the image of the surface, whether or not the surface of the target area is suitable for landing of the second flying object 600.

According to these configurations, the first condition is a condition that the surface of the target area is hard enough to suitable to landing of the second flying object 600, and the determiner 220 of the control device 200 determines, based on a feature value that characterizes texture of the surface of the target area imaged to obtain the first image, whether or not the surface satisfies the first condition. Thus, without causing the second flying object 600 to land in the target area or causing the first flying object 500 to land in the target area instead of the second flying object 600, the control device 200 can determine whether or not the hardness of the surface of the target area is suitable for landing of the second flying object 600.

According to these configurations, the acquirer 210 of the control device 200 acquires together an installation report that reports completion of covering the target area with the cover as well as the second image obtained by capturing of an image of the cover that covers the target area. The determiner 220 of the control device 200 determines, based on the acquired second image, whether or not the cover satisfies a predetermined second condition, and upon determination that the cover does not satisfy the second condition, the determiner 220 determines that the second flying object 600 cannot land in the target area. By contrast, upon determination that the surface of the target area satisfies the first condition and the cover satisfies the second condition, the controller 240 of the control device 200 causes the first flying object to fly to the target area. Thus, in a case in which determination is made that the cover does not satisfy the second condition, the control device 200 determines that the second flying object 600 cannot land in the target area without causing the first flying object 500 to fly to the target area. Thus, compared with the case in which the first flying object 500 is caused to fly to all the target areas for which the first condition is satisfied, costs for the determination can be reduced.

According to these configurations, the determiner 220 of the control device 200 further determines, based on a feature point based on the first image and a feature point based on the second image, whether or not the target area whose surface is imaged to obtain the first image is identical to the target area whose surface is covered with the cover imaged to obtain the second image. Thus the control device 200 can determine whether or not the cover imaged to obtain the second image covers the same area as the target area for which determination is made based on the first image that the hardness of the surface is suitable for landing of the second flying object 600. Thus accurate determination can be made as to whether or not the second flying object 600 can land in the target area covered with the cover.

Modified Example 1 of Embodiment 1

Embodiment 1 describes that the first condition used by the determiner 220 of the control device 200 for determination in step S05 of FIG. 4 is a condition that the hardness of the surface of the target area is suitable for landing of the second flying object 600, but the first condition is not limited thereto. A first condition according to the present modified example is a condition that a gradient of the surface of the target area is suitable for landing of the second flying object 600. The gradient of the surface being suitable for landing of the second flying object 600 includes the meaning that the gradient is small enough for the second flying object 600 to be able to land on the surface.

A digital camera 107 of a terminal device 100 according to the present modified example is a digital stereo camera, and includes a first lens and a second lens, both of which are not illustrated. The digital camera 107 also includes a non-illustrated first group of image capturing elements that receives light having passed through the first lens and generates an electrical signal, and a non-illustrated second group of image capturing elements that receives light having passed the second lens and generates an electrical signal. The digital camera 107 further includes a non-illustrated image generation circuit that generates, based on the electrical signals output by the first group of image capturing elements and the second group of image capturing elements, two images having parallax relative to each other.

When the input device 105c of the terminal device 100 inputs a signal corresponding to an image capturing operation, a CPU 101 generates, based on a signal output by a non-illustrated image generation circuit, a first image file that represents two first images obtained by capturing of an image of the surface of the target area. Then the CPU 101 outputs, specifying the control device 200 as a destination, the generated first image file to the data communication circuit 104a together with the determination request.

In step S05 of FIG. 4, the determiner 220 of the control device 200 specifies points on the surface of the target area based on parallax of two first images represented by the first image file and specifies coordinate values of the specified points in a world coordinate system. Then the determiner 220 calculates, for example using least squares, an equation that represents a plane having a minimum total of distances between the plane and the specified points in order to determine an equation that represents the surface of the target area in the world coordinate system. Then using the calculated equation, a minimum angle θ between the surface of the target area and the horizontal plane is calculated using the calculated equation, and the calculated angle θ is taken as an angle θ that represents inclination relative to the horizontal plane of the surface of the target area.

Then the determiner 220 determines whether or not the angle θ representing the inclination of the surface is greater than a first threshold represented by information prestored in the information storage 290. A person skilled in the art can determine, by experiment, a suitable value of the first threshold.

Upon determination that the angle θ representing the inclination is greater than the first threshold, the determiner 220 determines that the gradient of the surface is unsuitable for landing of the second flying object 600 and thus the surface does not satisfy the first condition (No in step S05). Then the determiner 220 determines that the second flying object 600 cannot land in the target area because the gradient of the surface of the target area is too great (step S06). By contrast, upon determination that the angle θ representing the inclination is equal to or less than the first threshold, the determiner 220 determines that the gradient of the surface is suitable for landing of the second flying object 600 and thus the surface satisfies the first condition (Yes in step S05).

According to these configurations, the first condition is a condition that the gradient of the surface of the target area is small enough to be suitable for landing of the second flying object 600, and the determiner 220 of the control device 200 determines, based on the parallax included in the two first images obtained by image capturing by the stereo camera, whether or not the surface satisfies the first condition. Thus, for example, without personnel visiting the target area to measure the gradient of the surface, the control device 200 can determine whether or not the gradient of the surface of the target area is suitable for landing of the second flying object 600. In addition, for example, before covering the surface of the target area with the cover prevents the second flying object 600 from capturing an image of the surface, the control device 200 can determine whether or not the gradient of the surface is suitable for landing of the second flying object 600. Furthermore, for example, without causing the second flying object 600 to land in the target area or the first flying object 500 to land in the target area instead of the second flying object 600, the control device 200 can determine whether or not the gradient of the surface is suitable for landing of the second flying object 600.

As described above, the digital camera 107 of the terminal device 100 according to the present modified example includes a first lens and a first group of image capturing elements and a second lens and a second group of image capturing elements, all of which are not illustrated, and is a stereo camera that generates two images having parallax relative to each other based on an electrical signal output by each of the first group of image capturing elements and the second group of image capturing elements.

However, the digital camera 107 is not limited thereto. The digital camera 107 may be a monocular camera that includes a non-illustrated first lens and a non-illustrated first group of image capturing elements but not includes a second lens and a second group of image capturing elements, and generates a single image based on an electrical signal output by the first group of image capturing elements. In this case, when an administrator who administrates the target area performs image capturing operations at points that are different from one another, the digital camera 107 generates images by capturing images of the target area at the points that are different from one another and transmits the generated images to the control device 200. The control device 200 may identify a three-dimensional shape including the gradient of the surface of the target area by receiving the images and executing, using the received images, image processing such as, for example, visual simultaneous localization and mapping (SLAM) or structure from motion (SfM).

The digital camera 107 may include a non-illustrated GPS circuit that measures latitude, longitude, and altitude of the digital camera 107, and an attitude sensor that detects an angle of elevation formed between the optical axis of the digital camera 107 and a horizontal line and an azimuth of the optical axis. The digital camera 107 generates images and generates, based on the signals output by the GPS circuit, information that represents latitude, longitude, and altitude of the image capturing points of each of the images, and generates, based on the signals output by the attitude sensor, information that represents the angle of elevation and the azimuth of the optical axis at the time of image capturing for each of the images. Then the digital camera 107 transmits to the control device 200 the images, the information representing the latitude, the longitude, and the altitude of the image capturing point of each of the images, and the information representing the angle of elevation and the azimuth of the optical axis at the time of image capturing. Using the received images, the received information representing the latitude, the longitude, and the altitude of the image capturing point of each of the images, the received information representing the angle of elevation and the azimuth of the optical axis at the time of the image capturing, the control device 200 may determine parallax among the images, and identify, based on the determined parallax, a three-dimensional shape including a gradient of the surface of the target area.

Modified Example 2 of Embodiment 1

Embodiment 1 describes that the first condition used for determination by the determiner 220 of the control device 200 is a condition that the hardness of the surface of the target area is suitable for landing of the second flying object 600, but the first condition is not limited thereto. The first condition according to the present modified example is a condition that the degree of unevenness of the surface of the target area is suitable for landing of the second flying object 600. The degree of unevenness of the surface being suitable for landing of the second flying object 600 includes the meaning that the unevenness of the surface is low enough for the second flying object 600 to land on the surface.

A digital camera 107 of a terminal device 100 according to the present modified example is a digital stereo camera described in Modified Example 1 of Embodiment 1, and generates two images having parallax relative to each other. The terminal device 100 according to the present modified example transmits to the control device 200 a first image file that represents the two first images obtained by capturing of images of the surface of the target area, similarly to the terminal device 100 described in Modified Example 1 of Embodiment 1.

A determiner 220 of the control device 200 specifies coordinate values of points on the surface of the target area in the world coordinate system, based on the parallax of the two first images represented by the first image file, similarly to the determiner 220 described in Modified Example 1 of Embodiment 1. Then the determiner 220 calculates a difference between the maximum value and the minimum value of the coordinate values representing heights among the specified coordinate values, and takes the calculated difference as a degree of unevenness of the surface. Then the determiner 220 determines whether or not the calculated degree of unevenness is greater than a second threshold represented by information prestored in the information storage 290. A person skilled in the art can determine, by experiment, a suitable value of the second threshold.

Upon determination that the degree of unevenness is greater than the second threshold, the determiner 220 determines that the degree of unevenness of the surface is not suitable for landing of the second flying object 600 and thus the surface does not satisfy the first condition (No in step S05). Then the determiner 220 determines that the second flying object 600 cannot land in the target area because the degree of unevenness of the surface of the target area is too great (step S06). By contrast, upon determination that the degree of unevenness is equal to or less than the second threshold, the determiner 220 determines that the degree of unevenness of the surface is suitable for landing of the second flying object 600 and thus the surface satisfies the first condition (Yes in step S05).

According to these configuration, the first condition is a condition that the degree of unevenness of the surface of the target area is low enough to be suitable for landing of the second flying object 600, and the determiner 220 of the control device 200 determines, based on the parallax included in the two first images obtained by image capturing by the stereo camera, whether or not the surface satisfies the first condition. Thus, for example, without personnel vising the target area to measure the degree of unevenness of the surface, the control device 200 can determine whether or not the degree of unevenness of the surface of the target area is suitable for landing of the second flying object 600. In addition, for example, before covering the surface of the target area with the cover prevents the second flying object 600 from capturing an image of the surface, the control device 200 can determine whether or not the degree of unevenness of the surface is suitable for landing of the second flying object 600. Furthermore, for example, without causing the second flying object 600 to land in the target area or the first flying object 500 to land in the target area instead of the second flying object 600, the control device 200 can determine whether or not the degree of unevenness of the surface is suitable for landing of the second flying object 600.

The present modified example describes that the determiner 220 takes as the degree of unevenness of the surface the difference between the maximum value and the minimum value of the coordinate values representing heights among the coordinate values on the surface of the target area, but the degree of unevenness is not limited thereto. The determiner 220 may take, as the degree of unevenness of the surface, dispersion of coordinate values representing heights among the coordinate values on the surface. This enables the determiner 220 to determine whether or not the whole degree of unevenness of the surface of the target area is suitable for landing of the second flying object 600.

The digital camera 107 of the terminal device 100 according to the present modified example may be a monocular camera, and generate images by image capturing of the target area from points different from one another and transmit the generated images to the control device 200. The control device 200 may identify a three-dimensional shape including a degree of unevenness of the surface of the target area by receiving the images and executing, using the received images, image processing such as, for example, Visual SLAM or SfM.

The way of execution of the image processing is not limited thereto. The control device 200 may identify a three-dimensional shape including a degree of unevenness of the surface of the target area by executing image processing using images received from the digital camera 107, information representing latitude, longitude, and altitude of the image capturing point of each of the images, and information representing an angle of elevation and an azimuth of the optical axis at the time of image capturing.

Modified Example 3 of Embodiment 1

Embodiment 1 describes that the first condition used for determination by the determiner 220 of the control device 200 is a condition that the hardness of the surface of the target area is suitable for landing of the second flying object 600, but this is not limited thereto. A first condition according to the present modified example is a condition that an object that might prevent landing of the second flying object 600 is not placed on the surface of the target area.

A digital camera 107 of a terminal device 100 according to the present modified example includes a lens 107*a*, a group of image capturing elements 107*b*, and an image generation circuit 107*c*, similarly to the digital camera 107 according to Embodiment 1.

In step S05 of FIG. 4, the determiner 220 of the control device 200 according to the present modified example detects, for example by performing a template matching relative to the first image represented by the first image file, an image area corresponding to a thing, for example, a kick scooter, a bicycle, a motorcycle, an automobile, a plant pot, a plant, a brick, a chair, a table, a shade, a shed, or steps such as a gutter or stairs. Templates such as a kick scooter and the like are prestored in the information storage 290.

Then when the detected image area has an area greater than a third threshold represented by information prestored in the information storage 290, the determiner 220 determines that a thing that might prevent landing of the second flying object 600 is placed. In this case, the determiner 220 determines that the surface of the target area does not satisfy the first condition (No in step S05), and then determines that the second flying object 600 cannot land in the target area (step S06). A person skilled in the art can determine, by experiment, a suitable value of the third threshold.

By contrast, when the image area is not detected or the detect image area has an area equal to or less than the third threshold, the determiner 220 determines that the surface of the target area satisfies the first condition (Yes in step S05).

According to these configurations, the first condition is a condition that a thing that might prevent landing of the second flying object 600 is not placed on the surface of the target area, and the determiner 220 of the control device 200 determines, based on the first image, whether or not the surface satisfies the first condition. Thus, for example, without personnel visiting the target area to check whether or not a thing is placed on the surface of the target area, the control device 200 can determine whether or not a thing that might prevent landing of the second flying object 600 is placed on the surface of the target area, and the control device 200 can thereby reduce personnel costs for determination.

Modified Example 4 of Embodiment 1

Embodiment 1 describes that the second condition used for determination by the determiner 220 of the control device 200 in step S16 of FIG. 8 is a condition that the cover is in a fully spread out state, but the second condition is not limited thereto. The second condition according to the present modified example is a condition that an object that might prevent landing of the second flying object 600 is not placed on the cover.

In order to determine whether or not this second condition is satisfied, the determiner 220 of the control device 200 detects an image area corresponding to an object that might prevent landing of the second flying object 600, for example by performing template matching, relative to the second image represented by the second image file, similarly to Modified Example 3 of Embodiment 1.

According to these configurations, the second condition is a condition that a thing that might prevent landing of the second flying object 600 is not placed on the cover, and the determiner 220 of the control device 200 determines, based on the second image, whether or not the cover satisfies the second condition. Thus, for example, without personnel visiting the target area to check whether or not an object is placed on the cover, the control device 200 can determine whether or not an object that might prevent landing of the second flying object 600 is placed on the cover, and the control device 200 can thereby reduce personnel costs for determination.

Modified Example 5 of Embodiment 1

Embodiment 1 describes that the second condition used for determination by the determiner 220 of the control device 200 is a condition that the cover is in a fully spread out state, but this is not limited thereto. A second condition according to the present modified example is a condition that the target area is covered with a cover with the side having a mark indicating that the target area is used as a port faced up.

In order to determine whether or not this second condition is satisfied, the determiner 220 of the control device 200 detects an image area corresponding to a mark indicating that the target area is used as a port, for example by performing template matching, relative to the second image represented by the second image file, similarly to Modified Example 3 of Embodiment 1.

Then when an image area corresponding to the mark is not detected, the determiner 220 determines that the cover does not satisfy the second condition (No in step S16), and then determines that the second flying object 600 cannot land in the target area (step S19). Such determination being made is because the CPU of the second flying object 600 detects an image area corresponding to the mark from the image output by the sensing device 552 and performs, based on a location on the image of the detected image area, control for landing to the target area covered with the cover. By contrast, when the image area corresponding to the mark is detected, the determiner 220 determines that the cover satisfies the second condition (Yes in step S16).

According to these configurations, for example, without personnel visiting the target area to check the cover, the control device 200 can determine whether or not the target area is covered with a cover with the side having a mark indicating the target area is used as a port faced up, thereby reducing personnel costs for determination.

Modified Example 6 of Embodiment 1

Embodiment 1 describes that the third condition used for determination by the determiner 220 of the control device 200 in step S37 of FIG. 12 is a condition that the cover is sufficiently fastened, but the third condition is not limited thereto. A third condition according to the present modified example is a condition that a thing that might prevent landing of the second flying object 600 is not placed over the cover.

In order to determine whether or not this third condition is satisfied, the determiner 220 of the control device 200 detects an image area corresponding to an object that might prevent landing of the second flying object 600, for example by performing template matching, relative to the third image represented by the sensing data, similarly to Modified Example 3 of Embodiment 1. When the image area is detected, the determiner 220 determines that the third condition is not satisfied (No in step S37), and the when the image area is not detected, the determiner 220 determines that the third condition is satisfied (Yes in steps S37).

According to these configuration, for example, without personnel visiting the target area to check the cover, the control device 200 can determine whether or not an thing that might prevent landing of the second flying object 600 is located on the cover, thereby reducing personnel costs for determination.

Modified Example 7 of Embodiment 1

Embodiment 1 describes that the third condition used for determination by the determiner 220 of the control device 200 is a condition that the cover is sufficiently fastened, but this is not limited thereto. A third condition according to the present modified example is a condition that there is a sufficiently large space that extends from a path, such as a road or a river, that allows movement of the second flying object 600 to the surface of the target area.

In the present modified example, a sufficiently large space means that the space is large enough to be suitable for flight of the second flying object 600. Space being large enough to be suitable for flight of the second flying object 600 means that the space is large enough for the second flying object 600 to fly safely. The second flying object 600 being able to fly safely in the space means that a contact probability that the second flying object 600 contacts something, for example, an enclosure around the space, a wall, a roof, a tree branch, an aerial line such as a power line, and the like is lower than a predetermined probability.

Thus the space being large enough means that the space is large enough for the contact probability during the second flying object 600 flying in the space to be lower than a predetermined probability or to be zero.

In order to determine whether or not this third condition is satisfied, in step S26 of FIG. 11, the CPU 511 of the first flying object 500 outputs a signal for ordering image capturing to the image capturing device 551 with the optical axis directed forward of the first flying object 500 or to the sensing device 552 with the optical axis directed vertically downward of the first flying object 500. The CPU 511 of the first flying object 500 thereby causes the image capturing device 551 or the sensing device 552 to capture an image of a space that extends from a path, such as a road or a river, that allows movement of the second flying object 600 to the surface of the target area. Then the CPU 511 of the first flying object 500 outputs sensing data that represents the third image obtained by capturing of an image of the space extending to the surface of the target area in step S27.

The determiner 220 of the control device 200 calculates, based on a parallax included in two third images, a minimum value of a vertical length of the space extending to the surface of the target area as a minimum height of the space. The determiner 220 also calculates, based on the parallax, a minimum value of the length perpendicular to the traveling direction and the vertical direction of the space extending to the target area, as a minimum width of the space. Then the determiner 220 acquires information that represents a height and a width of the second flying object 600 prestored in the information storage 290.

Next, the determiner 220 determines whether or not a value obtained by addition of a predetermined margin in height to a height of the second flying object 600 represented by the acquired information is smaller than the calculated minimum height of the space extending to the target area and a value obtained by addition of a predetermined margin in width to the width of the second flying object 600 is smaller than the minimum width of the space.

Upon determination that the value obtained by addition of the margin in height to the height of the second flying object 600 is smaller than the minimum height of the space and the value obtained by addition of the margin in width to the width of the second flying object 600 is smaller than the minimum width of the space, the determiner 220 determines that the space is sufficiently large and then the third condition is satisfied (Yes in step S37 of FIG. 12).

By contrast, upon determination that the value obtained by addition of the margin in height to the height of the second flying object 600 is equal to or greater than the minimum height of the space or the value obtained by addition of the margin in width to the width of the second flying object 600 is equal to or greater than the minimum width of the space, the determiner 220 determines that the space is not sufficiently large and then the third condition is not satisfied (No in step S37).

According to these configurations, for example, without personnel visiting the target area for checking, the control device 200 can determine whether or not there is a sufficiently large space that extends from a path that allows movement of the second flying object 600 to the target area, thereby reducing personnel costs for determination.

Modified Example 8 of Embodiment 1

Embodiment 1 describes that the third condition used for determination by the determiner 220 of the control device 200 is a condition that the cover is sufficiently fastened, but this is not limited thereto. A third condition according to the present modified example is a condition the cover over the surface of the target area is not wet when an amount of rainfall per unit time of an area including the target area falls in a predetermined range.

In order to determine whether or not this third condition is satisfied, in step S17 of FIG. 8, the controller 240 of the control device 200 according to the present modified example outputs to a non-illustrated list prestored in the information storage 290 a flight order that includes information representing latitude and longitude of the target area and orders flight to the target area when the amount of rainfall per unit time of the area including the target area falls in the predetermined range (step S17). Then processing of step S18 is executed and then execution of the second determination process ends.

The CPU 201 of the control device 200 executes, upon start-up, a non-illustrated rainfall determination process for determining whether or not the amount of rainfall per unit time falls in the predetermined range.

Upon start of execution of the rainfall determination process, the acquirer 210 of the control device 200 acquires one of flight orders from the non-illustrated list stored in the information storage 290, and deletes the acquired flight order from the non-illustrated list. Then the acquirer 210 acquires information that is included in the acquired flight order and represents latitude and longitude of the target area.

Then the acquirer 210 acquires a universal resource locator (URL) of a weather server that distributes weather information. The URL of the weather server is prestored in the information storage 290. Then the controller 240 outputs to the data communication circuit 204 a transmission request that includes the acquired URL and requests transmission of weather information that represents an amount of rainfall per unit time of an area including a point of the latitude and longitude represented by the acquired information. The controller 240 thereby causes the weather server to transmit weather information.

Upon reception of the weather information from the weather server after the data communication circuit 204 transmits the transmission request to the weather server, the acquirer 210 of the control device 200 acquires the weather information from the data communication circuit 204.

Then the acquirer 210 of the control device 200 acquires information that represents a range of the amount of rainfall prestored in the information storage 290. Then upon determination that the amount of rainfall per unit time represented by the acquired weather information does not fall in the range of the amount of rainfall represented by the acquired information, the controller 240 of the control device 200, after being in sleep mode over predetermined time, repeats the above process starting from outputting of the transmission request for requesting transmission of the weather information.

By contrast, upon determination that the amount of rainfall per unit time falls in the range represented by the acquired information, the controller 240 of the control device 200 outputs, specifying the first flying object 500 as a destination, the flight order acquired from the non-illustrated list to the data communication circuit 204.

Upon reception of the flight order, the first flying object 500 flies to the target area in accordance with the flight order and captures an image of the cover over the target area before returning to the office. Then the controller 240 repeats the above process starting from acquisition of one of control orders from the non-illustrated list.

The determiner 220 of the control device 200 according to the present modified example executes, in step S37 of FIG. 12, a process similar to step S16 of FIG. 8, to extract an image area corresponding to the cover from the third image obtained by image capturing by the first flying object 500. Then the determiner 220 calculates, based on a pixel value included in the extracted image area, a feature value that characterizes texture of the surface of the cover corresponding to the image area.

Then the determiner 220 reads a feature value that is a value prestored in the information storage 290 and characterizes texture of the surface of the cover that is wet. Then the determiner 220 calculates a difference between the calculated feature value and the read feature value, and determines whether or not the calculated difference is greater than a predetermined difference.

Upon determination that the calculated difference is greater than the predetermined difference, the determiner 220 determines that the surface of the cover is not wet and then the third condition is satisfied (Yes in step S37). Then since the cover over the target area is not wet even when the amount of rainfall per unit time of the area including the target area falls in the predetermined range, the determiner 220 determines that the second flying object 600 can land safely in the target area (step S38). In addition, the determiner 220 determines that the target area is suitable as a port since a probability that the article gets wet even when the article is delivered to the target area is zero or lower than a predetermined probability. Then the determiner 220 determines usage of the target area as a port and performs other processing by executing processing of steps S39 to S42 (steps S39 to S42), and then ends execution of the usage determination process.

By contrast, upon determination that the calculated difference is equal to or less than the predetermined difference, the determiner 220 determines that the surface of the cover is wet and then the third condition is not satisfied (No in step S37). Then, when the amount of rainfall per unit time of the area including the target area falls in the predetermined range, the determiner 220 determines that the cover over the target area gets wet. Thus the determiner 220 determines that a probability of tipping over of the second flying object 600 at the time of landing is higher than the predetermined probability and the second flying object 600 cannot land safely in the target area (step S43). The determiner 220 also determines that the target area is not suitable as a port since the probability that the article delivered to the target area get wet is higher than the predetermined probability. Then the determiner 220 determines non-usage of the target area as a port and performs other processing by executing processing of steps S44, S45, and S42 (steps S44, S45, and S42), and then ends execution of the usage determination process.

According to these configuration, for example, in a case in which it rains, when the amount of rainfall per unit time of the area including the target area falls in the predetermined range, the control device 200 can determine, without personnel visiting the target area for checking, whether or not the cover over the target area in such a case is wet, thereby reducing personnel costs for determination.

Modified Example 9 of Embodiment 1

Embodiment 1 describes that the determiner 220 of the control device 200 determines whether or not the second flying object 600 can land in the target area, but the determination by the determiner 220 is not limited thereto.

The determiner 220 according to the present modified example determines whether or not the first flying object 500 can land in the target area.

The information storage 290 of the control device 200 according to the present modified example stores, instead of the material table of FIG. 7, a non-illustrated material table in which information that represents types of materials, feature values of the types of materials, and hardness information that represents whether or not the materials are hard enough to be suitable for landing of the first flying object 500 are associated and prestored.

The first condition according to the present modified example is a condition that the surface is suitable for landing of the first flying object 500. Thus, in step S05 of FIG. 4, the determiner 220 of the control device 200 acquires, from the non-illustrated material table, hardness information associated with the feature value that is the same as or closest to the calculated feature value, and determines, based on the acquired hardness information, whether or not the first condition that the surface is suitable for landing of the first flying object 500 is satisfied (step S05).

When the acquired hardness information indicates that the materials are not sufficiently hard, the determiner 220 determines that the hardness of the surface of the target area made up of the materials is not suitable for landing of the first flying object 500 and the surface does not satisfy the first condition (No in step S05). Then the determiner 220 determines that the first flying object 500 cannot land in the target area (step S06), and then determines the target area not to be used as a port.

The cover according to the present modified example is designed to have an area large enough to be suitable for landing of the first flying object 500. The area being large enough to be suitable for landing of the first flying object 500 means that the target area is large enough for the first flying object 500 to land safely in the target area covered with the cover.

Thus, in step S16 of FIG. 8, upon determination that the second condition that the cover is fully spread out is not satisfied (No in step S16), the determiner 220 of the control device 200 determines that the first flying object 500 cannot land in the target area since the target area has no area large enough for the cover to be fully spread out (step S19).

Upon determination, in step S37 of FIG. 12, that the third condition that the cover is sufficiently fastened to the surface of the target area is satisfied (Yes in step S37), the determiner 220 of the control device 200 according to the present modified example determines that the first flying object 500 can land in the target area (step S38). By contrast, upon determination that the third condition is not satisfied (No in steps S37), the determiner 220 determines that the first flying object 500 cannot land in the target area (step S43).

Modified Example 10 of Embodiment 1

Embodiment 1 describes that the determiner 220 of the control device 200 determines whether or not the second flying object 600 can land in the target area, but the determination by the determiner 220 is not limited thereto. The determiner 220 of the control device 200 according to the present modified example determines whether or not both of the first flying object 500 and the second flying object 600 can land in the target area.

The information storage 290 of the control device 200 according to the present modified example stores, instead of the material table of FIG. 7, a non-illustrated material table in which information that represents types of materials, feature values of the types of materials, and hardness information that represent whether or not the materials are hard enough to be suitable for landing of the first flying object 500 and for landing of the second flying object 600 are associated and prestored.

The first condition according to the present modified example is a condition that the surface is suitable for landing of the first flying object 500 and the surface is suitable for landing of the second flying object 600. Thus, in step S05 of FIG. 4, the determiner 220 acquires hardness information from the non-illustrated material table, and determines whether or not the first condition is satisfied based on the acquired hardness information (step S05). Upon determination that the surface does not satisfy the first condition (No in step S05), the determiner 220 determines that one or both of the first flying object 500 and the second flying object 600 cannot land in the target area. Thus the determiner 220 determines that the target area is unusable for the predetermined purpose that the target area is used as a port (step S06).

The cover according to the present modified example is designed to have an area large enough to be suitable for landing of the first flying object 500 and for landing of the second flying object 600. Thus, in step S16 of FIG. 8, upon determination that the second condition that the cover is fully spread out is not satisfied (No in step S16), the determiner 220 of the control device 200 determines that one or both of the first flying object 500 and the second flying object 600 cannot land in the target area. Thus the determiner 220 determines that the target area is unusable for the predetermined purpose (step S19).

In step S37 of FIG. 12, upon determination that the third condition is satisfied (Yes in step S37), the determiner 220 of the control device 200 according to the present modified example determines that both of the first flying object 500 and the second flying object 600 can land. Thus the determiner 220 determines that the target area is usable for the predetermined purpose (step S38). By contrast, upon determination that the third condition is not satisfied (No in step S37), the determiner 220 determines that the first flying object 500 and the second flying object 600 cannot land in the target area. Thus the determiner 220 determines that the target area is unusable for the predetermined purpose (step S38).

Modified Example 11 of Embodiment 1

Embodiment 1 describes that the determiner 220 of the control device 200 determines whether or not the second flying object 600 can land in the target area, but the determination by the determiner 220 is not limited thereto. The determiner 220 of the control device 200 according to the present modified example determines whether or not the second flying object 600 can take off from the target area.

When an attitude of the second flying object 600 that obtains lift with propellers tilts at an angle more than a predetermined angle, the second flying object 600 cannot obtain sufficient lift and tipping over or the like occurs at the time of taking off Thus the second flying object 600 cannot take off safely or at all.

The information storage 290 of the control device 200 according to the present modified example stores, instead of the material table of FIG. 7, a non-illustrated material table in which information that represents types of materials, feature values of the types of materials, and hardness information that represents whether or not the materials are hard enough to be suitable for taking-off of the second flying object 600 are associated and prestored.

In the present modified example, materials being hard enough to be suitable for taking-off of the second flying object 600 includes the meaning that the materials are hard enough for the second flying object 600 to take off from the surface of the target area made up of the materials. The second flying object 600 being able to take off from the target area does not simply mean that the second flying object 600 can take off from the target area but can take off from there safely. The second flying object 600 being able to safely take off from the target area includes the meaning that a probability of tipping over of the second flying object 600 at the time of taking-off is zero or lower than a predetermined probability.

Thus materials being hard enough to be suitable for taking-off of the second flying object 600 means that the materials are hard enough not to cause deformation of the geometry of the surface of the target area made up of the materials during a period from landing of the second flying object 600 on the surface of the target area; or even if the deformation occurs, the materials are hard enough to keep a tipping-over probability of tipping over of the second flying object 600 lower than a predetermined probability; or the materials are hard enough to keep the tipping-over probability in a level of zero and even if the geometry of the surface changes, hard enough to still achieve taking off of the second flying object 600.

The first condition according to the present modified example is a condition that the surface is suitable for taking-off of the second flying object 600. Thus, in step S05 of FIG. 4, the determiner 220 acquires hardness information from the non-illustrated material table and determines based on the acquired hardness information whether or not the first condition is satisfied (step S05). Upon determination that the surface does not satisfy the first condition (No in step S05), the determiner 220 determines that the second flying object 600 cannot take off from the target area. Thus the determiner 220 determines that the target area is unusable for the predetermined purpose that the target area is used as a port (step S06).

The cover according to the present modified example is designed to have an area large enough to be suitable for taking-off of the second flying object 600. The cover having an area large enough to be suitable for taking-off of the second flying object 600 means that the area is large enough for the second flying object 600 to take off safely from the target area covered with the cover. The second flying object 600 being able to take off safely from the target area means that when the second flying object 600 is being taking off, for example, a contact probability and an out-of-range probability are lower than predetermined probabilities. Here, the contact probability is a probability that the second flying object 600 makes contact with, for example, an enclosure or a wall that surround the target area. The out-of-range probability is a probability that the second flying object 600 exists partially or wholly in an area adjoining the target area.

Thus, in step S16 of FIG. 8, upon determination that the second condition that the cover is fully spread out is not satisfied (No in step S16), the determiner 220 of the control device 200 determines that the second flying object 600 cannot take off from the target area. Thus the determiner 220 determines that the target area is unusable for the predetermined purpose (step S19).

In step S37 of FIG. 12, upon determination that the third condition is satisfied (Yes in step S37), the determiner 220 of the control device 200 according to the present modified example determines that the second flying object can take off from the target area. Thus the determiner 220 determines that the target area is usable for the predetermined purpose (step S38). By contrast, upon determination that the third condition is not satisfied (No in steps S37), the determiner 220 determines that the second flying object 600 cannot take off from the target area. Thus the determiner 220 determines that the target area is unusable for the predetermined purpose (step S43).

The determination by the determiner 220 is not limited to determination as to whether or not the second flying object 600 can take off from the target area, and the determiner 220 of the control device 200 may determine whether or not the first flying object 500 can take off from the target area or may determine whether or not both of the first flying object 500 and the second flying object 600 can take off from the target area.

The determination by the determiner 220 is not limited thereto, and the determiner 220 of the control device 200 may determine whether one or both of the first flying object 500 and the second flying object 600 can land on and take off from the target area or cannot land on or take off from the target area.

Modified Example 12 of Embodiment 1

Embodiment 1 describes that the terminal device 100 transmits the first image file that represents the first image obtained by capturing of an image of the surface of the target area, together with a determination request for requesting determination as to whether or not the target area is usable as a port, and the acquirer 210 of the control device 200 acquires the first image file together with the determination request in steps S01 and S02 of FIG. 4.

Embodiment 1 also describes that the terminal device 100 transmits, together with the installation report that reports completion of covering the target area with the cover, the second image file represents the second image obtained by capturing of an image of the cover that covers the surface of the target area, and the acquirer 210 of the control device 200 acquires, together with the installation report, the second image file in steps S11 and S12 of FIG. 8.

However, the acquisition by the terminal device 100 is not limited there to, and the terminal device 100 may transmits the first image file separately from the determination request, and the acquirer 210 of the control device 200 may acquire the first image file separately from the determination request.

The terminal device 100 may transmits the second image file separately from the installation report, and the acquirer 210 of the control device 200 may acquire the second image file separately from the installation report.

Modified Example 13 of Embodiment 1

Embodiment 1 describes that the terminal device 100 stores, in a tag of the first image file, information that represents latitude and longitude of the target area, and in step S03 of FIG. 4, the acquirer 210 of the control device 200 acquires the information that represents the latitude and the longitude from the tag of the first image file, but this is not limited thereto.

Embodiment 1 also describes that the terminal device 100 stores, in a tag of the second image file, information that represents latitude and longitude of the target area, and in step s13 of FIG. 8, the acquirer 210 of the control device 200 acquires information that represents the latitude and the longitude from the tag of the second image file, but this is not limited thereto.

The CPU 101 of the terminal device 100 according to Embodiment 1 generates a first image file that represents a first image obtained by capturing an image of the surface of the target area, and then causes the display device 105b to display a message to prompt entry of an address of the target area. Then CPU 101 acquires address information that represents the address of the target area based on a signal input by the input device 105c in accordance with an operation by an administrator having visually confirmed the display device 105b. Then the CPU 101 of the terminal device 100 generates the determination request including the address information, and outputs, specifying the control device 200 as a destination, the first image file together with the generated determination request to the data communication circuit 104a.

In steps S01 and S02 of FIG. 4, the acquirer 210 of the control device 200 according to Embodiment 1 acquires the first image file and the determination request, and acquires the address information included in the determination request. Then by executing processing similar to step S51 of FIG. 13, the acquirer 210 acquires from the information storage 290 the information representing the latitude and longitude of the address stored in advance in association with the address represented by the acquired address information. Then, in step S03, the acquirer 210 acquires the acquired latitude and longitude of the address as latitude and longitude of the target area.

The CPU 101 of the terminal device 100 according to Embodiment 1 generates a second image file that represents the second image obtained by capturing an image of the cover that covers the surface of the target area, and then acquires address information that represents an address of the target area. Then the CPU 101 of the terminal device 100 generates an installation report that includes the acquired address information and outputs, specifying the control device 200 as a destination, the second image file together with the generated installation report.

Once acquisition of the second image file and the installation report in steps S11 and S12 of FIG. 8, the acquirer 210 of the control device 200 acquires address information included in the installation report and acquires information that represents latitude and longitude that are stored in advance in association with an address represented by the acquired address information. Then, in step S13, the acquirer 210 acquires the acquired latitude and longitude of the address as latitude and longitude of the target area.

Modified Example 14 of Embodiment 1

Embodiment 1 describes that the delivery system 1 includes a single second flying object 600, and the controller 240 of the control device 200 causes the first flying object 500 located at the office to fly to the target area for which use as a port is requested.

However, this is not limited thereto, and the delivery system 1 according to the present modified example includes second flying objects 600. Among the second flying objects 600 that are returning to the office after finishing delivery of articles to a second area that is different from a first area that is the target area for which use as a port is requested, the controller 240 of the control device 200 causes one of the second flying objects 600 that is located closest to the first area to fly to the first area.

In order to achieve this, a non-illustrated CPU included in each of the second flying objects 600 executes step S67 of FIG. 14 to return the second flying object 600 to the office, and generates, based on a signal output by a non-illustrated GPS circuit, information representing latitude and longitude of the second flying object 600 and outputs, specifying the control device 200 as a destination, to the data communication circuit.

When the data communication circuit 204 of the control device 200 illustrated in FIG. 3 receives information that represents latitude and longitude from each of the second flying objects 600, the acquirer 210 of the control device 200 acquires information that represents latitude and longitude of the second flying object 600. The acquirer 210 also acquires a communication address for identifying a data communication circuit of the second flying object 600 used for communication of the information representing latitude and longitude, as a vehicle identification (ID) for identifying a second flying object 600 having sent the information. The acquirer 210 further acquires a system date and time under control by operating system (OS) as a reception date and time of the information representing latitude and longitude. Next, the acquirer 210 associates the vehicle ID of the second flying object 600, the information representing latitude and longitude of the second flying object 600, and the reception date and time of the information with one another, and stores them in a non-illustrated table stored in the information storage 290.

In step S17 of FIG. 8, the controller 240 of the control device 200 acquires a system date and time from the OS, and acquires, from the non-illustrated table, information representing latitude and longitude associated with a reception date and time that is behind a date and time that is a predetermined amount of time prior to the acquired system date and time.

When the controller 240 cannot acquires information representing latitude and longitude cannot be obtained, the controller 240 determines that there is no second flying objects 600 that are returning and after back from sleep for a predetermined amount of time, the controller 240 repeats the process starting from acquisition of information representing latitude and longitude from the non-illustrated table.

By contrast, when the controller 240 can acquire one or more pieces of information representing latitude and longitude, the controller 240 specifies latitude and longitude that is closest to the latitude and longitude of the first area for which use as a port is requested, among latitudes and longitudes represented by the acquired one or more pieces of information.

Next, the controller 240 calculates a distance from a point of the specified latitude and longitude to the first area and a distance from the office to the first area. Upon determination that the distance from the office to the first area is shorter than the distance from the point of the specified latitude and longitude to the first area, the controller 240 outputs, specifying the first flying object 500 located at the office as a destination, a flight order for ordering a flight to the first area to the data communication circuit 204. The controller 240 outputs a flight order to the first flying object 500 because the first flying object 500 is closer to the first area than any one of second flying objects 600 that are returning.

By contrast, upon determination that the distance from the point of the specified latitude and longitude to the first area is shorter than the distance from the office to the first area, the controller 240 acquires a vehicle ID associated with the information representing the specified latitude and longitude in the non-illustrated table. Then the controller 240 outputs, specifying the second flying object 600 specified with the acquired vehicle ID as a destination, a flight order for ordering flight to the first area to the data communication circuit 204. The controller 240 outputs a flight order to the second flying object 600 because the second flying object 600 that is closest to the first area among the second flying objects 600 being returning is closer to the first area than the first flying object 500 located at the office.

When the data communication circuit of the second flying object 600 receives, from the control device 200 a flight order for ordering flight to the first area during returning to the office, the CPU of the second flying object 600 ends execution of a handover control process and executes the flight control process of FIG. 11. The second flying object 600 thereby stops returning to the office and flies to the first area from the point of stopping the returning.

According to these configurations, among the second flying objects 600 being returning to the office after delivery of articles to the second area, the controller 240 of the control device 200 causes a second flying object 600 flying over a point closest to the first area for which use as a port is requested to fly to the first area. This can reduce costs for determination as to whether or not the second flying object 600 can land in the target area.

Modified Example 15 of Embodiment 1

Embodiment 1 describes that the cover is a vinyl sheet, but the cover is not limited there to. The cover may be, for example, polyester, nylon, cotton or silk fabric, paper, or a sheet of metal such as aluminum, silver, or the like.

Embodiment 1 describes that the shape of the cover is square but not limited thereto. The shape of the cover may be a polygonal shape including triangular, rectangular, and pentangular shapes, a circular shape, or an elliptical shape.

Modified Example 16 of Embodiment 1

Embodiment 1 describes that the first flying object 500 and the second flying object 600 are both unmanned aerial vehicles, but they are not limited thereto and may be an unmanned missile.

Alternatively, the first flying object 500 and the second flying object 600 are not necessarily unmanned, and those objects may be any manned type of objects that can fly autonomously except control by the control device 200.

Embodiment 1 describes that the terminal device 100 is a smartphone, but this is not limited thereto. The terminal device 100 may be a tablet personal computer, desktop personal computer, or a feature phone.

Modified Example 17 of Embodiment 1

Embodiment 1 describes that the delivery system 1 of FIG. 1 includes the terminal device 100, the control device 200, the first flying object 500, and the second flying object 600, but this is not limited thereto.

A configuration is possible in which the delivery system 1 does not include the control device 200, and the control device 510 included in the first flying object 500 illustrated in FIG. 9 may demonstrate the functions of the control device 200 according to Embodiment 1. That is, the CPU 511 included in the control device 510 of the first flying object 500 illustrated in FIG. 10 may execute the first determination process of FIG. 4, the second determination process of FIG. 8, the usage determination process of FIG. 12, and the delivery control process of FIG. 13. The CPU 511 of the first flying object 500 may thereby function as an acquirer, a determiner, a notifier, a controller, and an updater, which are unillustrated, having functions similar to the acquirer 210, the determiner 220, the notifier 230, the controller 240, and the updater 250 of the control device 200 illustrated in FIG. 5, respectively. The flash memory 513*b* included in the control device 510 of the first flying object 500 may function as a non-illustrated information storage having a function similar to the information storage 290 of the control device 200 illustrated in FIG. 5.

Embodiment 2

Embodiment 1 describes that the predetermined purpose is to use the target area as a port. Embodiment 1 also describes that the control device 200 determines whether or not the target area is usable for a purpose of use as a port based on sensing data obtained by optical sensing of the target area by the first flying object 500.

Figure 15:
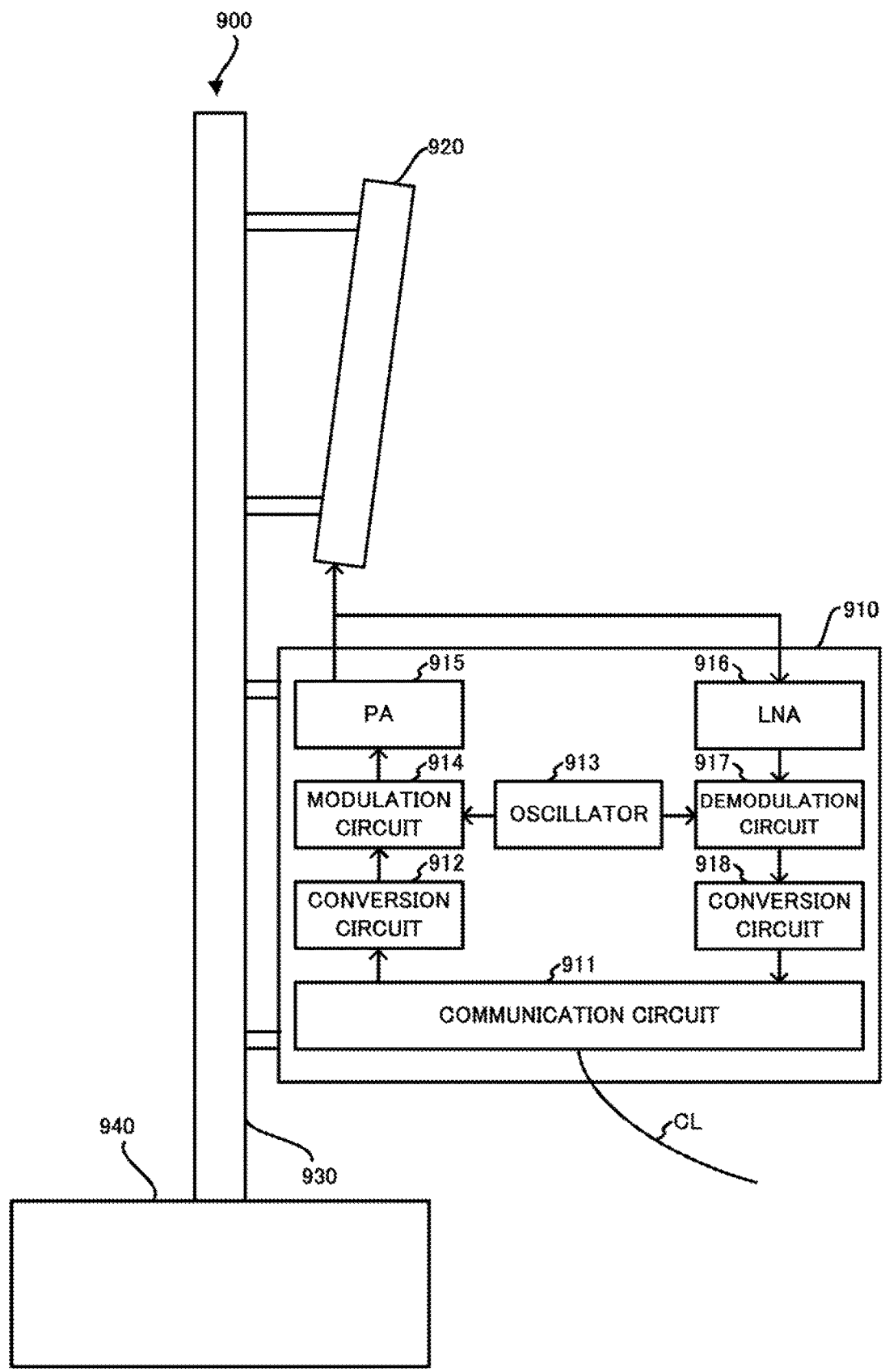
FIG. 15 is a configuration drawing illustrating a configuration example of a radio station.

However, this is not limited thereto. In the present embodiment, the predetermined purpose is to install a predetermined object, and the predetermined object is a radio station 900 as illustrated in FIG. 15 and the control device 200 determines whether or not the target area is usable for a purpose of installing the radio station 900 based on sensing data obtained by the first flying object 500. In the following, the configurations that are the same as those in Embodiment 1 are marked with the same reference numerals used in Embodiment 1, and the description focuses on the differences between the present embodiment and Embodiment 1.

In the present embodiment, it is assumed that an administrator of the target area desires to lease a target area to a mobile network operator who provides services of communication with a mobile including the terminal device 100. It is also assumed that the mobile network operator looks for a place to install the radio station 900 for expansion of a communications servicing area.

Figure 16:
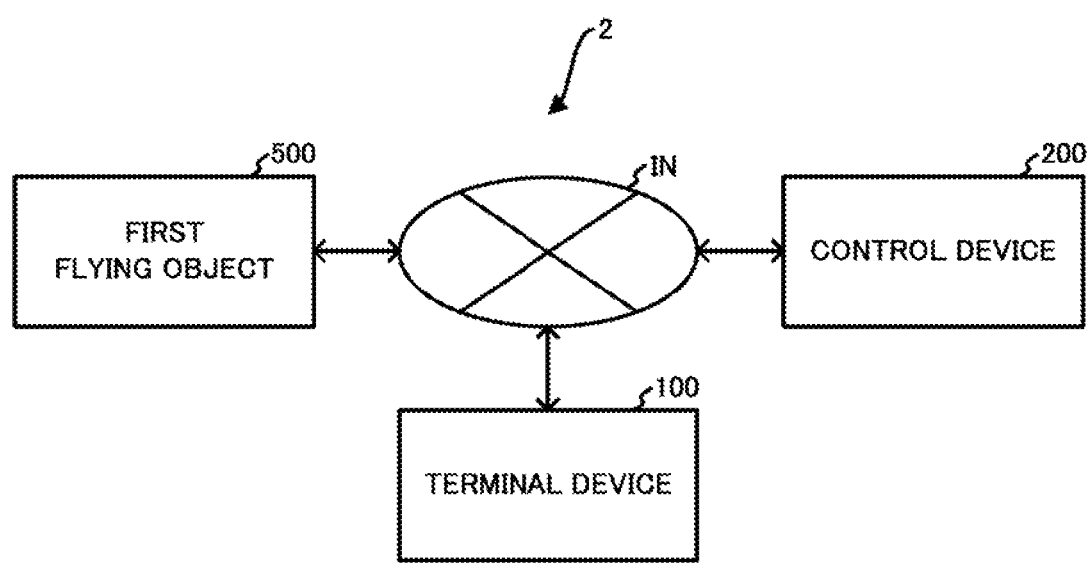
FIG. 16 is a system configuration drawing illustrating a configuration example of a determination system according to Embodiment 2.

Thus the terminal device 100 according to the present embodiment, together with the control device 200 and the first flying object 500, constitute a determination system 2 as illustrated in FIG. 16, which determines whether or not the target area is usable for the purpose of installing the radio station 900.

The radio station 900 of FIG. 15 includes a communication device 910 connected to an optical fiber cable CL connected to a network including the Internet IN and a telephone network, and an antenna 920 connected to the communication device 910. The radio station 900 includes a mast 930 that supports the communication device 910 and the antenna 920, and a base 940 that supports the mast 930.

The communication device 910 includes a communication circuit 911 that receives digital data via the optical fiber cable CL, a conversion circuit 912 that convers the digital data into an analog signal, and a oscillator 913 that generates a carrier signal. The communication device 910 also includes a modulation circuit 914 that generates a high-frequency modulation signal by mixing the carrier signal into a signal obtained by modulation of the analog signal, and a power amplifier (PA) 915 that amplifies the high-frequency modulation signal and outputs the amplified signal to the antenna 920. The antenna 920 radiates radio waves into a space in accordance with the signal output by the communication device 910.

The antenna 920 also receives radio waves propagating through the space and outputs a high-frequency reception signal corresponding to the received radio waves. The communication device 910 includes a low noise amplifier (LNA) 916 that amplifies the high-frequency reception signal output by the antenna 920, and a demodulation circuit 917 that generates a low-frequency signal by mixing the carrier signal into the amplified reception signal and generates a low-frequency demodulation signal by demodulating the generated signal. The communication device 910 includes a conversion circuit 918 that converts the low-frequency demodulation signal into digital data and output the digital data. The communication circuit 911 transmits the digital data output by the conversion circuit 918 via the optical fiber cable CL.

After moving to the target area, an administrator of the target area performs, to the input device 105c of the terminal device 100 illustrated in FIG. 2, an operation for causing transmission of a determination request for requesting determination as to whether or not the target area is usable for a purpose of installation of the radio station 900. Upon input of a signal corresponding to the operation by the input device 105c, the CPU 101 acquires a signal output by the GPS circuit 106, and acquires as information that represents latitude, longitude, and altitude of the target area, information that represents latitude, longitude, and altitude of the terminal device 100 represented by the acquired signal. Then the CPU 101 generates a determination request including the acquired information representing the latitude, the longitude, and the altitude, and outputs, specifying the control device 200 as a destination, the generated determination request to the data communication circuit 104a.

The control device 200 according to the present embodiment is installed at the office of the mobile network operator. Upon reception of the determination request by the data communication circuit 204 of the control device 200, the acquirer 210 of the control device 200 acquires a determination request from a data communication circuit 204, and acquires information that represents the latitude, the longitude, and the altitude of the target area included in the acquired determination request. Then the controller 240 generates a flight order that includes the information representing the latitude, the longitude, and the altitude of the target area and orders flight to the target area, and outputs, specifying the first flying object 500 as a destination, the generated flight order to the data communication circuit 204.

The first flying object 500 according to the present embodiment is installed at the office of the mobile network operator. The sensing device 552 of the first flying object 500 is a light detection and ranging (LiDAR) sensor that emits infrared laser light and receives reflection light of the emitted laser light and measures, based on time from the emittance of the laser light to the reception of the reflection light, a distance between the sensing device 552 and the object on which the laser light is reflected.

Figure 17:
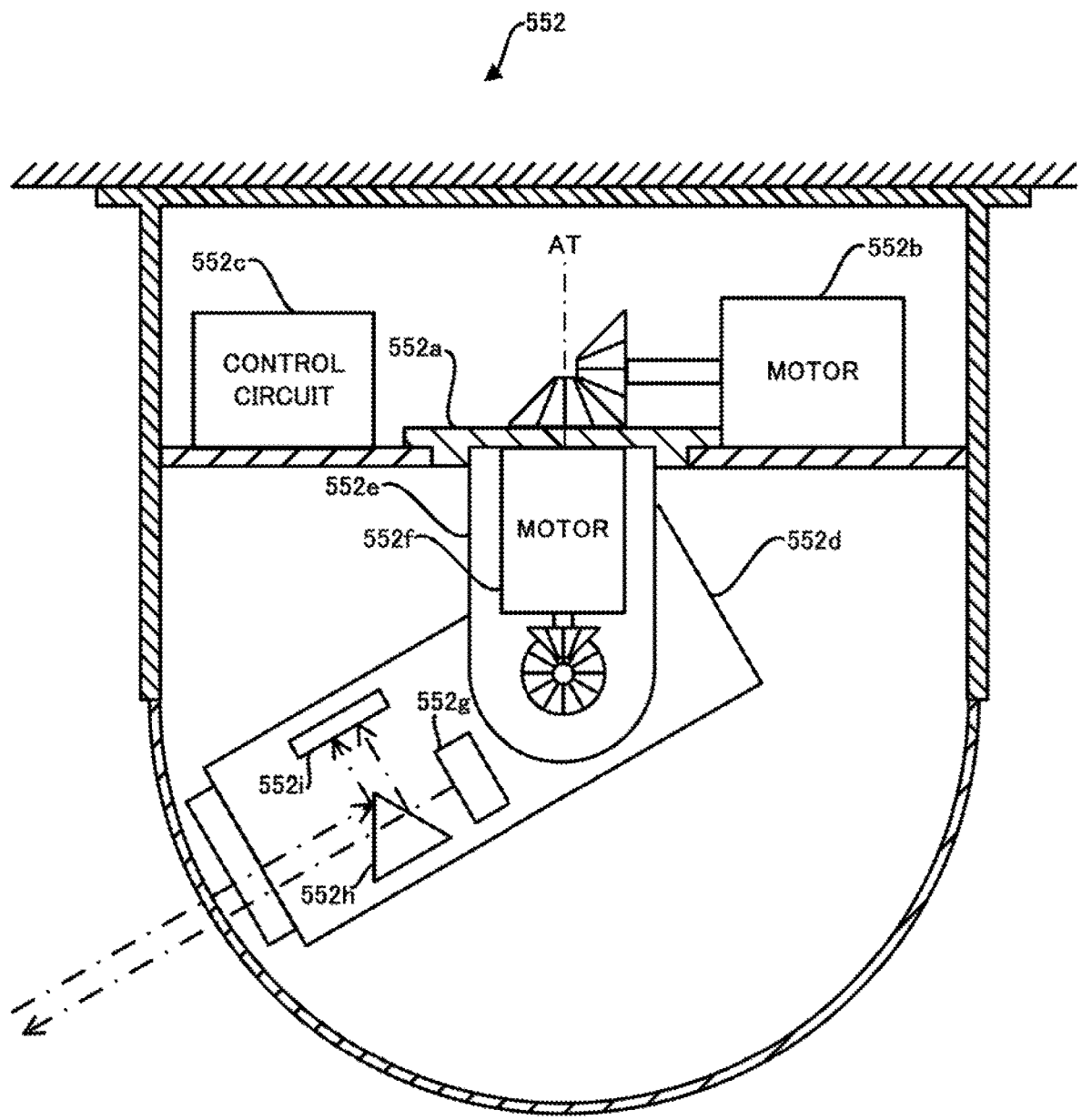
FIG. 17 is a configuration drawing illustrating a configuration example of a sensing device according to Embodiment 2.

The sensing device 552 includes a rotary table 552a having a rotation axis AT that is vertical as illustrated FIG. 17, a motor 552b that rotates the rotary table 552a, and a control circuit 552c that controls drive of the motor 552b. A support member 552e and a motor 552f are fastened on the underside of the rotary table 552a. The support member 552e pivotally supports protrusions that protrude outward in the horizontal direction from both sides of a measurement unit 552d that measures a distance between the measurement unit 552d and an object. The motor 552f swings the measurement unit 552d by turning gears formed on the protrusions.

The measurement unit 552d includes a diode 552g that outputs laser light, a half mirror 552h that splits the output laser light, and a light receiving element 552i that receives the laser light reflected on the half mirror 552h and outputs an electrical signal. The laser light having passed through the half mirror 552h is emitted to an object that is a target for distance measurement.

The reflection light of the emitted laser light is split on the half mirror 552h of the measurement unit 552d, and the reflection light reflected on the half mirror 552h is received by the light receiving element 552i.

The control circuit 552c is connected to the motor 552b and the motor 552f and the measurement unit 552d. The control circuit 552c turns the rotary table 552a by driving the motor 552b. An azimuth that forms a laser light irradiation direction and a predetermined reference direction is thereby changed in a range of 0 degrees to 360 degrees. The control circuit 552c swings the measurement unit 552d by driving the motor 552f. An angle of depression that forms the laser light irradiation direction and the horizontal direction is thereby changed in a range of 0 degrees to 90 degrees.

Upon acquisition of the signal for ordering sensing from the control device 510, the control circuit 552c executes a non-illustrated measurement process for measuring distances to objects in directions that are defined by the angle of depression from 0 degrees to 90 degrees and the azimuth from 0 degrees to 360 degrees.

Upon start of execution of the measurement process, the control circuit 552c performs a process for driving the motor 552f to cause the angle of depression between the laser light irradiation direction and the horizontal direction to be 0 degrees, and then performs a process for driving the motor 552b to cause the azimuth between the irradiation direction and the reference direction to be 0 degrees.

Then the control circuit 552c performs a process for causing the diode 552g to emit light. Then the control circuit 552c measures time from a time when the light receiving element 552i having received the laser light outputs an electrical signal to a time when the light receiving element 552i having received the reflection light outputs an electrical signal. Then the control circuit 552c measures, based on the measured time, a distance between a reflection point of the object on which the laser light is reflected and the sensing device 552.

Then the control circuit 552c calculates, based on the laser light irradiation direction and the measured distance, coordinate values of the reflection point in a three-dimensional XYZ-coordinate system in which the location of the sensing device 552 is set to the origin and the vertical downward direction is set to a z-axis direction.

Then the control circuit 552c drives the motor 552b so that azimuth in the irradiation direction increases by a predetermined step angle $\Delta\varphi$ (where $\Delta\varphi>0$), and then repeats the above process starting from a process for causing the diode 552g to emit light until the azimuth exceeds 360 degrees.

When the azimuth in the irradiation direction exceeds 360 degrees, the control circuit 552c drives the motor 552f such that the angle of depression in the irradiation direction increases by a predetermined step angle $\Delta\theta$ (where $\Delta\theta>0$). Then, until the angle of depression in the irradiation direction is 90 degrees, the control circuit 552c repeats the above process starting from a process for driving the motor 552b to cause the azimuth to be 0 degrees.

The sensing device 552 thereby calculates the coordinate values in the three-dimensional XYZ-coordinate system for points of the object located below the first flying object 500, and outputs sensing data that represents coordinate values of the calculated points.

Upon reception of the flight order by the data communication circuit 514 of the first flying object 500, the CPU 511 of the first flying object 500 executes processing of steps S21 to S24 of FIG. 11. After flying to the target area, the first flying object 500 thereby transmits to the control device 200 an arrival report for reporting arrival to the target area.

Then the data communication circuit 514 of the first flying object 500 receives from the control device 200 a sensing order that includes information representing the altitude H determined based on a height Hr of the radio station 900 and orders sensing of the target area from above in the sky of the target area at the altitude H. Then the CPU 511 of the first flying object 500 acquires the sensing order from the data communication circuit 514 and reads the information representing the altitude H from the sensing order.

Then the CPU 511 of the first flying object 500 generates a control signal for a hovering flight or a circular flight at an altitude H in the sky above the target area and outputs the generated control signal to the drive circuit 519, and outputs to the sensing device 552 a signal for ordering sensing.

Next, the CPU 511 of the first flying object 500 executes processing of steps S27 to S29. The first flying object 500 transmits to the control device 200 the sensing data output by the sensing device 552 and then returns to the office.

Figure 18:
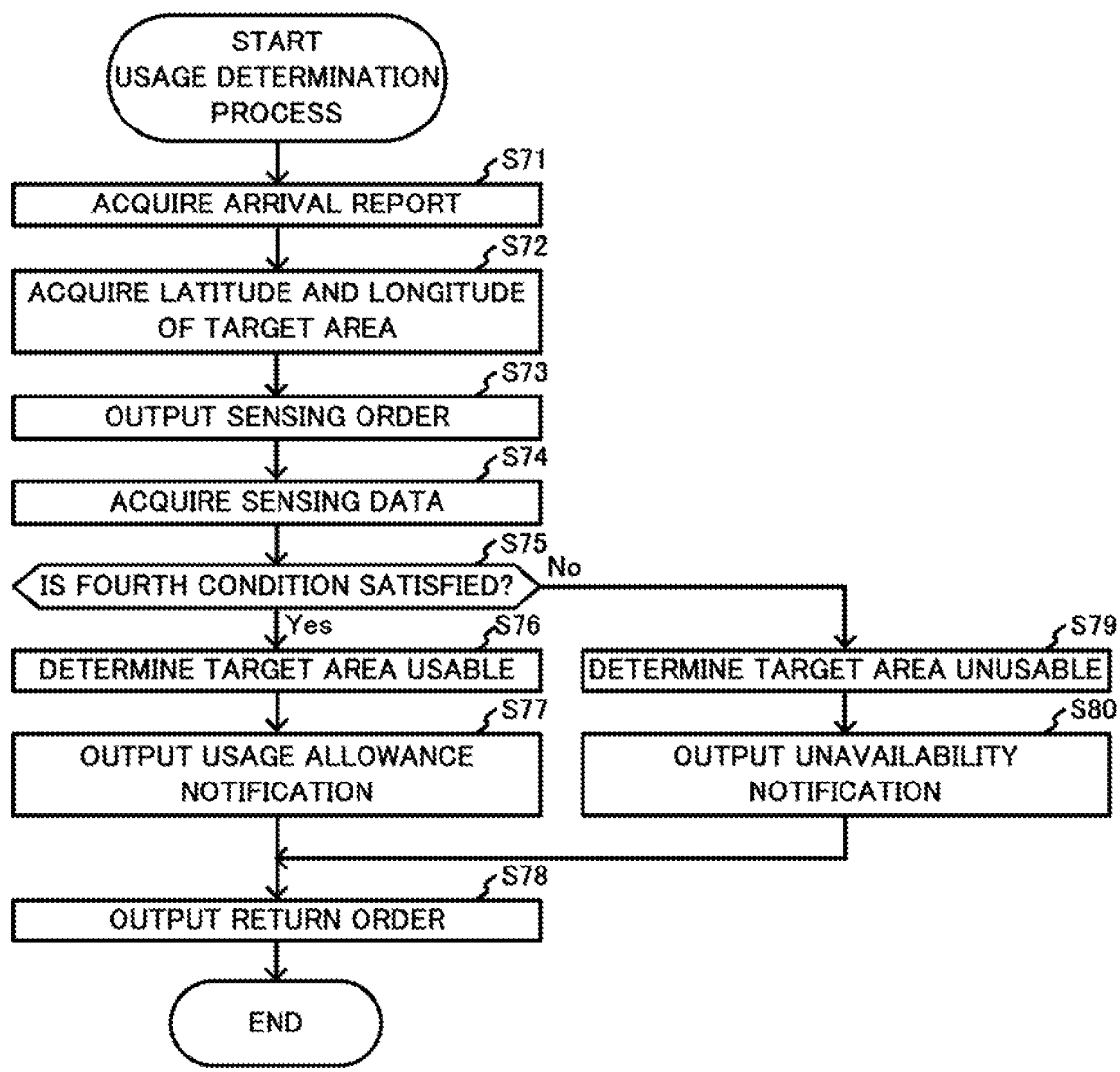
FIG. 18 is a flow chart illustrating an example of a usage determination process executable by a control device included the determination system according to Embodiment 2.

Upon reception of the arrival report by the data communication circuit 204 of the control device 200, the CPU 201 executes a usage determination process as illustrated in FIG. 18, for determining whether or not the target area is usable for a purpose of installing the radio station 900.

Upon start of execution of the usage determination process of FIG. 18, the acquirer 210 of the control device 200 acquires the arrival report from the data communication circuit 204 (step S71), and acquires, from the acquired arrival report, the information representing the latitude and the longitude of the target area at which the first flying object 500 arrives (step S72).

Next, the controller 240 reads from the information storage 290 the information that represents a height Hr of the radio station 900, and determines the altitude H for flight of the first flying object 500 to be an altitude higher by the height Hr of the radio station 900 than that of the target area. Such decision for the height H is made because sensing of the target area from above at the altitude H by the first flying object 500 enables the control device 200 to determine based on the sensing data whether or not space for installation of the radio station 900 having the height Hr exists above the target area.

Then the controller 240 generates a sensing order including information representing the altitude H, and outputs, specifying the first flying object 500 as a destination, the generated sensing order to the data communication circuit 204 (step S73). The data communication circuit 204 of the control device 200 transmits the sensing order to the first flying object 500 and then receives the sensing data from the first flying object 500. Then the acquirer 210 of the control device 200 acquires the sensing data from the data communication circuit 204 (step S74).

Then the determiner 220 determines, based on the acquired sensing data, whether or not the fourth condition that the target area has a sufficiently large area is satisfied (step S75). The target area having a sufficiently large area means that the target area has an area large enough to be suitable for installation of the radio station 900. The target area having an area large enough to be suitable for installation of the radio station 900 means that the target area is large enough to installation of the radio station 900. The radio station 900 being installable in the target area does not simply mean that the radio station 900 can be installed in the target area, but includes the meaning that, for example, after installation of the radio station 900, a part or a whole of the radio station 900 does not exist in an area adjoining the target area.

Thus the determiner 220 reads, from the information storage 290, information that represents a radius R of a minimum circle encompassing a horizontal projection shape of the radio station 900. The horizontal projection shape means a shape of the radio station 900 that is projected on a horizontal plane with light projected vertically downward from above when the radio station 900 is installed on the horizontal plane. Then, among multiple points whose coordinate values are represented by the sensing data, the determiner 220 specifies, based on the coordinate values, the central point located vertically downward of the sensing device 552 and points that are closer to the central point than a spherical surface located the radius R away from the central point. Then the determiner 220 calculates, for example using least squares, an equation that represents a plane having a minimum total of distances between the plane and the specified points.

Then the determiner 220 specifies, based on the coordinate values of the multiple points and the calculated equation and as a candidate point that is a candidate of a point located on the surface of the target area, the point close to the plane than the boundary plane located a predetermined distance away from the plane represented by the equation among the points represented by the coordinate values by the sensing data. Then the determiner 220 specifies, as a candidate area that is a candidate of an area corresponding to the surface of the target area, one or more areas that are surrounded by the candidate points and do not include a point that is different from the candidate point.

Then, based on the coordinate values of the specified one or more candidate areas, the determiner 220 specifies, as an area corresponding to the surface of the target area, a candidate area that is closest from the sensing device 552 or a candidate area having a greatest area in the one or more candidate areas. The determiner 220 also specifies, as a geometry of the surface of the target area, the geometry of the specified area, and specifies, as points located on the surface of the target area, candidate points included in the specified geometry.

Next, the determiner 220 reads, from the information storage 290, information that represents a horizontal projection shape of the radio station 900. Then the determiner 220 determines, based on the coordinate values of the point located on the surface of the target area, whether or not the horizontal projection shape represented by the read information is included in the geometry of the surface of the specified target area.

Upon determination that the horizontal projection shape of the radio station 900 is included in the geometry of the surface of the target area, the determiner 220 determines that the fourth condition that the target area has a sufficiently large area is satisfied (Yes in step S75). Since an obstacle does not exist in the space between the surface of the target area and a plane located at the altitude H taking the target area as reference, the determiner 220 determines that over the target area, there is a space large enough for installation of the radio station 900 having a height Hr. Then since the target area has a sufficiently large area, the determiner 220 determines that the target area is usable for a purpose of installation of the object that is the radio station 900 (step S76).

Then the notifier 230 generates usage allowance notification that notifies that the target area is usable for the purpose. The notifier 230 acquires from the information storage 290 the information representing an address stored in advance in association with the information representing latitude and longitude of the target area acquired in step S72. Then the notifier 230 causes the display device 205b of the control device 200 illustrated in FIG. 3 to display the usage allowance notification and the information representing the address of the target area. The notifier 230 outputs, specifying the terminal device 100 as a destination, usage allowance notification to the data communication circuit 204 of FIG. 3 (step S77).

Then the controller 240 outputs, specifying the first flying object 500 as a destination, a return order for ordering the return to the office to the data communication circuit 204 (step S78), and ends execution of the usage determination process.

Upon reception of the usage allowance notification by the data communication circuit 104a of the terminal device 100 illustrated in FIG. 2, the CPU 101 of the terminal device 100 performs control to cause the display device 105b to display the usage allowance notification. The administrator having confirmed displaying on the terminal device 100 prepares lease agreement of the target area. An employee of the mobile network operator having confirmed displaying on the control device 200 visits the display address and makes the lease agreement of the target area with the administrator. Then an employee instructs a worker of the mobile network operator to install the radio station 900, and the worker conducts construction to install the radio station 900 in the target area.

In step S75, upon determination that there is no candidate area that is a candidate of an area corresponding to the surface of the target area, or upon determination that the horizontal projection shape of the radio station 900 is not included in the geometry of the surface of the target area, the determiner 220 determines that the fourth condition that the target area has a sufficiently large area is not satisfied (No in step S75). The determiner 220 determines that over the target area, there is no space large enough for installation of the radio station 900. Then the determiner 220 determines that the target area is unusable for a purpose of installation of the radio station 900 (step S79).

Then the notifier 230 generates unavailability notification that notifies that the target area is unusable for the purpose and the area of the target area is not sufficiently large, and outputs, specifying the terminal device 100 as a destination, the generated unavailability notification to the data communication circuit 204 (step S80). Then the controller 240 outputs a return order to the first flying object 500 (step S78), and ends execution of the usage determination process.

Upon visual confirmation of the unavailability notification displayed on the terminal device 100, the administrator of the target area retries to determine a larger area as the target area, and performs an operation to the terminal device 100 to cause sending of the determination request again.

According to these configurations, the determiner 220 of the control device 200 determines whether or not the target area is usable for a purpose of installation of the radio station 900 based on sensing data obtained by the first flying object 500 by optically sensing the target area. Thus, for example, there is no need for personnel of the mobile network operator to visit the target area to determine whether or not the radio station 900 can be installed in the target area, and the control device 200 can thereby reduce personnel costs for determination. In addition, the control device 200 can improve determination accuracy because the determination is made based on new and detailed data, for example, compared with a case of the determination based on a map on which the target area is depicted, even without personnel visiting the target area.

The present embodiment describes that the sensing device 552 emits infrared laser light, but the laser light may be ultra-violet or visible light.

The present embodiment describes that the radio station 900 being installable in the target area includes the meaning that, for example, after installation of the radio station 900, a part or a whole of the radio station 900 does not exist in an area adjoining the target area, but this is not limited thereto. The radio station 900 being installable in the target area includes the meaning that, for example, after installation of the radio station 900, the target area has a space for working such as maintenance, repairing, and cleaning of the radio station 900 by the personnel in the target area. In this case, the determiner 220 of the control device 200 may determine whether or not a shape enlarged by a predetermined scaling factor RT (where RT>1) of the horizontal projection shape of the radio station 900 is included in the geometry of the surface of the target area.

Modified Example 1 of Embodiment 2

Embodiment 2 describes that the predetermined object is the radio station 900, the predetermined purpose is to install the radio station 900, and the control device 200 determines whether or not the target area is usable for a purpose of installation of the radio station 900, but this is not limited thereto.

The predetermined object may be a mobile base station vehicle, the predetermined purpose may be to park the mobile base station vehicle, and the control device 200 may determine whether or not the target area is usable for the purpose of parking the mobile base station vehicle. In this case, it is sufficient that the information storage 290 of the control device 200 stores information that represents a horizontal projection shape of the mobile base station vehicle. It is also sufficient that the determiner 220 of the control device 200 determines whether or not the horizontal projection shape of the mobile base station vehicle is included in the geometry of the surface of the target area specified based on the sensing data.

The predetermined object is not limited thereto, and may be anything that is different from buildings constructed in the target area, for example.

The predetermined purpose may be to construct a predetermined building, and the control device 200 may determine whether or not the target area is usable for a purpose of constructing a predetermined building. In this case, it is sufficient that the information storage 290 of the control deice 200 stores information representing the horizontal projection shape of a predetermined building specified from a design drawing of the building.

The predetermined building may be, for example, a pylon on which the communication device 910 and the antenna 920 illustrated in FIG. 15 are installed. The predetermined building may be a house, a condominium, an office building, a commercial building, a hospital, or a school.

The predetermined purpose may be to both install a predetermined object and construct a predetermined building, and the control device 200 may determine whether or not the target area is usable for purposes of installing the predetermined object and constructing the predetermined building. In this case, the determiner 220 of the control device 200 may determine whether or not the horizontal projection shape of the predetermined object and horizontal projection shape of the predetermined building are included in the geometry of the surface of the target area specified based on the sensing data, without both of the horizontal projection shapes overlapping each other.

The predetermined purpose may be any other one except installation of the predetermined object and construction of the predetermined building.

Modified Example 2 of Embodiment 2

Embodiment 2 describes that the sensing device 552 of the first flying object 500 is a LiDAR sensor, but may be a digital stereo camera. In this case, it is sufficient that the determiner 220 of the control device 200 specifies, based on parallax of two images represented by the sensing data, coordinate values in the XYZ-coordinate system for points, and specifies the geometry of the target area using the specified coordinate values.

Modified Example 3 of Embodiment 2

Embodiment 2 describes that the fourth condition is a condition that the target area has a sufficiently large area, but this is not limited thereto. The fourth condition according to the present modified example is a condition that the gradient of the surface of the target area is sufficiently small.

The gradient of the surface of the target area being sufficiently small means that the gradient of the surface is small enough to be suitable for installation of the radio station 900. The gradient of the surface being small enough to be suitable for installing of the radio station 900 includes the meaning that the gradient is small enough for the radio station 900 to be installed on the surface. The gradient being small enough for the radio station 900 to be installed does not simply mean that the gradient is small enough for the radio station 900 to be installed in the target area but for the radio station 900 to be installed safely in the target area.

The radio station 900 being able to be installed safely in the target area includes the meaning that, for example, a probability of falling over of the radio station 900 itself or the worker in the construction for installation of the radio station 900 is lower than a predetermined probability, or a probability of falling over or displacement of the radio station 900 after the installation, for example when an external force is applied due to an earthquake or a strong wind whose speed is faster than a predetermined speed is lower than a predetermined probability.

Thus, in step S75 of FIG. 18, the determiner 220 of the control device 200 specifies, based on the sensing data obtained by the sensing device 552 of the first flying object 500 that is a LiDAR sensor, points located on the surface of the target area, similarly to Embodiment 2. Then the determiner 220 calculates, as an equation that represents the surface of the target area, an equation that represents a plane having a minimum total of distances between the plane and the points located on the surface of the target area. Then the determiner 220 calculates an angle θ that represents the inclination of the surface of the target area by executing the process described in Modified Example 1 of Embodiment 1, using the calculated equation.

Then, upon determination that the calculated angle θ is equal to or less than the fourth threshold represented by the information prestored in the information storage 290, the determiner 220 determines that the fourth condition that the gradient of the surface of the target area is sufficiently small is satisfied (Yes in step S75). Then the determiner 220 determines that the target area is usable for the purpose of installation of the radio station 900 (step S76). A person skilled in the art can determine, by experiment, a suitable value of the fourth threshold.

By contrast, upon determination that the calculated angle θ is greater than the fourth threshold, the determiner 220 determines that the fourth condition is not satisfied (No in step S75). Then the determiner 220 determines that the target area is unusable for the purpose of installation of the radio station 900 because the gradient of the surface of the target area is not sufficiently small (step S79).

Modified Example 4 of Embodiment 2

Modified Example 3 of Embodiment 2 describes that the sensing device 552 of the first flying object 500 is a LiDAR sensor, but may be a digital stereo camera. In this case, it is sufficient that the determiner 220 of the control device 200 specifies, based on parallax of two images represented by the sensing data, coordinate values in the three-dimensional XYZ-coordinate system for points, and specifies the gradient of the surface of the target area using the specified coordinate values.

Modified Example 5 of Embodiment 2

Modified Example 3 of Embodiment 2 describes that the sensing device 552 of the first flying object 500 is a LiDAR sensor, but this is not limited to thereto. The sensing device 552 according to the present modified example is an optical acceleration sensor, and detects an acceleration of gravity of "1.0" G when the first flying object 500 is landing on the horizontal plane, and detects an acceleration of gravity of "cos θ" G when the first flying object 500 is landing on the inclined surface having an angle of θ degree relative to the horizontal plane.

Thus the first flying object 500 detects the acceleration of gravity with the sensing device 552 from landing on the target area to taking off there, and transmits to the control device 200 the sensing data representing the detected acceleration of gravity. The control device 200 calculates, based on the acceleration of gravity represented by the sensing data, an angle θ that represents inclination of the surface of the target area.

Modified Example 6 of Embodiment 2

Embodiment 2 describes that the fourth condition is a condition that the target area has a sufficiently large area, but this is not limited thereto. The fourth condition according to the present modified example is a condition that a degree of unevenness of the surface of the target area is sufficiently small.

The degree of unevenness of the surface of the target area being sufficiently small means that the degree of unevenness of the surface is small enough to be suitable for installation of the radio station 900. The degree of unevenness of the surface being small enough to be suitable for installation of the radio station 900 includes the meaning that the degree of evenness is small enough for the radio station 900 to be installed on the surface. The degree of unevenness being small enough for the radio station 900 to be installed does not simply mean that the degree of unevenness is small enough for the radio station 900 to be installed in the target area, but for the radio station 900 to be installed safely in the target area.

Thus, in step S75 of FIG. 18, the determiner 220 of the control device 200 specifies, based on the sensing data obtained by the sensing device 552 of the first flying object 500 that is a LiDAR sensor, points located on the surface of the target area, similarly to Embodiment 2. Then the determiner 220 executes processing described in Modified Example 2 of Embodiment 1, and thereby calculates the degree of unevenness on the surface of the target area based on the coordinate values of the points represented by the sensing data. Then the determiner 220 determines whether or not the calculated degree of unevenness is greater than the fifth threshold represented by the information prestored in the information storage 290. A person skilled in the art can determine, by experiment, a suitable value of the fifth threshold.

Upon determination that the degree of unevenness is equal to or less than the fifth threshold, the determiner 220 determines that the fourth condition that the degree of unevenness of the surface of the target area is sufficiently small is satisfied (Yes in step S75). Then the determiner 220 determines that the target area is usable for the purpose of installation of the radio station 900 because the degree of unevenness of the surface is suitable for installation of the radio station 900 (step S76).

By contrast, upon determination that the degree of unevenness is greater than the fifth threshold, the determiner 220 determines that the fourth condition is not satisfied (No in step S75), and determines that the target area is unusable for the purpose of installation of the radio station 900 (step S79).

Modified Example 7 of Embodiment 2

Modified Example 6 of Embodiment 2 describes that the sensing device 552 of the first flying object 500 is a LiDAR sensor, but may be a digital stereo camera. In this case, the determiner 220 of the control device 200 may identify the degree of unevenness of the surface of the target area using the coordinate values of the XYZ coordinate system of the points specified based on the parallax of the two images represented by the sensing data.

Modified Example 8 of Embodiment 2

Embodiment 2 describes that the fourth condition is a condition that the target area has a sufficiently large area, but this is not limited thereto. The fourth condition according to the present modified example is a condition that the altitude of the target area is suitable for installation of the radio station 900.

In the present modified example, the target area is described as, for example, an area on a rooftop of a building, a condominium, or a school, or a mountain or hilly region. The altitude of the target area takes, as a reference plane, a ground level such as a ground surface, a water surface of a river or a lake, or sea surface that adjoins or is located near the target area and is represented by a distance from the reference plane. By contrast, a GPS altitude takes as a reference plane, a surface of spheroid that approximates the geometry of the ground surface.

The determiner 220 of the control device 200 according to the present modified example, in step S75 of FIG. 18, specifies, based on the sensing data generated by the sensing device 552 of the first flying object 500 that is a LiDAR sensor, points located on the surface of the target area, similarly to Modified Example 3 of Embodiment 2. Then the determiner 220 specifies a point closest to the sensing device 552 among points located on the surface of the target area based on the coordinate values of the points in the XYZ-coordinate system taking the sensing device 552 as the origin. Then the determiner 220 calculates a distance from the specified point to the sensing device 552 as a distance from the target area to the sensing device 552.

Then the determiner 220 performs, based on the coordinate values represented by the sensing data, for example, pattern matching for a point different from the points located on the surface of the target area to specify points located on the ground level. In the pattern matching, the determiner 220 uses, for example, a three-dimensional pattern of a road and an intersection and a three-dimensional pattern of waves occurring in the sea or a lake. Then the determiner 220 specifies, among the points located in the specified ground level, a point closest to the target area or one of one or more points spaced apart by a distance shorter than a predetermined distance from the point located on the surface of the target area. Then the determiner 220 calculates the distance from the specified point to the sensing device 552 as a distance from the ground level adjoining or located near the target area to the sensing device 552.

Then the determiner 220 calculates the altitude of the target area taking subtracts a distance from the target area to the sensing device 552 from the distance from the ground level to the sensing device 552. Then the determiner 220 determines whether or not the calculated altitude of the target area is equal to or greater than the first altitude and equal to or less than the second altitude that are represented by information prestored in the information storage 290.

Then upon determination that the altitude of the target area is equal to or greater than the first altitude and equal to or less than the second altitude, the determiner 220 determines that the fourth condition that the altitude of the target area is suitable for installation of the radio station 900 is satisfied (Yes in step S75). Then the determiner 220 determines that the target area is usable for the purpose of installation of the radio station 900 because the altitude of the target area is suitable for installation of the radio station 900 (Step S76).

By contrast, upon determination that the altitude of the target area is lower than the first altitude or higher than the second altitude, the determiner 220 determines that the fourth condition is not satisfied (No in step S75), and determines that the target area is unusable for the purpose of installation of the radio station 900 (step S79).

The present modified example describes that the sensing device 552 of the first flying object 500 is a LiDAR sensor, but this may be a digital stereo camera.

The present modified example describes that the altitude suitable for installation of the radio station 900 is equal to or greater than the first altitude and equal to or less than the second altitude. The altitude being suitable for installation of the radio station 900 includes an altitude that allows the radio station 900 to transmit a radio wave having an intensity equal to or more than a predetermined intensity SS at a measurement point when a difference between the altitude of the ground level taken as the reference plane of the altitude and the altitude of a measurement point of the ground level located apart by a predetermined distance from the radio station 900 is equal to or less than the predetermined distance. The altitude suitable for installation of the radio station 900 includes an altitude at which when a radio wave having a predetermined intensity SR is transmitted from the measurement point, the radio station 900 can receive the transmitted radio wave at intensity equal to or more than a predetermined intensity S.

It is described that the predetermined purpose according to the present modified example is to install the predetermined object, the predetermined object is a radio station 900, and the fourth condition is a condition that the altitude of the target area is suitable for installation of the radio station 900. It is described that the determiner 220 according to the present modified example determines that the fourth condition is satisfied (Yes in step S75) when the altitude of the target area taking the ground level as reference is equal to or more than the first altitude and equal to or less than the second altitude, and determines that the target area is usable for the purpose of installation of the radio station 900 (Step S76). By contrast, it is described upon determination that the fourth condition is not satisfied (No in step S75), the determiner 220 determines that the target area is unusable for the purpose of installation of the radio station 900 (step S76).

However, this is not limited thereto, and the predetermined purpose is to construct a predetermined construction, and the fourth condition is a condition that the altitude of the target area is suitable for construction of the predetermined building.

The predetermined building, when constructed on the target area, may be a pylon on which the communication device 910 and the antenna 920 illustrated in FIG. 15 can be installed at a height that is equal to or greater than the third altitude and equal to or less than the fourth altitude, taking the surface of the target area as a reference surface. In this case, the fourth condition may be a condition that the altitude of the target area is suitable for installation of the pylon. Furthermore, in this case, the determiner 220 may determine that the fourth condition is satisfied (Yes in step S75) when the altitude of the target area taking the ground level as a reference is equal to or greater than an altitude that is less by the fourth altitude than the first altitude and equal to or less than an altitude that is less by the third altitude than the second altitude, and may determine that the target area is usable for the purpose of installation of the pylon (step S76). By contrast, upon determination that the fourth condition is not satisfied (No in step S75), the determiner 220 may determine that the target area is unusable for the purpose of installation of the pylon (step S72).

This is not limited thereto, and the predetermined purpose may be, for example, that a viewer observes a flight state of an unmanned aerial vehicle including the first flying object 500 by the naked eye or, for example, using a telescope. In this case, the first altitude and the second altitude may be predetermined, for example, based on a range of the flight altitude of an unmanned aerial vehicle defined by law or by a company who produces, sells, or uses an unmanned aerial vehicle.

The predetermined purpose may be that a viewer observes a flight state of an unmanned aerial vehicle by the naked eye or using a telescope, and informs a manipulator of the unmanned aerial vehicle of the flight state of the unmanned aerial vehicle obtained by observation, for example, using a terminal device including a smartphone. In addition, the predetermined purpose may be to capture an image of an unmanned aerial vehicle with a digital camera, and transmit data that represents a dynamic picture image obtained by image capturing, via the terminal device connected to the digital camera to the terminal device used by the manipulator of the unmanned aerial vehicle or to the control device 200 for controlling flight of the unmanned aerial vehicle. In addition, the predetermined purpose may be to monitor, view, or observe predetermined animals including human, things, or natural phenomena.

Modified Example 9 of Embodiment 2

Modified Example 8 of Embodiment 2 describes that the control device 200 acquires the sensing data acquired by the sensing device 552 included in the first flying object 500 and calculates the altitude of the target area taking the ground level as a reference plane, but this is not limited thereto.

The control device 200 may acquire first data and second data. The first data represent the GPS altitude measured by the GPS circuit 516 of the first flying object 500 while the first flying object 500 is landing in the target area. The second data represents the GPS altitude measured by the GPS circuit 516 while the first flying object 500 is landing on the ground level. In this case, it is sufficient that the control device 200 calculates an altitude of the target area taking the ground level as a reference by subtracting the GPS altitude represented by the first data from the GPS altitude represented by the second data.

The first flying object 500 may include a non-illustrated quasi-zenith satellite system (QZSS) circuit that receives signals emitted from a quasi-zenith satellite, and measures latitude, longitude, and altitude based on the received signals, instead of the GPS circuit 516 that receives signals emitted from the GPS satellite. In this case, it is sufficient that the control device 200 calculates the altitude of the target area taking the ground level as a reference plane, based on the first data representing the altitude of the target area measured by the QZSS circuit and the second data representing the altitude of the ground level measured by the QZSS circuit. According to these configurations, the control device 200 can accurately calculate the altitude of the target area taking the ground level as a reference plane, compared with a case of using the GPS altitude measured by the GPS circuit 516.

The first flying object 500 may include a non-illustrated altitude sensor that measures altitude based on atmospheric pressure, instead of the GPS circuit 516. In this case, it is sufficient that the control device 200 calculates the altitude of the target area taking the ground level as a reference plane, based on the first data representing the altitude of the target area measured by the altitude sensor and the second data representing the altitude of the ground level measured by the altitude sensor.

Modified Example 10 of Embodiment 2

Modified Example 8 of Embodiment 2 describes that the fourth condition is a condition that the altitude of the target area is suitable for installation of the radio station 900, but this is not limited thereto. The fourth condition according to the present modified example is a condition that elevation of the target area is suitable for installation of the radio station 900. The present modified example describes that the elevation suitable for installation of the radio station 900 is an elevation that is equal to or greater than the first elevation and equal to or less than the second elevation.

The first flying object 500 according to the present modified example flies to the target area by execution of processing of steps S21 to S24 of FIG. 11. Then the first flying object 500 receives from the control device 200 a sensing order that includes information representing altitude H taking the target area as a reference plane and orders sensing the target area from above at the altitude H.

Then the CPU 511 of the first flying object 500 acquires the sensing order, and acquires information representing the altitude H included in the sensing order. Then the CPU 511 added the altitude H taking the target area as a reference plane to the GPS altitude of the target area represented by the information included in the flight order obtained in step S21. The CPU 511 thereby converts the altitude H taking the target area as a reference plane to the CPS altitude. Then the CPU 511 outputs to the drive circuit 519 the control signal for hovering over the target area at the calculated GPS altitude, and then outputs, to the sensing device 552 that is a LiDAR sensor, a signal for ordering sensing.

Then the CPU 511 of the first flying object 500 acquires information representing latitude and longitude of the target area included in the flight order. Then the CPU 511 outputs to the data communication circuit 514, specifying the control device 200 as a destination, the sensing data obtained by the sensing device 552 and the information representing the GPS altitude, latitude, and longitude of the first flying object 500. Then the first flying object 500 executes processing of steps S28 and S29 and then returns to the office.

The determiner 220 of the control device 200 according to the present modified example executes processing of step S74 of FIG. 18, and thereby acquires sensing data and information that represents GPS altitude, latitude, and longitude of the first flying object 500 that are when the sensing data is obtained (step S74). Then the determiner 220 executes processing described in Modified Example 8 of Embodiment 2 and then calculates a distance from the target area to the sensing device 552 of the first flying object 500. Then the determiner 220 calculates the GPS altitude of the target area by subtracting the distance from the target area to the sensing device 552 from the GPS altitude of the first flying object 500.

Then the determiner 220 acquires information that represents geoid height that is stored in advance in association with the information that represents latitude and longitude of the first flying object 500 and stored in the information storage 290. The GPS height takes as a reference plane the surface of spheroid that approximates the geometry of the ground surface, and the geoid height is a distance from the surface of the spheroid to the average sea level, and the elevation takes the average sea level as a reference plane. Thus the determiner 220 of the control device 200 calculates the elevation of the target area by subtracting the geoid height represented by the acquired information from the GPS altitude of the target area.

Then upon determination that the calculated elevation of the target area is equal to or greater than the first elevation and equal to or less than the second elevation that are represented by the information prestored in the information storage 290, the determiner 220 determines that the fourth condition that the elevation of the target area is suitable for installation of the radio station 900 is satisfied (Yes in step S75). Then the determiner 220 determines that the target area is usable for the purpose of installation of the radio station 900 because the elevation of the target area is suitable for installation of the radio station 900 (step S76).

By contrast, upon determination that the elevation of the target area is lower than the first elevation or higher than the second elevation, the determiner 220 determines that the fourth condition is not satisfied (No in step S75) and determines that the target area is unusable for the purpose of installation of the radio station 900 (step S79).

The present modified example describes that the determiner 220 of the control device 200 calculates the elevation of the target area by subtracting, from the GPS altitude of the target area, the geoid height associated with the information representing the latitude and longitude of the first flying object 500, but this is not limited thereto. For example, the determiner 220 may calculate the elevation of the target area by subtracting, from the GPS altitude of the target area, the geoid height associated with the information representing the latitude and longitude of the vertical datum such as Tokyo Bay or the like.

The present modified example describes that the fourth condition is a condition that the elevation of the target area is suitable for installation of the radio station 900, but this is not limited thereto. The fourth condition may be a condition that the sea level of the target area is suitable for installation of the radio station 900.

The fourth condition may be a condition that the elevation or the sea level of the target area is suitable for construction of a predetermined building.

Modified Example 11 of Embodiment 2

Modified Example 10 of Embodiment 2 describes that the sensing device 552 of the first flying object 500 is a LiDAR sensor, but may be digital stereo camera.

Modified Example 10 of Embodiment 2 describes that the control device 200 calculates the elevation of the target area based on the distance from the target area to the sensing device 552 calculated based on the sensing data, and the GPS altitude of the first flying object 500 that is when the sensing data is obtained, but this is not limited to thereto. The control device 200 may calculate the elevation of the target area by subtracting the geoid height from the altitude measured by the GPS circuit 516 or by the non-illustrated QZSS circuit of the first flying object 500 while the first flying object 500 lands in the target area.

In addition, the first flying object 500 may include an elevation sensor that measures elevation based on atmospheric pressure, and the control device 200 may receive from the first flying object 500 the sensing data representing the elevation measured by the elevation sensor while the first flying object 500 lands in the target area.

Modified Example 12 of Embodiment 2

Embodiment 2 describes that the fourth condition is a condition that the target area has a sufficiently large area, but this is not limited thereto. The fourth condition according to the present modified example is a condition that a positional relationship between the target area and the building around the target area is sufficiently good.

In the present modified example, it is described that the surroundings of the target area is an area from a boundary line far apart from the target area by a predetermined distance to the target area. The positional relationship between the target area and the building around the target area being sufficiently good means that the positional relationship is good enough to be suitable for installation of the radio station 900. The positional relationship being good enough to be suitable for installation of the radio station 900 includes a positional relationship in which when the radio station 900 is installed in the target area, the building in the surrounding that interferes or might interfere propagation of radio waves emitted from the radio station 900 to the air has a surface (hereinafter referred to as an interference surface) having an area that is equal to or less than a predetermined area S. The interference surface includes a surface of a surrounding building in a range of a predetermined altitude based on a location of the target area. In the present modified example, it is described that the range of the predetermined altitude is a range that is higher than an altitude of the target area and is equal to or less than the altitude that is higher by the altitude Hh (where Hh>0) than the target area.

The first flying object 500 according to the present modified example optically senses the target area with the sensing device 522 that is a LiDAR sensor while hovering or the like at an altitude higher by the altitude Hh than the altitude of the target area in accordance with the sensing order transmitted by the control device 200.

The determiner 220 of the control device 200 according to the present modified example, in step S75 of FIG. 18, specifies points located on the surface of the target area based on the sensing data by executing processing described in Embodiment 2. The determiner 220 calculates an equation representing the surface of the target area by executing processing described in Modified Example 3 of Embodiment 2.

Then the determiner 220 specifies, based on the coordinate values, points that are closer to the origin than the surface represented by the equation among the points represented by the sensing data. The determiner 220 thereby specifies points within a range of predetermined altitudes.

Then the determiner 220 specifies the boundary line far apart by a predetermined distance in the horizontal direction from the outer periphery of the target area, and specifies, based on the coordinate values, points that are closer to the target area than a vertical boundary curved plane having a whole specified boundary line on the surface. The determiner 220 thereby specifies points that are in a range of predetermined altitude and are in the surrounding of the target area.

Then the determiner 220 calculates an area of the interference surface by counting the number of the specified points. Then, upon determination that the calculated area of the interference surface is equal to or less than an area S represented by the information prestored in the information storage 290, the determiner 220 determines that the fourth condition that the positional relationship between the target area and the building located around the target area is sufficiently good is satisfied (Yes in step S75). Then the determiner 220 determines that the target area is usable for the purpose of installation of the radio station 900 (step S76). A person skilled in the art can determine, by experiment, a suitable value of the area S.

By contrast, upon determination that the calculated area of the interference surface is larger than the area S, the determiner 220 determines that the fourth condition is not satisfied (No in step S75). Then the determiner 220 determines that the target area is unusable for the purpose of installation of the radio station 900 (Step S79).

The present modified example describes that the range of the predetermined altitude is higher than the altitude of the target area and is equal to or less than the altitude that is higher by the altitude Hh than the target area, but this is not limited thereto. The range of the predetermined altitude may be a range from the altitudes H1 to H2 (where H1<H2) taking the surface of the target area as a reference, and may include an altitude that is lower than the altitude of the target area.

The present modified example describes that the sensing device 552 of the first flying object 500 is a LiDAR sensor, but this may be a digital stereo camera.

It is described that the predetermined purpose according to the present modified example is to install in the target area the radio station 900 that is a predetermined object, and the fourth condition is a condition that the positional relationship between the target area and the building around the target area is good enough to suitable for installation of the radio station 900. However, this is not limited thereto, and the predetermined purpose may be to construct a predetermined building, and the fourth condition may be a condition that the positional relationship between the target area and the building around the target area is good enough to be suitable for construction of the predetermined building.

Modified Example 13 of Embodiment 2

Modified Example 8 or 10 of Embodiment 2 and Modified Example 12 of Embodiment 2 can be combined with each other. Thus the fourth condition may be a condition that the altitude, the elevation, or the sea level of the target area is suitable for installation of the radio station 900 that is the predetermined object or for construction of the predetermined building and the positional relationship between the target area and the building around the target area is sufficiently good.

Modified Example 14 of Embodiment 2

Modified Example 2 of Embodiment 2 can be combined with Embodiment 1. Thus, upon execution of the operation for transmission of the determination request by the administrator of the target area, the terminal device 100 according the present modified example transmits, to the control device 200, by execution of processing described in Embodiment 1, the determination request, the first image file generated by image capturing of the target area, the destination information that represents a destination of the cover that covers the target area for indicating that the target area is a place where the radio station 900 is desired to be installed.

The control device 200 according to the present modified example executes processing similar to the first determination processing illustrated in FIG. 4, upon reception of the determination request, the first image file, and the destination information. The determiner 220 of the control device 200 thereby determines whether or not the materials of the surface of the target area are sufficiently hard.

In the present modified example, the materials being sufficiently hard means that the materials are hard enough to be suitable for installation of the radio station 900. The materials being hard enough to be suitable for installation of the radio station 900 includes the meaning that the materials are hard enough to install the radio station 900 on the surface of the target area made up of the materials. The radio station 900 being installable in the target area does not simply mean that the radio station 900 can be installed in the target area but means that the radio station 900 can be installed safely in the target area. The radio station 900 being installable safely in the target area includes the meaning that, as described in Modified Example 3 of Embodiment 2, for example, a probability of falling over of the radio station 900 itself or the worker in the construction for installation of the radio station 900 is lower than a predetermined probability, or a probability of falling over or displacement of the radio station 900 after the installation is lower than a predetermined probability.

Thus the materials being sufficiently hard includes the meaning that the materials are hard enough not to cause deformation of the geometry of the surface due to a weight of the radio station 900 at the time of installation or after installation of the radio station 900 on a surface of the target area made up of the materials; or even if the deformation occurs, the materials are hard enough to keep a probability of tipping over or displacement of the radio station 900 lower than a predetermined probability; or even if the geometry of the surface changes, the materials are so hard that there is no such probability.

Upon determination that the materials of the surface of the target area are not sufficiently hard, the determiner 220 of the control device 200 determines that the first condition that the hardness of the target area is suitable for installation of the radio station 900 is not satisfied. Then the determiner 220 determines that the target area is unusable for the purpose of installation of the radio station 900. By contrast, upon determination that the first condition is satisfied, the controller 240 of the control device 200 causes sending of cover to the destination represented by the destination information.

The shape of the cover according to the present modified example is square or rectangular and is large enough to encompass a horizontal projection shape of the radio station 900. The administrator, upon reception of the cover, installs the cover over the surface of the target area similarly to Embodiment 1, and performs an image capturing operation after causing the cover to be included in an angle of view of the digital camera 107 included in the terminal device 100. Then the terminal device 100 transmits to the control device 200 an installation report that reports completion of covering the target area with the cover and a second image file generated by capturing of an image of the cover.

Upon reception of the installation report and the second image file, the control device 200 executes processing similar to the second determination process illustrated in FIG. 8. The determiner 220 of the control device 200 thereby determines whether or not the target area whose surface is imaged to obtain the first image is identical to the target area whose surface is covered with the cover imaged to obtain the second image.

Upon determination that these target areas are not identical to each other, the notifier 230 outputs, specifying the terminal device 100 as a destination, non-usage notification for notifying that the target area of the first image differs from the target area of the second image and neither of the target areas is not used for the purpose of installation of the radio station 900.

By contrast, upon determination that these target areas are identical to each other, the determiner 220 of the control device 200 determines whether or not the second condition that the cover is fully spread out is satisfied. Then, upon determination that the second condition is not satisfied, the determiner 220 determines that the target area does not have a sufficiently large area. Then the determiner 220 determines that the target area is unusable for the purpose of installation of the radio station 900.

By contrast, upon determination that the second condition is satisfied, the determiner 220 of the control device 200 determines that the target area has a sufficiently large area. Then the controller 240 of the control device 200 outputs, specifying the first flying object 500 as a destination, a flight order for ordering a flight to the target area.

The first flying object 500 according to the present modified example transmits to the control device 200 the sensing data after optical sensing of the target area above the target area at the altitude H by executing processing similarly to Embodiment 2.

The control device 200 according to the present modified example executes processing similar to the usage determination process illustrated in FIG. 12. The determiner 220 of the control device 200 thereby determines whether or not the target area with a surface covered with a cover that is imaged to obtain a second image is identical to the target area with a surface covered with a cover that is optically sensed.

Upon determination that these target areas are not identical to each other, the notifier 230 outputs, specifying the terminal device 100 as a destination, non-usage notification for notifying that the target area imaged to obtain the second image is not used for the purpose of installation of the radio station 900 and the target area does not exist at the latitude, longitude, and the altitude stored in the second image file.

Upon determination that these target areas are identical to each other, the determiner 220 of the control device 200 determines, based on the sensing data, whether or not the fourth condition described in Embodiment 2 instead of the third condition described in Embodiment 1 is satisfied. Upon determination that the fourth condition that the target area has a sufficiently large area is satisfied, the determiner 220 determines that the target area is usable for the purpose of installation of the radio station 900. By contrast, upon determination that the fourth condition is not satisfied, the determiner 220 determines that the target area is unusable for the purpose of installation of the radio station 900.

The present modified example descries a combination of Embodiment 1 and Modified Example 2 of Embodiment 2 in which the target area is sensed by the sensing device 552 of the first flying object 500 that is a digital stereo camera, but this is not limited thereto. Embodiment 1 and Embodiment 2 in which the target area is sensed by the sensing device 552 that is LiDAR sensor may be combined. In this case, in step S36 of FIG. 12, the determiner 220 may generate a target area image that is the third image, for example, by executing perspective projection processing using three-dimensional coordinate values of points represented by the sensing data and a predetermined parameter including a focal length. Then the determiner 220 may determine whether or not the target area of the second image obtained in step S33 and the target area of the generated third image are identical to each other.

Modified Example 15 of Embodiment 2

Embodiment 2 describes that the administrator of the target area performs to the terminal device 100 an operation to transmit the determination request, but this is not limited thereto. For example, an employee of the mobile network operator not having knowledge of determining whether or not the radio station 900 is installable may perform the operation to the terminal device 100. Even one having such knowledge may perform the operation to the terminal device 100 to confirm if his or her determination is correct.

Embodiments 1 and 2, Modified Examples 1 to 17 of Embodiment 1, and Modified Examples 1 to 15 of Embodiment 2 of the present disclosure may be combined to one another.

The present disclosure can be provided as a control device 200 including a configuration for implementing functions according to any one of Embodiments 1 and 2, Modified Examples 1 to 16 of Embodiment 1, Modified Examples 1 to 15 of Embodiment 2, and as a control device 510 including a configuration for implementing functions according to Modified Example 17 of Embodiment 1, as well as a system including a plurality of devices and including, as a whole system, a configuration for implementing functions according to any one of Embodiments 1 and 2, Modified Examples 1 to 17 of Embodiment 1, and Modified Examples 1 to 15 of Embodiment 2.

The present disclosure can be provided as a control device 200 that includes in advance a configuration for implementing functions according to any one of Embodiments 1 and 2, Modified Examples 1 to 16 of Embodiment 1, and Modified Examples 1 to 15 of Embodiment 2 of the present disclosure. Additionally, by applying a program, an existing control device can be made to function as the control device 200 according to each of Embodiments 1 and 2, Modified Examples 1 to 16 of Embodiment 1, and Modified Examples 1 to 15 of Embodiment 2. That is, by applying a program for realizing the various functional configurations of the control device 200 described in any of Embodiments 1 and 2 described above, Modified Examples 1 to 16 of Embodiment 1, and Modified Examples 1 to 15 of Embodiment 2 so as to be executable by a computer (CPU or the like) that controls an existing control device, that existing control device can be caused to function as the control device 200 according to any of Embodiments 1 and 2, Modified Examples 1 to 16 of Embodiment 1, and Modified Examples 1 to 15 of Embodiment 2.

The present disclosure can be provided as a control device 510 that includes in advance a configuration for implementing functions according to Modified Example 17 of Embodiment 1 of the present disclosure. Additionally, by applying a program, an existing control device can be made to function as the control device 510 according to Modified Example 17 of Embodiment 1. That is, by applying a program for realizing the various functional configurations of the control device 510 described in Modified Example 17 of Embodiment 1 described above so as to be executable by a computer (CPU or the like) that controls an existing control device, that existing control device can be caused to function as the control device 510 according to Modified Example 17 of Embodiment 1.

Any distribution method of such a program can be used. For example, the program can be stored and distributed on a recording medium such as a memory card, a compact disc (CD) read-only memory, or a digital versatile disk (DVD) read-only memory, or can be distributed via a communication medium such as the internet. A method according to the present disclosure can be implemented using the control device 200 according to any one of Embodiments 1 and 2, Modified Examples 1 to 16 of Embodiment 1, and Modified Examples 1 to 15 of Embodiment 2 and the control device 510 according to Modified Example 17 of Embodiment 1. Additionally, the method according to the present disclosure can be implemented using the delivery system 1 according to any one of Embodiment 1 and Modified Examples 1 to 17 of Embodiment 1, and the determination system 2 according to any one of Embodiment 2 and Modified Examples 1 to 15 of Embodiment 2.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

APPENDIX

Appendix 1

A control device including:
at least one memory configured to store a program code; and
at least one processor configured to access the program code and operate as instructed by the program code,
the program code including:
an acquisition code configured to cause the at least one processor to acquire a request for requesting determination as to whether or not a target area is usable for a predetermined purpose; and
a control code configured to cause the at least one processor to perform control to cause a first flying object to fly to the target area,
wherein the acquisition code is configured to cause the at least one processor to further acquire sensing data that is data obtained by optical sensing of the target area by the first flying object, and
the program code further includes a determination code configured to cause the at least one processor to determine, based on the acquired sensing data, whether or not the target area is usable for the predetermined purpose.

Appendix 2

The control device according to Appendix 1, wherein
the acquisition code is configured to cause the at least one processor to further acquire, together with the request or separately from the request, a first image obtained by capturing of an image of a surface of the target area,
the determination code is configured to cause the at least one processor to
determine, based on the acquired first image, whether or not the surface satisfies a predetermined first condition, and
upon determination that the surface does not satisfy the first condition, determine that the target area is unusable for the predetermined purpose, and
the control code is configured to cause, upon determination that the surface satisfies the first condition, the at least one processor to perform control to cause the first flying object to fly to the target area.

Appendix 3

The control device according to Appendix 2, wherein
the acquisition code is configured to cause the at least one processor to further acquire the second image that is an image different from the first image and that is obtained by capturing of an image of a cover that covers the target area,
the determination code is configured to cause the at least one processor to
determine, based on the acquired second image, whether or not the cover satisfies a predetermined second condition, and
upon determination that the cover does not satisfy the second condition, determine that the target area is unusable for the predetermined purpose, and
the control code is configured to cause the at least one processor to perform, upon determination that the surface satisfies the first condition and the cover satisfies the second condition, the control to cause the first flying object to fly to the target area.

Appendix 4

The control device according to Appendix 3, wherein
the determination code is configured to cause the at least one processor to
further determine, based on a feature point based on the first image and a feature point based on the second image, whether or not the target area whose surface is imaged to obtain the first image is identical to the target area covered with the cover imaged to obtain the second image, and
upon determination the target areas are identical to each other, determine whether or not the cover imaged to obtain the second image satisfies the second condition.

Appendix 5

The control device according to Appendix 1, wherein
the predetermined purpose is to install a predetermined object or construct a predetermined building.

Appendix 6

The control device according to Appendix 2, wherein
the predetermined purpose is to install a predetermined object or construct a predetermined building.

Appendix 7

The control device according to Appendix 3, wherein
the predetermined purpose is to install a predetermined object or construct a predetermined building.

Appendix 8

The control device according to Appendix 4, wherein
the predetermined purpose is to install a predetermined object or construct a predetermined building.

Appendix 9

The control device according to Appendix 5, wherein
the predetermined object is a radio station, and
the predetermined purpose is to install the radio station.

Appendix 10

The control device according to Appendix 9, wherein the determination code is configured to cause the at least one processor to
calculate a distance from a ground level to the target area based on the sensing data, and
determine, based on the calculated distance, whether or not the target area is usable for the predetermined purpose.

Appendix 11

The control device according to Appendix 5, wherein the determination code is configured to cause the at least one processor to
determine, based on the sensing data, a positional relationship between the target area and the building that is located at a distance shorter than a predetermined distance from the target area, and
determine, based on the determined positional relationship, whether or not the target area is usable for the predetermined purpose.

Appendix 12

The control device according to Appendix 9, wherein the determination code is configured to cause the at least one processor to
determine, based on the sensing data, a positional relationship between the target area and the building that is located at a distance shorter than a predetermined distance from the target area, and
determine, based on the determined positional relationship, whether or not the target area is usable for the predetermined purpose.

Appendix 13

The control device according to Appendix 10, wherein the determination code is configured to cause the at least one processor to
determine, based on the sensing data, a positional relationship between the target area and the building that is located at a distance shorter than a predetermined distance from the target area, and
determine, based on the determined positional relationship, whether or not the target area is usable for the predetermined purpose.

Appendix 14

The control device according to Appendix 1, wherein
the predetermined purpose is to use the target area as a port,
the sensing data represents a target area image obtained by capturing of an image of the target area by the first flying object, and
the determination code is configured to cause the at least one of processors to determine, based on the target area image, whether or not either one or both of the first flying object and the second flying object different from the first flying object can land in the target area.

Appendix 15

The control device according to Appendix 2, wherein
the predetermined purpose is to use the target area as a port,
the sensing data represents a target area image obtained by capturing of an image of the target area by the first flying object,
the first image is an image different from the target area image, and
the determination code is configured to cause the at least one processor to determine that upon determination based on the acquired first image that the surface of the target area does not satisfy the first condition, either one or both of the first flying object and a second flying object different from the first flying object cannot land in the target area.

Appendix 16

The control device according to Appendix 3, wherein
the predetermined purpose is to use the target area as a port,
the request includes destination information that represents a destination of the cover that covers the target area to indicate that the target area is to be used as the port,
the sensing data represents a target area image obtained by capturing of an image of the target area by the first flying object,
the first image is an image different from the target area image,
the determination code is configured to cause the at least one processor to determine that upon determination based on the acquired first image that the surface of the target area does not satisfy the first condition, either one or both of the first flying object and a second flying object different from the first flying object cannot land in the target area,
the control code is configured to cause the at least one processor to output the destination information upon determination that the surface satisfies the first condition, the acquisition code is configured to cause the at least one processor to further acquire, together with a report that tells that the target area is covered with the cover or separately from the report, the second image that is different from the target area image and the first image and obtained by capturing of an image of the cover that covers the target area, and the determination code is configured to cause the at least one processor to determine that upon determination based on the acquired second image that the cover does not satisfy the second condition, either one or both of the first flying object and the second flying object cannot land in the target area.

Appendix 17

The control device according to Appendix 4, wherein the predetermined purpose is to use the target area as a port, the request includes destination information that represents a destination of the cover that covers the target area to indicate that the target area is to be used as the port, the sensing data represents a target area image obtained by capturing of an image of the target area by the first flying object, the first image is an image different from the target area image, the determination code is configured to cause the at least one processor to determine that upon determination based on the acquired first image that the surface of the target area does not satisfy the first condition, either one or both of the first flying object and a second flying object different from the first flying object cannot land in the target area, the control code is configured to cause the at least one processor to output the destination information upon determination that the surface satisfies the first condition, the acquisition code is configured to cause the at least one processor to acquire, together with a report that tells that the target area is covered with the cover or separately from the report, the second image that is different from the target area image and the first image and obtained by capturing of an image of the cover that covers the target area, and the determination code is configured to cause the at least one processor to determine that upon determination based on the acquired second image that the cover does not satisfy the second condition, either one or both of the first flying object and the second flying object cannot land in the target area.

Appendix 18

The control device according to Appendix 14, wherein the determination code is configured to cause the at least one processor to further determine, based on the target area image, whether or not either one or both of the first flying object and the second flying object different from the first flying object can land in the target area.

Appendix 19

A system including a terminal device and a control device, wherein the terminal device includes a communication circuit configured to transmit a request for requesting determination as to whether or not the target area is usable for a predetermined purpose, the control device includes:
a communication circuit configured to receive the request;
at least one memory configured to store a program code; and
at least one processor configured to access the program code and operate as instructed by the program code, the program code includes a control code configured to cause the at least one processor to perform control to cause a first flying object to fly to the target area upon reception the request, the communication circuit is configured to further receive sensing data that is data obtained by optical sensing of the target area by the first flying object, and the program code further includes a determination code configured to cause the at least one processor to determine, based on the received sensing data, whether or not the target area is usable for the predetermined purpose.

Appendix 20

A method including:
acquiring a request for requesting determination as to whether or not the target area is usable for a predetermined purpose;
performing control to cause a first flying object to fly to the target area;
acquiring sensing data that is data obtained by optical sensing of the target area by the first flying object; and
determining, based on the acquired sensing data, whether or not the target area is usable for the predetermined purpose.

What is claimed is:

1. A control device comprising:
   at least one memory storing program code; and
   at least one processor configured to access the program code and operate as instructed by the program code, wherein
   the program code includes:
      an acquisition code configured to cause the at least one processor to acquire a request for requesting determination as to whether or not a target area is usable for a predetermined purpose; and
      a control code configured to cause the at least one processor to perform control to cause a first flying object to fly to the target area,
   the acquisition code is configured to cause the at least one processor to further acquire sensing data that is data obtained by optical sensing of the target area by the first flying object, and
   the program code further includes a determination code configured to cause the at least one processor to determine, based on the acquired sensing data, whether or not the target area is usable for the predetermined purpose.

2. The control device according to claim 1, wherein
   the acquisition code is configured to cause the at least one processor to further acquire, together with the request or separately from the request, a first image obtained by capturing of an image of a surface of the target area,
   the determination code is configured to cause the at least one processor to
      determine, based on the acquired first image, whether or not the surface satisfies a predetermined first condition, and
      upon determination that the surface does not satisfy the first condition, determine that the target area is unusable for the predetermined purpose, and the control code is configured to cause, upon determination that the surface satisfies the first condition, the at least one processor to perform the control to cause the first flying object to fly to the target area.

3. The control device according to claim 2, wherein
the acquisition code is configured to cause the at least one processor to further acquire the second image that is an image different from the first image and that is obtained by capturing of an image of a cover that covers the target area,
the determination code is configured to cause the at least one processor to
  determine, based on the acquired second image, whether or not the cover satisfies a predetermined second condition, and
  upon determination that the cover does not satisfy the second condition, determine that the target area is unusable for the predetermined purpose, and
the control code is configured to cause the at least one processor to perform, upon determination that the surface satisfies the first condition and the cover satisfies the second condition, the control to cause the first flying object to fly to the target area.

4. The control device according to claim 3, wherein
the determination code is configured to cause the at least one processor to
  further determine, based on a feature point based on the first image and a feature point based on the second image, whether or not the target area whose surface is imaged to obtain the first image is identical to the target area covered with the cover imaged to obtain the second image, and
  upon determination the target areas are identical to each other, determine whether or not the cover imaged to obtain the second image satisfies the second condition.

5. The control device according to claim 4, wherein
the predetermined purpose is to install a predetermined object or construct a predetermined building.

6. The control device according to claim 4, wherein
the predetermined purpose is to use the target area as a port,
the request includes destination information that represents a destination of the cover that covers the target area to indicate that the target area is to be used as the port,
the sensing data represents a target area image obtained by capturing of an image of the target area by the first flying object,
the first image is an image different from the target area image,
the determination code is configured to cause the at least one processor to determine that upon determination based on the acquired first image that the surface of the target area does not satisfy the first condition, either one or both of the first flying object and a second flying object different from the first flying object cannot land in the target area,
the control code is configured to cause the at least one processor to output the destination information upon determination that the surface satisfies the first condition,
the acquisition code is configured to cause the at least one processor to further acquire, together with a report that tells that the target area is covered with the cover or separately from the report, the second image that is different from the target area image and the first image and obtained by capturing of an image of the cover that covers the target area, and
the determination code is configured to cause the at least one processor to determine that upon determination based on the acquired second image that the cover does not satisfy the second condition, either one or both of the first flying object and the second flying object cannot land in the target area.

7. The control device according to claim 3, wherein
the predetermined purpose is to install a predetermined object or construct a predetermined building.

8. The control device according to claim 3, wherein
the predetermined purpose is to use the target area as a port,
the request includes destination information that represents a destination of the cover that covers the target area to indicate that the target area is to be used as the port,
the sensing data represents a target area image obtained by capturing of an image of the target area by the first flying object,
the first image is an image different from the target area image,
the determination code is configured to cause the at least one processor to determine that upon determination based on the acquired first image that the surface of the target area does not satisfy the first condition, either one or both of the first flying object and a second flying object different from the first flying object cannot land in the target area,
the control code is configured to cause the at least one processor to output the destination information upon determination that the surface satisfies the first condition,
the acquisition code is configured to cause the at least one processor to further acquire, together with a report that tells that the target area is covered with the cover or separately from the report, the second image that is different from the target area image and the first image and obtained by capturing of an image of the cover that covers the target area, and
the determination code is configured to cause the at least one processor to determine that upon determination based on the acquired second image that the cover does not satisfy the second condition, either one or both of the first flying object and the second flying object cannot land in the target area.

9. The control device according to claim 2, wherein
the predetermined purpose is to install a predetermined object or construct a predetermined building.

10. The control device according to claim 2, wherein
the predetermined purpose is to use the target area as a port,
the sensing data represents a target area image obtained by capturing of an image of the target area by the first flying object,
the first image is an image different from the target area image, and
the determination code is configured to cause the at least one processor to determine that upon determination based on the acquired first image that the surface of the target area does not satisfy the first condition, either one or both of the first flying object and a second flying object different from the first flying object cannot land in the target area.

11. The control device according to claim 1, wherein
the predetermined purpose is to install a predetermined object or construct a predetermined building.

12. The control device according to claim 11, wherein
the predetermined object is a radio station, and
the predetermined purpose is to install the radio station.

13. The control device according to claim 12, wherein the determination code is configured to cause the at least one processor to
calculate a distance from a ground level to the target area based on the sensing data, and
determine, based on the calculated distance, whether or not the target area is usable for the predetermined purpose.

14. The control device according to claim 13, wherein the determination code is configured to cause the at least one processor to
determine, based on the sensing data, a positional relationship between the target area and a building that is located at a distance shorter than a predetermined distance from the target area, and
determine, based on the determined positional relationship, whether or not the target area is usable for the predetermined purpose.

15. The control device according to claim 11, wherein the determination code is configured to cause the at least one processor to
determine, based on the sensing data, a positional relationship between the target area and a building that is located at a distance shorter than a predetermined distance from the target area, and
determine, based on the determined positional relationship, whether or not the target area is usable for the predetermined purpose.

16. The control device according to claim 12, wherein the determination code is configured to cause the at least one processor to
determine, based on the sensing data, a positional relationship between the target area and a building that is located at a distance shorter than a predetermined distance from the target area, and
determine, based on the determined positional relationship, whether or not the target area is usable for the predetermined purpose.

17. The control device according to claim 1, wherein
the predetermined purpose is to use the target area as a port,
the sensing data represents a target area image obtained by capturing of an image of the target area by the first flying object, and
the determination code is configured to cause the at least one processor to determine, based on the target area image, whether or not either one or both of the first flying object and a second flying object different from the first flying object can land in the target area.

18. The control device according to claim 17, wherein
the determination code is configured to cause the at least one processor to further determine, based on the target area image, whether or not either one or both of the first flying object and the second flying object different from the first flying object can land in the target area.

19. A system comprising a terminal device and a control device, wherein
the terminal device comprises a first communication circuit configured to transmit a request for requesting determination as to whether or not a target area is usable for a predetermined purpose,
the control device comprises:
a second communication circuit configured to receive the request;
at least one memory storing program code; and
at least one processor configured to access the program code and operate as instructed by the program code,
the program code includes a control code configured to cause the at least one processor to perform control to cause a first flying object to fly to the target area upon reception the request,
the second communication circuit is configured to further receive sensing data that is data obtained by optical sensing of the target area by the first flying object, and
the program code further includes a determination code configured to cause the at least one processor to determine, based on the received sensing data, whether or not the target area is usable for the predetermined purpose.

20. A method comprising:
acquiring a request for requesting determination as to whether or not a target area is usable for a predetermined purpose;
performing control to cause a first flying object to fly to the target area;
acquiring sensing data that is data obtained by optical sensing of the target area by the first flying object; and
determining, based on the acquired sensing data, whether or not the target area is usable for the predetermined purpose.

* * * * *